(12) United States Patent
Jackson et al.

(10) Patent No.: US 11,426,681 B2
(45) Date of Patent: Aug. 30, 2022

(54) MECHANICAL FILTER ELEMENT, APPARATUS AND METHOD

(71) Applicant: Evolution Aqua Limited, Wigan (GB)

(72) Inventors: Nicholas John Jackson, Ormskirk (GB); Jasper Hendericus Maria Kuijper, Burscough (GB)

(73) Assignee: Evolution Aqua Limited, Wigan (GB)

( * ) Notice: Subject to any disclaimer, the term of this patent is extended or adjusted under 35 U.S.C. 154(b) by 200 days.

(21) Appl. No.: 15/574,096

(22) PCT Filed: May 16, 2016

(86) PCT No.: PCT/GB2016/000101
§ 371 (c)(1),
(2) Date: Nov. 14, 2017

(87) PCT Pub. No.: WO2016/185159
PCT Pub. Date: Nov. 24, 2016

(65) Prior Publication Data
US 2018/0296947 A1    Oct. 18, 2018

(30) Foreign Application Priority Data

May 15, 2015  (GB) ..................................... 1508392
Jan. 11, 2016  (GB) ..................................... 1600483

(51) Int. Cl.
*B01D 24/00*    (2006.01)
*B01D 24/10*    (2006.01)
(Continued)

(52) U.S. Cl.
CPC ......... *B01D 24/001* (2013.01); *B01D 23/005* (2013.01); *B01D 23/10* (2013.01);
(Continued)

(58) Field of Classification Search
CPC .............. B01J 19/30; B01J 2219/30223; B01J 2219/31; B01J 2219/312
See application file for complete search history.

(56) References Cited

U.S. PATENT DOCUMENTS 656,043 A    8/1900  Paterson
3,298,523 A  1/1967  Johnson
(Continued)

FOREIGN PATENT DOCUMENTS

CN    1765461 A    5/2006
CN    103272415 A  9/2013
(Continued)

OTHER PUBLICATIONS

Decision of Rejection and English language translation, Chinese Application No. 201680037110.2, dated Jun. 28, 2019, 9 pp.
(Continued)

*Primary Examiner* — Benjamin M Kurtz
(74) *Attorney, Agent, or Firm* — Myers Bigel, P.A.

(57) ABSTRACT

The present disclosure a mechanical filter element (2) for forming a static filter pack (11) to perform mechanical filtration of a liquid. The mechanical filter element (1) has one or more filter cell (19). The present disclosure also relates to a mechanical filter apparatus (1) having a filter chamber (10) containing a plurality of mechanical filter elements (2) for forming the static filter pack (11) to perform mechanical filtration of a liquid. The mechanical filter apparatus (1) is configured to generate a flow of the liquid through the mechanical filter elements (2) during filtration to form the static filter pack (11). Furthermore, the present disclosure relates to a method of mechanically filtering a liquid. A plurality of mechanical filter elements (2) each comprising one or more filter cell (19) are disposed in a filter chamber (10). During filtration, the liquid flows through the filter chamber (10) to establish a static filter pack (11) of said
(Continued)

mechanical filter elements (2) to mechanically filter the liquid.

22 Claims, 27 Drawing Sheets

(51) Int. Cl.
| | | |
|---|---|---|
| B01D 24/14 | (2006.01) | |
| B01D 24/16 | (2006.01) | |
| B01D 24/40 | (2006.01) | |
| B01D 24/46 | (2006.01) | |
| B01J 19/30 | (2006.01) | |
| C02F 1/00 | (2006.01) | |
| E04H 4/12 | (2006.01) | |
| C02F 103/42 | (2006.01) | |

(52) U.S. Cl.
CPC ............ *B01D 24/10* (2013.01); *B01D 24/14* (2013.01); *B01D 24/167* (2013.01); *B01D 24/40* (2013.01); *B01D 24/4636* (2013.01); *B01D 24/4642* (2013.01); *B01D 24/4668* (2013.01); *B01J 19/30* (2013.01); *C02F 1/001* (2013.01); *E04H 4/1209* (2013.01); *B01D 2101/00* (2013.01); *B01J 2219/30223* (2013.01); *B01J 2219/30242* (2013.01); *B01J 2219/30466* (2013.01); *B01J 2219/3188* (2013.01); *C02F 2103/42* (2013.01); *C02F 2303/04* (2013.01); *C02F 2303/16* (2013.01)

(56) References Cited

U.S. PATENT DOCUMENTS

| | | | |
|---|---|---|---|
| 3,720,317 A | | 3/1973 | Willinger |
| 4,002,705 A | | 1/1977 | McKeown |
| 4,122,011 A | * | 10/1978 | Strigle, Jr. ............... B01J 19/30 |
| | | | 210/150 |
| 4,218,317 A | | 8/1980 | Kirschmann |
| 4,290,894 A | | 9/1981 | Török et al. |
| 4,295,965 A | | 10/1981 | Köster |
| 4,368,123 A | | 1/1983 | Stanley |
| 4,385,988 A | | 5/1983 | Hyppönen |
| D275,310 S | | 8/1984 | Stanley |
| D296,463 S | | 6/1988 | Padilla |
| D307,933 S | | 5/1990 | Baer |
| D318,093 S | | 7/1991 | Ferguson |
| D323,017 S | | 1/1992 | Bernstein |
| 5,108,594 A | | 4/1992 | Giovanetti et al. |
| 5,232,586 A | | 8/1993 | Malone |
| 5,458,779 A | | 10/1995 | Odegaard |
| 5,582,722 A | | 12/1996 | Wachinski et al. |
| 5,779,886 A | | 7/1998 | Couture |
| 5,951,876 A | | 9/1999 | Snowball |
| 6,048,456 A | | 4/2000 | Palmer |
| 6,080,304 A | | 6/2000 | Gomi |
| 6,276,302 B1 | | 8/2001 | Lee |
| 6,423,537 B1 | | 7/2002 | Soria et al. |
| 6,447,675 B1 | | 9/2002 | James |
| D465,257 S | | 11/2002 | Van Olst et al. |
| 6,517,724 B1 | | 2/2003 | Malone |
| 6,616,845 B2 | | 9/2003 | Shechter et al. |
| 6,685,826 B1 | * | 2/2004 | James .................. A01K 63/045 |
| | | | 210/150 |
| 6,709,574 B2 | | 3/2004 | James |
| 6,726,838 B2 | | 4/2004 | Shechter et al. |
| 7,431,848 B2 | | 10/2008 | James |
| D611,120 S | | 3/2010 | Brockdorff |
| D611,568 S | | 3/2010 | Westrum |
| D612,007 S | | 3/2010 | Brockdorff |
| D618,760 S | | 6/2010 | Flournoy et al. |
| D619,201 S | | 7/2010 | Westrum |
| D645,116 S | | 9/2011 | Mckean et al. |
| D645,159 S | | 9/2011 | Loken |
| D645,161 S | | 9/2011 | Loken |
| D648,821 S | | 11/2011 | Mckean et al. |
| D661,778 S | | 6/2012 | Dempster et al. |
| 8,241,717 B1 | | 8/2012 | Anderson |
| D696,744 S | | 12/2013 | Barrett |
| D697,168 S | | 1/2014 | Rusten et al. |
| D700,014 S | | 2/2014 | Zeanah |
| D716,414 S | | 10/2014 | Glen |
| D718,412 S | | 11/2014 | Flournoy et al. |
| D747,785 S | | 1/2016 | Ruprecht |
| 9,249,036 B2 | | 2/2016 | Williams et al. |
| D750,737 S | | 3/2016 | Ashley |
| D758,529 S | | 6/2016 | Boudreau et al. |
| D762,279 S | | 7/2016 | Flournoy et al. |
| D785,132 S | | 4/2017 | Jackson et al. |
| 2002/0158001 A1 | | 10/2002 | Northcut et al. |
| 2004/0144728 A1 | | 7/2004 | Moller et al. |
| 2004/0149233 A1 | | 8/2004 | Cummins |
| 2004/0225085 A1 | | 11/2004 | Glover et al. |
| 2005/0029204 A1 | | 2/2005 | Schwartzkopf |
| 2005/0035042 A1 | | 2/2005 | Rowe et al. |
| 2006/0151366 A1 | | 7/2006 | Hoang |
| 2007/0048174 A1 | | 3/2007 | James |
| 2008/0017561 A1 | | 1/2008 | Shaw et al. |
| 2009/0071909 A1 | | 3/2009 | Newcombe et al. |
| 2009/0178980 A1 | | 7/2009 | Newcombe |
| 2013/0118992 A1 | | 5/2013 | Henig |
| 2018/0362361 A1 | | 12/2018 | Archer |
| 2021/0039962 A1 | | 2/2021 | Heitele et al. |

FOREIGN PATENT DOCUMENTS

| | | |
|---|---|---|
| DE | 2310652 A1 | 10/1973 |
| DE | 19819676 A1 | 11/1999 |
| EM | 006471132-0001 | 5/2019 |
| EM | 006471132-0002 | 5/2019 |
| EP | 0 484 896 A1 | 5/1992 |
| FR | 2 026 341 | 9/1970 |
| FR | 2500320 A1 | 8/1982 |
| FR | 2 612 419 A1 | 9/1988 |
| GB | 1 275 116 | 5/1972 |
| GB | 1429183 A | 3/1976 |
| GB | 1 498 360 | 1/1978 |
| GB | 2 093 728 A | 9/1982 |
| GB | 2 101 901 A | 1/1983 |
| GB | 2 318 526 A | 4/1998 |
| GB | 2 422 793 A | 8/2006 |
| GB | 2550495 A | 11/2017 |
| GB | 2540847 B | 12/2017 |
| GB | 2552439 A | 1/2018 |
| GB | 2552762 A | 2/2018 |
| JP | 2002143840 A | 5/2002 |
| JP | 2002316148 A | 10/2002 |
| WO | 02/096806 A2 | 12/2002 |
| WO | 2006/082447 A2 | 8/2006 |
| WO | WO 2006/082447 A2 | 8/2006 |
| WO | WO 2006/082447 A3 | 8/2006 |
| WO | WO 2015/115740 A1 | 8/2015 |
| WO | WO 2017/198679 A2 | 11/2017 |
| WO | WO 2017/198679 A3 | 11/2017 |
| WO | 2019/096826 A1 | 5/2019 |

OTHER PUBLICATIONS

McQuarrie et al., "Moving Bed Biofilm Reactor Technology: Process Applications, Design, and Performance", Water Environment Research, vol. 83, No. 6, Jun. 2011, pp. 560-575.

Rasmussen, "The Kaldnes Moving Bed™ biofilm process—an innovative solution to biological waste water treatment", yakutec. com; http://www.yacutec.com/documentos/LM-02_the_kaldnes_moving_bed.pdf; accessed Nov. 15, 2016, 9 pp.

International Search Report and Written Opinion of the International Searching Authority, International Application No. PCT/GB2016/000101, dated Sep. 19, 2016, 17 pp.

Patents Act 1977: Combined Search and Examination Report under Sections 17 and 18(3), UKIPO Application No. GB1608550.8, dated Nov. 16, 2016, 8 pp.

(56) References Cited

OTHER PUBLICATIONS

Patents Act 1977: Combined Search and Examination Report under Sections 17 and 18(3), UKIPO Application No. GB1718281.7, dated Dec. 1, 2017, 5 pp.
Patents Act 1977: Combined Search and Examination Report under Sections 17 and 18(3), UKIPO Application No. GB1718291.6, dated Nov. 16, 2017, 5 pp.
Patents Act 1977: Examination Report under Section 18(3), UKIPO Application No. GB1718291.6, dated Jul. 20, 2018, 3 pp.
International Search Report and Written Opinion of the International Searching Authority, International Application No. PCT/EP2017/061766, dated Nov. 21, 2017, 22 pp.
Invitation to Pay Additional Fees and, Where Applicable, Protest Fee, International Application No. PCT/GB2018/050578, dated Jun. 8, 2018, 10 pp.
Patents Act 1977: Combined Search and Examination Report under Sections 17 and 18(3), UKIPO Application No. GB1803646.7, dated Jul. 30, 2018, 6 pp.
Patents Act 1977: Search Report under Section 17(5), UKIPO Application No. GB1707874.2, dated Sep. 15, 2017, 4 pp.
Patents Act 1977: Examination Report under Section 18(3), UKIPO Application No. GB1817447.4, dated Nov. 4, 2019, 3 pp.
Patents Act 1977: Intention to Grant under Section 18(4), UKIPO Application No. GB1817447.4, dated Nov. 14, 2019, 2 pp.
Patents Act 1977: Examination Report under Section 18(3), UKIPO Application No. GB1817447.4, dated Sep. 11, 2019, 3 pp.
Examination report No. 1 for standard patent application, IP Australia Application No. 2016263651, dated Nov. 6, 2019, 2 pp.
Second Office Action and English language translation, CN Application No. 201680037110.2, dated Mar. 20, 2019, 15 pp.
First Office Action and English language translation, Chinese Application No. 201680037110.2, dated Sep. 30, 2018, 18 pp.
International Search Report and Written Opinion of the International Searching Authority, International Application No. PCT/EP2018/081193, dated Jan. 4, 2019, 11 pp.
Patents Act 1977: Combined Search and Examination Report under Sections 17 and 18(3), UKIPO Application No. GB1817447.4, dated Nov. 23, 2018, 8 pp.
Patents Act 1977: Combined Search and Examination Report under Sections 17 and 18(3), UKIPO Application No. GB1718912.7, dated Apr. 30, 2019, 8 pp.
Examination report under sections 12 & 13 of the Patents Act, 1970 and the Patents Rules, 2003, Indian Patent Application No. 201717044841, dated May 19, 2020, 6 pp.
Communication pursuant to Article 94(3) EPC, EP Application No. 17723128.9, dated Apr. 23, 2020, 5 pp.
"Communication Pursuant to Article 94(3) EPC", EP Application No. 16725881.3, dated Jul. 24, 2020, 4 pp.
Examination report No. 1 for standard patent application, AU Application No. 2020200430, dated Feb. 4, 2021, 4 pp.
"Examination report under sections 12 & 13 of the Patents Act, 1970 and the Patents Rules, 2003", Indian Patent Application No. 201817045927, dated Jan. 18, 2021, 8 pp.
"Translation of First Office Action", CN Application No. 201780043182.2, dated Nov. 11, 2020, 4 pp.
"Notice prior to receipt of patent application number with English language translation", IL Application No. 255620, Feb. 24, 2021, 8 pp.
"Notice of Review and English language translation", CN Application No. 201680037110.2, dated May 6, 2021, 36 pp.
"Notification of Second Opinion and English language translation", CN Application No. 201780043182.2, dated Jul. 1, 2021, 44 pp.
"Search and Examination Reports", UAE Application No. P6001461/2017, dated Feb. 16, 2021, 14 pp.
"Search Report and Opinion", BR Application No. BR112018073656-2, dated May 31, 2021, 4 pp.
"Notification regarding defects in patent application 262952", IL Patent Application No. 262952, Jan. 20, 2022, 6 pp.
"Patents Act 1977: Examination Report under Section 18(3)", UKIPO Application No. GB1707874.2, dated Sep. 7, 2021, 5 pp.
"Summons to attend oral proceedings pursuant to Rule 115(1) EPC", EP Application No. 16725881.3, dated Jul. 12, 2022, 7 pp.

* cited by examiner

SAND DOWNFLOW FILTRATION

SAND BACK WASH CLEAN

OPEN CELL HEAVY DOWN FLOW FILTRATION

OPEN CELL HEAVY BACK FLOW WASH

FIG. 21 OPEN CELL LIGHT UP FLOW FILTRATION

OPEN CELL LIGHT BACK FLOW WASH

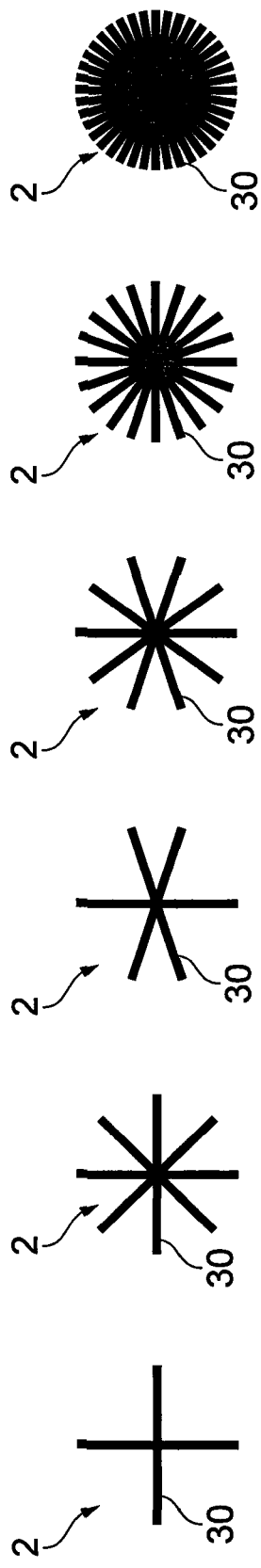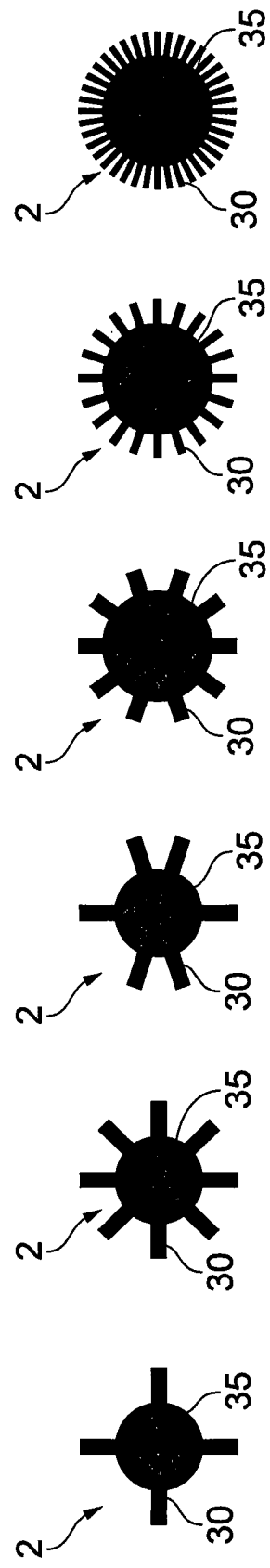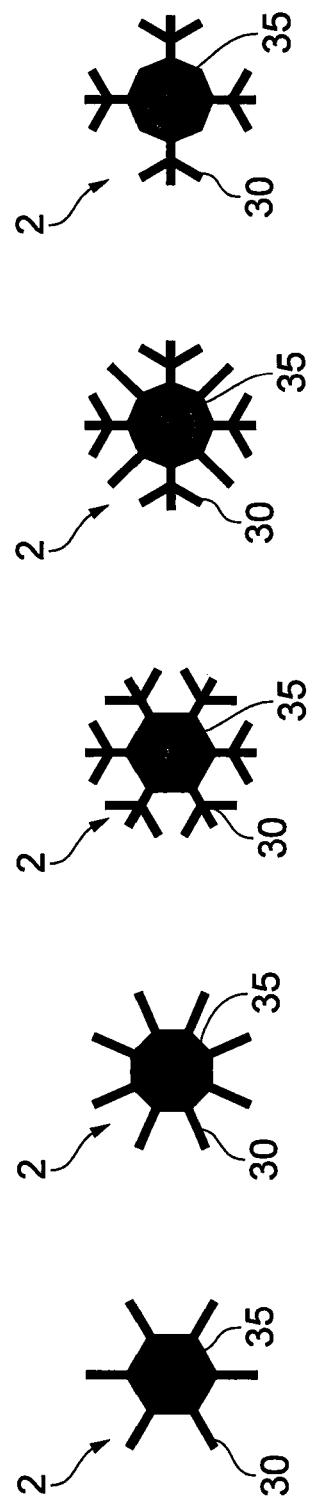

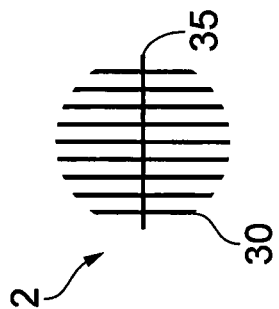
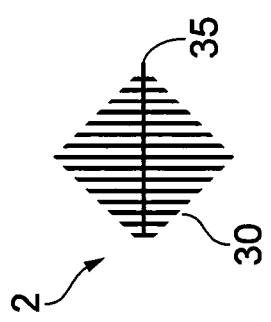
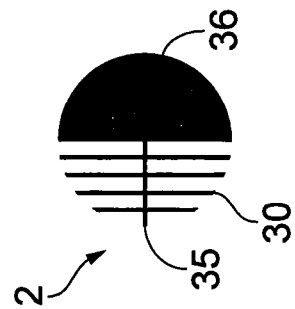
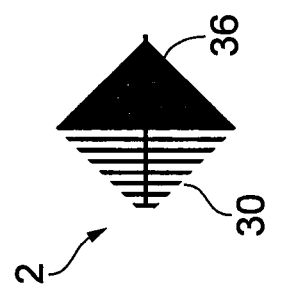
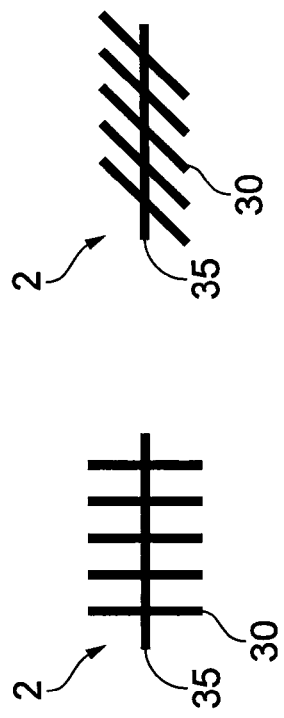

MECHANICAL FILTER ELEMENT, APPARATUS AND METHOD

RELATED APPLICATIONS

This application is a 35 U.S.C. § 371 national stage application of PCT Application No. PCT/GB2016/000101, filed on May 16, 2016, which claims priority from Great Britain Patent Application No. 1508392.6 filed on May 15, 2015, and Great Britain Patent Application No. 1600483.0 filed on Jan. 11, 2016, the contents of which are incorporated herein by reference in their entireties. The above-referenced PCT International Application was published in the English language as International Publication No. WO 2016/185159 on Nov. 24, 2016.

TECHNICAL FIELD

The present disclosure relates to a mechanical filter element, to mechanical filter apparatus and to mechanical filtration method(s). More particularly, but not exclusively, the present disclosure relates to mechanical filter elements, mechanical filter apparatus and mechanical filtration methods for filtering water in swimming pools, swimming baths, leisure pools, hot tubs, spas and leisure parks.

BACKGROUND

The mechanical filtration of a liquid is performed to remove particulates from the liquid, for example held in suspension in the liquid. It will be understood that mechanical filtration is distinct from biological filtration (also known as "biofiltration").

A known mechanical filter apparatus 101 for filtering water in a swimming pool is shown in FIGS. 1 and 2. The swimming pool water is treated to inhibit biological activity, for example by adding chlorine or salt. The mechanical filter apparatus 101 is adapted to perform mechanical filtration of the water by physically trapping particulates. A filter media 102 is provided in a filter chamber 110 formed in a filter housing 106. The filter media 102 typically consists of sand, silica glass or glass beads which form a static filter bed 111 at the bottom of the filter chamber 110. Constrictions are formed between the filter media 102 making up the static filter bed 111. During filtration, liquid is pumped through the static filter bed 111 and contaminants in the liquid, such as particulates, are physically trapped between the filter media 102. The size of the particulates filtered from the liquid is dependent on the size of the filter media 102. The static filter bed 111 can be made up of layers of different grades of filter media 102 to progressively filter smaller particulates as the water passes through the static filter bed 111.

As shown in FIG. 1, during filtration the water is introduced into the filter chamber 110 through a first conduit 107 and exits through a second conduit 108. The first conduit 107 has a first aperture 112; and one or more second conduit 108 has a second aperture 113. A mesh or grill is provided over the second aperture 113 to prevent the filter media 102 entering the second conduit 108. The water flows through the static filter bed 111 and suspended particulates are trapped in the static filter bed 111, thereby filtering the water. The static filter bed 111 is periodically cleaned by reversing the flow direction to dislodge the trapped particulates. The reversal of the flow through the static filter bed 111 is referred to as backwashing. As shown in FIG. 2, during backwashing the water is introduced into the filter chamber 110 through the second conduit 108 and exits through the first conduit 107. The first conduit 107 is connected to a drain conduit (not shown) during backwashing to remove the filtered material from the filter chamber 110. During the backwashing operation, the static filter bed 111 remains substantially intact. If excessive fluid pressure is applied during backwashing, the static filter bed 111 may be broken up (which is known as turning the filter bed) causing the filter media 102 to be expelled through the first conduit 107. The static filter bed 111 must then be reset to operate effectively.

There are various known limitations with existing mechanical filter apparatus 101. Notably, the filtration is performed at high pressure to force the water through the static filter bed 111. A high-pressure, high-flow turnover pump is required to pump water through the static filter bed 111. Moreover, the pump must have sufficient capacity to compensate for performance drop-off prior to backwashing due to clogging of the static filter bed 111. Tracking between the clogged areas within the static filter bed 111 can occur, leading to an associated potential rise in bacterial problems due to lack of uniformity in the filtration process. In particular, bacteria and microbes can develop in those regions of the static filter bed 111 where there is no through-flow of water. Moreover, the static filter bed 111 can prove difficult to clean, requiring high backwashing flow rates. As a result, maintenance costs are high with a requirement for significant replacement water and the added requirement of replacement chemicals, such as chlorine, calcium etc. The need to provide an oversize pump to compensate for reduction in flow prior to cleaning results in higher energy costs. Furthermore, the achievable filtration is limited to particulates which have a size greater than 7-10 micron. There is a need for high water replacement during cleaning, typically requiring the addition of chemicals to achieve the appropriate chemical levels in the swimming pool. Also, the cleaning must be performed frequently due to a relatively low particulate capacity of the static filter bed 111, leading to rapid loss of flow.

If the mechanical filter apparatus 101 uses sand as the filter media 102, the sand can degrade over time making it increasingly difficult to clean during a backwashing operation. This can further reduce the efficiency of the mechanical filter apparatus 101. To address this problem, the sand in the mechanical filter apparatus 101 should be replaced periodically, for example once every two years. This can be a difficult and dirty process with a significant cost.

It is against this backdrop that the present invention has been conceived. At least in certain embodiments, the present invention seeks to overcome or ameliorate at least some of the shortcomings associated with known mechanical filter apparatus.

SUMMARY OF THE INVENTION

Aspects of the present invention relate to a filter apparatus; a swimming pool filter apparatus; a mechanical filter element for performing mechanical filtration; and a method of filtering a liquid. According to a further aspect of the present invention there is provided a mechanical filter element for forming a static filter pack to perform mechanical filtration of a liquid, the mechanical filter element comprising one or more filter cell. In use, a plurality of the mechanical filter elements form a static filter pack through which the liquid to be filtered is passed. The filter cells formed within the static filter pack may create localised regions of reduced liquid flow. The energy available to suspend particulates within the liquid is reduced in these regions. At least some of the particulates in the liquid may fall out of suspension within the filter cells. The particulates in the liquid may settle within the one or more filter cell of the mechanical filter elements forming the static filter pack and/or on an exterior of the mechanical filter elements forming the static filter pack. Any contaminate particulates in the liquid are trapped by the mechanical filter elements, thereby mechanically filtering the liquid. By way of example, the removal of contaminate particulates can be used in the treatment of commercial leisure and private pool water treatment, typically swimming pools, spa pools, leisure and entertainment pools.

The mechanical filter elements may form a static filter pack. At least in certain embodiments, the static filter pack may have a larger retention capacity (i.e. an increased capacity to retain filtered material) than prior art filters. For example, a static filter pack from said mechanical filter elements may have a larger retention capacity than an equivalent filter bed comprising sand as a filter media. The frequency with which the cleaning of the static filter pack is performed may be reduced. The consumption of liquid (and any chemicals provided therein, for example to sterilise the liquid) may be reduced compared to prior art filter media.

The one or more filter cell formed in each mechanical filter element may be larger than the particulates to be filtered from the liquid. The mechanical filter element described herein is operative to promote settling of the particulates. At least in certain embodiments this may reduce clogging or blocking of the filter cells. At least in certain embodiments, the static filter pack can filter particulates down to a size of one micron. The one or more filter cell in the mechanical filter element allow a low pressure head in the filter apparatus. At least in certain embodiments, the mechanical filter element allows a lower operating pressure which can allow a smaller pump to be used. The reduced pressure head may also allow a filter housing having a lighter construction. A reduction of in the loss of flow through the static filter pack may also facilitate operation of related equipment, such as heaters, dosing units etc.

It will be appreciated that particulates may be physically trapped in constrictions formed between the mechanical filter elements. However, it is believed that settlement is the primary mechanism by which particulates are filtered from the liquid by the mechanical filter elements. The flow of liquid through the static filter pack may be less affected by the accumulation, of particulates within said one or more filter cell than in prior art filters in which filtration is performed predominantly by trapping particulates between the filter media. In certain embodiments, the flow of liquid through the static filter pack may be substantially unaffected by the collection of particulates within said one or more filter cell. The flow of liquid through the static filter pack may be substantially constant (i.e. steady-state) during filtration. The operating pressure of the liquid required to maintain the flow rate through the static filter pack may be lower than prior art filters. By reducing the operating pressure, energy consumption of the filter apparatus may be reduced.

The mechanical filter element can be formed by an extrusion process, for example extruding a polymer through an extrusion die. In certain embodiments the mechanical filter element can be in the form of a circular plastic extrusion. The mechanical filter element can have a plurality of external ribs and an interior cross section comprising a plurality of filter cells. The filter cells can be in the form of voids. The mechanical filter elements are configured to entrap particulates within the filter cells. The mechanical filter elements provide a uniform filtration surface throughout the static filter pack. The filtration process operates by allowing the liquid to flow around the media and into the filter cells. The particulate material (which may also be referred to as the particulate mass) in the liquid loses energy within the filter cells and become trapped. Due to the uniformity of the static filter pack there is consistency of filtration throughout the static filter pack which can help to avoid stagnation areas. The high throughput, low pressure system and high entrapment capacity due to the open area of the mechanical filter elements, help to reduce efficiency degradation. Cleaning is straightforward and a backwash can be used to displace the trapped particulates. At least in certain embodiments, the mechanical filter element is inert to all current leisure pool cleaning products and can potentially last the lifetime of the installed filter unit.

At least in certain embodiments, the mechanical filter element can provide at least some of the following advantages: long life; lightweight (which can reduce transportation and handling costs); a low carbon footprint (production cost, transport cost, replacement cost etc.); reduced energy consumption since smaller pumps can be used due to lower pressure requirements; a high throughput and/or high flow rate; high particulate loading capacity; removal of particulates down to 1 micron in size; reduced drop in performance between cleaning cycles; a uniformity of filtration which can help to avoid the formation of dead spots and/or clogging; easy cleaning which may not require manual intervention; lightweight; and lifetime installation without the need for replacement.

The mechanical filter elements described herein may be installed retrospectively in existing filter chambers, for example to replace other filter media, such as sand. The mechanical filter element may have a negative buoyancy for installation retrospectively in a filter apparatus configured to establish a down-flow through the filter media (for example comprising a sand bed filter). The mechanical filter element may have a positive buoyancy for installation retrospectively in a filter apparatus configured to establish an up-flow through the filter media. Alternatively, the mechanical filter elements may be used in a dedicated filter apparatus. The filter apparatus may comprise a filter chamber for receiving the mechanical filter elements to form a static filter pack. The mechanical filter elements may be introduced into the filter chamber on-site prior to installation. Alternatively, the filter chamber may be pre-charged with the mechanical filter elements, for example during manufacture of the filter apparatus. Thus, the filter apparatus may be shipped from a manufacturing facility with said mechanical filter elements disposed in said filter chamber. An upper platform and/or a lower platform may be provided in the filter chamber such that the static filter pack is formed coincident with the region of the filter chamber having the largest cross-sectional area. If the filter chamber is spherical, for example a pressurised filter chamber, the upper platform and/or a lower platform may reduce the volume of mechanical filter elements disposed in the filter chamber to form the static filter pack.

The one or more filter cell has an open cell structure. Each filter cell is open to the liquid to be filtered. Thus, the liquid flows into each filter cell. The open structure facilitates cleaning of the mechanical filter elements by dislodging trapped particulates, for example during a backwashing or cleaning operation. The one or more filter cell can have at least a first cell opening. The filter cell can have a first end and a second end. The first cell opening can be disposed at the first end of the filter cell. A second cell opening can be disposed at the second end of the filter cell. In arrangements having first and second cell openings, the filter cell is in the form of a conduit which is open at each end. In alternate arrangements, the filter cell can be open only at one end.

As described herein, a plurality of said mechanical filter elements are arranged to form a static filter pack. The arrangement in which each filter cell is in the form of an open conduit can establish a network of fluid pathways through the static filter pack. By forming multiple fluid pathways, the flow of liquid may be maintained even when particulates accumulate within the static filter pack. As a result, the pressure at which the liquid is pumped through the static filter pack may be reduced compared to prior art filters comprising a sand or glass filter bed. It will be appreciated also that the network of fluid pathways establishes a variety of different flow parameters within the static filter pack, for example different regions within the static filter pack may have different flow rates and/or flow directions. The flow parameters at different regions within the static filter pack may prove particularly effective for initiating filtration for a given flow rate. Thus, filtration may be initiated at different sites within the static filter pack, as determined by the localised flow parameters. The flow parameters within the static filter pack may change as particulates accumulate in localised regions and this may, in turn, promote filtration in other regions of the static filter pack. The different orientations of the mechanical filter elements making up the static filter pack may also affect the flow characteristics within the static filter pack. The diversity of flow parameters within the static filter pack may help to broaden the effective operating range of the static filter pack, for example over a broader range of flow rates. When a particle becomes trapped in/on a mechanical filter element, smaller particles may accumulate on that particle to form a cluster. It will be appreciated, therefore, that the efficiency of the filter apparatus may improve as particulates accumulate in the static filter pack.

The mechanical filter element can have substantially neutral buoyancy or negative buoyancy in the liquid. The density of the material forming the mechanical filter element can be greater than or equal to $1 \text{ g/cm}^3$; or in the range $1 \text{ g/cm}^3$ to $1.59 \text{ g/cm}^3$ inclusive. The density of the material forming the mechanical filter element can be greater than or equal to ($\geq$) $1.2 \text{ g/cm}^3$ (corresponding to a specific gravity which is greater than or equal to ($\geq$) 1.2 in relation to water). A material having a greater density, for example greater than or equal to ($\geq$) $1.2 \text{ g/cm}^3$, may be appropriate for performing mechanical filtration of a salt water swimming pool. The mechanical filter element may be moulded from a plastics material. More particularly, the mechanical filter element may be moulded from a polymer, such as high density polyethylene. A filler may be introduced into the polymer to achieve the desired density. A suitable filler may comprise or consist of talc (hydrated magnesium sheet silicate having the chemical formula $Mg_3Si_4O_{10}(OH)_2$). A suitable composition for the mechanical filter element comprises, by volume, approximately 70% high density polyethylene and approximately 30% talc.

Alternatively, the mechanical filter element can have substantially neutral buoyancy or positive buoyancy in the liquid. The density of the material forming the mechanical filter element can be less than or equal to $1 \text{ g/cm}^3$; or in the range $0.5 \text{ g/cm}^3$ to $1 \text{ g/cm}^3$ inclusive. The density of the material forming the mechanical filter element can be less than or equal to ($\geq$) $0/8 \text{ g/cm}^3$ (corresponding to a specific gravity which is greater than or equal to ($\geq$) 0.8 in relation to water).

The mechanical filter element can have a mass per unit volume of less than or equal to $1000 \text{ kg/m}^3$, $500 \text{ kg/m}^3$, $300 \text{ kg/m}^3$, $250 \text{ kg/m}^3$ or $200 \text{ kg/m}^3$. The mass per unit volume could be as low as $100 \text{ kg/m}^3$. The mechanical filter element may have a mass per unit volume in the range $150 \text{ kg/m}^3$ to $200 \text{ kg/m}^3$. In certain embodiments, the mechanical filter element may have a mass per unit volume of approximately $180 \text{ kg/m}^3$. The mass of the mechanical filter element is significantly less than that of a conventional filter media, such as sand or glass. The reduced mass of the mechanical filter elements is significant in that it may allow a filter apparatus to be pre-charged with said mechanical filter elements, for example during the manufacture or assembly of the filter apparatus. The filter apparatus may be supplied pre-charged with mechanical filter elements. This differs from prior art arrangements in which the filter media may be introduced into the filter apparatus by a final supplier or on-site, for example using locally sourced filter media. By supplying the filter apparatus pre-charged, the operation of the filter apparatus is not dependent on the quality or composition of the filter media introduced by a third party. In certain embodiments, the filter apparatus may have a sealed filter chamber containing said mechanical filter elements.

The mechanical filter element may have a closed (solid) volume (i.e. the volume of the material forming the mechanical filter element); and an open volume (comprising or consisting of the volume of the one or more filter cell). The mechanical filter element may have a closed volume of approximately 18%; and an open volume of approximately 82%.

The mechanical filter element may have a cross-section (defined in a reference plane perpendicular to a longitudinal axis of the mechanical filter element) which is polygonal, rectangular, elliptical or circular. The mechanical filter element may have a transverse dimension in one of the following inclusive ranges: 5 mm to 20 mm; 5 mm to 17 mm; 6 mm to 15 mm; 9 mm to 13 mm; and 10 mm to 12 mm. In certain embodiments, the transverse dimension may be in the inclusive range of 10 mm to 11.5 mm. It will be understood that the transverse dimension is measured along a transverse axis extending perpendicular to the longitudinal axis of the mechanical filter element. In arrangements in which the mechanical filter element has a circular cross-section, the transverse dimension is a diameter of the mechanical filter element.

The one or more filter cell can have a length greater than or equal to 3 mm, 4 mm, 5 mm, 6 mm, 7 mm or 8 mm. The one or more filter cell can have a length which is less than or equal to 8 mm, 10 mm, 12 mm, 14 mm or 16 mm. The length of the one or more filter cell can be approximately 7 mm, 8 mm, 9 mm, 10 mm, 11 mm or 12 mm. The one or more filter cell may have a length in the range 3 mm to 12.6 mm, inclusive. In certain embodiments, the one or more filter cell may have a length of 8.95 mm and a diameter in the range 10 mm to 11.5 mm. The length of the one or more filter cell may correspond to a length of the mechanical filter element along its longitudinal axis.

The ratio of the length of the mechanical filter element to the transverse dimension of the mechanical filter element is defined as an aspect ratio. The aspect ratio of the mechanical filter element may affect the efficiency with which the turbidity of a liquid may be reduced (for example as measured as Nephelometric Turbidity Units (NTU)). The mechanical filter element may have an aspect ratio in one of the following inclusive ranges: 0.25 to 1.25; 0.4 to 1.1; and 0.6 to 1. The mechanical filter element may have an aspect ratio of approximately 0.9. If the mechanical filter element comprises one or more external fin, the transverse dimension used to determine the aspect ratio may include said one or more external fin.

The one or more filter cell can each have a cross-sectional area less than or equal to 10 mm$^2$, 8 mm$^2$, 5 mm$^2$, or 3 mm$^2$. The cross-sectional area of said one or more filter cell is measured in a reference plane disposed perpendicular to a longitudinal axis of the mechanical filter element. The one or more filter cell can have a cross-sectional area greater than or equal to 1 mm$^2$, 3 mm$^2$ or 5 mm$^2$. The one or more filter cell can have at least substantially the same cross-sectional area. The one or more filter cell can have a cross-sectional area in the range of 2.8 mm$^2$ to 2.9 mm$^2$.

The mechanical filter elements may control fluid dynamics within the static filter pack to promote settlement of particulates from the liquid. This filtration mechanism may allow particulates smaller than the one or more filter cell to be filtered from the liquid. In certain embodiments, the mechanical filter elements may filter particulates having a cross-sectional area which is smaller than the cross-sectional area of the one or more filter cell by a factor of at least $1\times10^4$, $1\times10^5$ or $1\times10^6$.

The one or more filter cell can have an internal volume greater than 20 mm$^3$. The one or more filter cell can have an internal volume less than 30 mm$^3$.

The one or more filter cell can comprise a filter area having a cross-sectional area greater than or equal to 9 mm$^2$ and less than or equal to 225 mm$^2$.

The mechanical filter element can comprise at least one first filter cell and at least one second filter cell; wherein the at least one first filter cell is configured to mechanically filter particulates having a smaller size than the particulates mechanically filtered by said at least one second filter cell. The at least one first filter cell can have a smaller cross-sectional area than the second filter cell.

The configuration of the filter cells can promote the capture of particulate material by flocculation and retain various particulate sizes therein. This can be a function of one or more parameters, including void surface area, shape and length of void. Thus, the mechanical filter element can be configured to target a particular range of particulates, for example to suit a particular application or industry. The filter cells create a 'quiet' retaining zone within the media. The reduced flow can help to retain trapped particulate material within the one or more filter cells.

The mechanical filter element can comprise an antibacterial agent and/or an antimicrobial agent. This would prevent a build-up of a biofilm on the mechanical filter element and would help to create a sterile environment appropriate for purely mechanical filtration. This could prevent or reduce a build-up of pathogenic organisms, such as Cryptosporidium which is a known problem in swimming pool filters. Suitable agents include titanium oxide, titanium (IV) oxide, silver ions and silver oxide.

The mechanical filter element can be formed from a material comprising said antibacterial agent and/or said antimicrobial agent. Alternatively, the antibacterial agent and/or said antimicrobial agent can be applied to the mechanical filter element, for example as a coating.

According to a further aspect of the present invention there is provided a mechanical filter element for mechanically filtering water, the mechanical filter element comprising an antibacterial agent and/or an antimicrobial agent. The mechanical filter element can be formed from a material comprising said antibacterial agent and/or said antimicrobial agent. Alternatively, the antibacterial agent and/or said antimicrobial agent can be applied to the mechanical filter element, for example as a coating.

The mechanical filter element can comprise one or more external fin. The mechanical filter element can comprise a plurality of said external fins.

According to a further aspect of the present invention there is provided a mechanical filter element for mechanically filtering water, the mechanical filter element comprising one or more external fin. The mechanical filter element can comprise a plurality of said external fins. Each external fin can extend radially outwardly. The mechanical filter element may comprise a plurality of said external fins. The mechanical filter element may optionally include one or more filter cell of the type described herein. Alternatively, the mechanical filter element may be formed without any filter cells. The external fins may project outwardly from a central element. For example, the external fins may project radially outwardly from a solid core.

A series of voids may be formed between said external fins. In use, particulates in the liquid may settle in the voids between said external fins. The external fins facilitate the flow of liquid through the static filter pack by maintaining spaces between the individual media pieces. A loss of efficiency between cleaning cycles can thereby be reduced. The external fins can also reduce the energy of the particulates contained in the contaminated water as it passes through the media. The external fins on the mechanical filter elements help to promote energy loss of the particulates through collisions and interaction with the fins, thereby reducing the kinetic energy of the contaminate particulates. The particulates may settle within the voids formed between said external fins and/or on an exterior of the mechanical filter elements. As the energy of the particulates reduces, so they start to coagulate (flocculation) into larger particles which are then captured within the voids formed between the external fins of the media. The fins allow free flow around the void spaces and this can help to eliminate any tendency to wash out captured material during filtration.

The external fins may help to maintain a space between mechanical filter elements within the static filter pack. The external fins may be evenly spaced around the periphery of the mechanical filter element. The mechanical filter element may comprise between nine (9) and thirty-six (36) of said external fins. The mechanical filter element may comprise between twelve (12) and twenty-four (24) of said external fins. The mechanical filter element may comprise eighteen (18) of said external fins. In one embodiment, the mechanical filter element can comprise eighteen (18) fins having equal length and equal spacing around the periphery. In certain embodiments the mechanical filter element may comprise external fins having different lengths. For example, the mechanical filter element may comprise first and second external fins having first and second different heights. The first and second external fins may alternate around the periphery of the mechanical filter element.

In certain embodiments the mechanical filter element may comprise internal fins, for example extending inwardly from a cylindrical member.

The radial height of each external fin may be defined in relation to the transverse dimension of the mechanical filter element. The ratio of a radial height of each fin to a transverse dimension of the mechanical filter element may be in the range 0.02 to 0.1; or 0.04 to 0.08. The ratio of a radial height of each fin to a transverse dimension of the mechanical filter element may be approximately 0.06. The fin dimension can, for example, be 0.7 mm high and 0.3 mm thick. The fins can run the full length of the mechanical filter element. The fins can create space between adjacent media in the static filter pack and can provide a surface for energy dissipation and particulate coagulation/flocculation.

Based on experimental data, it is believed that there may also be a relationship between the area of fins exposed to through flow (due to the density of the mechanical filter elements) and the efficiency with which the turbidity is reduced (for example as measured as Nephelometric Turbidity Units (NTU)). This may establish a relationship between the aspect ratio of each mechanical filter element (i.e. the ratio of length of the mechanical filter element to the outside diameter of the mechanical filter element, inclusive of the height of said one or more external fin) and the height of the external fin(s). The combination of exposed fin area created by differing lengths and packing density may affect the NTU reduction efficiency. The ratio of the aspect ratio of each mechanical filter element to the height of the one or more external fin may be within one of the following ranges: 0.04 to 0.2; 0.08 to 0.16; and 0.1 to 0.13. In certain embodiments this ratio may be approximately 0.11.

The retention of particulates on the surface of the mechanical filter element may affect liquid filtration. When a particulate settles in a filter cell or on a surface of the mechanical filter element, additional particulates may then become trapped on the original particulate. This may result in the formation of clusters of particulates on the mechanical filter element and may be referred to as "caking". The collection of particulates on the mechanical filter element may expedite the settlement of additional particulates, which may result in improved filter efficiency. Moreover, at least in certain embodiments, this process may allow the mechanical filter element to filter particulates of a smaller size. The particulates which settle initially in the one or more filter cell or on the mechanical filter element may be relatively large. However, smaller particulates may settle on these particulates over a period of time. The mechanical filter element may have a smooth surface finish. However, this may reduce retention of particulates on the surface of the mechanical filter element. The mechanical filter element may be manufactured so as to have a rough or textured surface. Different manufacturing techniques may be employed to provide the required surface finish. For example, if the mechanical filter element is moulded, for example employing extrusion moulding, a gas may be introduced into the polymer during extrusion to create a textured surface finish. The gas may, for example, comprise nitrogen, carbon dioxide or oxygen. Alternatively, or in addition, a filler may be added to the polymer to create a textured surface finish. A suitable filler is talc.

The mechanical filter element may be pre-conditioned to modify its hydro-dynamic properties. Within a static filter pack, some or all of the mechanical filter elements may be pre-conditioned. For example, a coating may be applied to an exterior of the mechanical filter element to promote adhesion of particulates to its surface. The coating may, in effect, create a "sticky" finish on the exterior of the mechanical filter element. The coating could, for example, be applied in the form of a gel. The pre-conditioned mechanical filter elements may help to initiate settlement of particulates.

According to a further aspect of the present invention there is provided a static filter pack comprising a plurality of the mechanical filter elements described herein. In use, unfiltered liquid is pumped through the static filter pack. As described herein, particulates in the liquid settle within the filter cells and/or on an exterior surface of the mechanical filter elements. As particulates settle within the static filter pack, they may themselves promote settlement of additional material. It is believed that, as material settles in the filter cells, localised flow may be further hindered, thereby promoting settling of additional particulates.

The mechanical filter apparatus can comprise a plurality of the mechanical filter elements described herein.

According to a further aspect of the present invention there is provided a mechanical filter apparatus for removing particulates from a liquid, the mechanical filter apparatus comprising:

a filter chamber containing a plurality of mechanical filter elements for forming a static filter pack to mechanically filter the liquid;

the mechanical filter elements each comprising one or more filter cell. The mechanical filter elements may be of the type described herein.

The mechanical filter apparatus may be connected to a pump for supplying unfiltered water to be filter chamber. The pump may comprise a fixed speed pump, or may comprise a variable speed pump. The mechanical filter apparatus may comprise a controller for controlling operation of the pump. The controller may comprise one or more electronic processor.

The one or more filter cell has an open cell structure. The one or more filter cell can have at least a first cell opening. The filter cell can have a first end and a second end. The first cell opening can be disposed at the first end of the filter cell. A second cell opening can be disposed at the second end of the filter cell. In arrangements having first and second cell openings, the filter cell is in the form of a conduit which is open at each end. In alternate arrangements, the filter cell can be open only at one end.

The mechanical filter apparatus can be operable to generate a flow of the liquid through the filter chamber to establish the static filter pack and to mechanically filter the liquid.

The mechanical filter elements can have substantially neutral buoyancy or negative buoyancy in the liquid. During filtration, the mechanical filter apparatus can be configured to generate a down-flow of the liquid through the mechanical filter elements.

The mechanical filter elements can have substantially neutral buoyancy or positive buoyancy in the liquid. During filtration, the mechanical filter apparatus can be configured to generate an up-flow of water through the mechanical filter elements.

During filtration, the mechanical filter apparatus can be configured to generate a lateral or vertical flow of water through the mechanical filter elements. For example, a lateral or vertical flow may be established through a filter chamber containing the mechanical filter elements.

Alternatively, a circulating flow of liquid may be established within the filter chamber. The liquid may, for example, follow a circular, spiral or helical path within the filter chamber.

The filter chamber can contain a plurality of like mechanical filter elements for forming the static filter pack. Alternatively, the filter chamber can comprise two or more different mechanical filter elements, for example to filter different sizes of particulates. The filter chamber could contain mechanical filter elements having different sizes of filter cells. By way of example, the filter chamber could comprise first and second mechanical filter elements. The first mechanical filter element could comprise one or more first filter cell having a first cross-sectional area; and the second mechanical filter element could comprise one or more second filter cell having a second cross-sectional area; wherein the cross-sectional areas of the first and second filter cells are different from each other. The cross-sectional area of each filter cell is defined in a reference plane perpendicular to a longitudinal axis of the mechanical filter element. Alternatively, or in addition, the length of the first and second filter cells (measured along a longitudinal axis of the mechanical filter element) could be different from each other. The first mechanical filter element could comprise one or more first filter cell having a first length; and the second mechanical filter element could comprise one or more second filter cell having a second length; wherein the lengths of the first and second filter cells are different from each other.

Alternatively, or in addition, a transverse dimension of the first and second mechanical filter elements (measured along a transverse axis extending perpendicular to the longitudinal axis of the mechanical filter element) could be different from each other. The first mechanical filter element could have a first transverse dimension; and the second mechanical filter element could have a second transverse dimension; wherein the first and second transverse dimensions are different from each other. The transverse dimension can be a diameter of the first and second mechanical filter elements.

Alternatively, or in addition, the first and second mechanical filter elements may have first and second densities, the first and second densities being different from each other. The first and second mechanical filter elements may be pre-disposed to form first and second layers within the static filter pack. The dimensions of the filter cells in the first and second mechanical filter elements may be different from each other.

The mechanical filter apparatus may be configured periodically to clean the mechanical filter elements. The mechanical filter apparatus may comprise valve means for reversing the flow direction of the liquid through the filter chamber to perform a backwashing operation. Alternatively, or in addition, the mechanical filter apparatus may comprise means for modifying the flow rate of the liquid through the filter chamber to clean the mechanical filter elements. For example, the mechanical filter apparatus may comprise a variable speed pump and a controller. The controller may be configured to control the variable speed pump periodically to increase the flow rate of the liquid through the filter chamber to clean the mechanical filter elements. It has been determined that periodically increasing the flow rate of the liquid through the filter chamber (relative to the flow rate during filtration), for example by at least 25%, 50%, 100%, is effective to dislodge the filtered material from the mechanical filter elements. The water in the filter chamber may be purged to waste during the cleaning operation. The controller may be configured to control valve means, for example a solenoid valve, to connect an outlet from the filter chamber to waste.

The controller may be configured to perform the cleaning operation according to a predetermined time schedule, for example when the mechanical filter apparatus has been operating for a predetermined period of time. Alternatively, the controller may be configured to perform the cleaning operation when a predetermined volume of liquid has been filtered.

According to a further aspect of the present invention there is provided a mechanical filter apparatus comprising:
a filter chamber comprising a plurality of mechanical filter elements for forming a static filter pack to perform mechanical filtration of a liquid;
the mechanical filter apparatus is configured to generate a flow of the liquid through the mechanical filter elements during filtration to form the static filter pack. The mechanical filter elements may be of the type described herein.

The mechanical filter elements can have substantially neutral buoyancy, positive buoyancy or negative buoyancy in the liquid.

The filter chamber can comprise a first aperture for introducing liquid during filtration; and a second aperture for expelling liquid during filtration; wherein the first and second apertures are offset from each other. The first and second apertures can be offset from each other vertically and/or horizontally.

The mechanical filter elements can comprise mechanical filter elements having one or more filter cell. The one or more filter cell can have at least a first cell opening.

The filter chamber can be at least substantially sealed. The filter chamber can be formed in a pressure vessel. The mechanical filter apparatus can be configured to perform filtration at a pressure greater than atmospheric.

The mechanical filter apparatus may comprise means for introducing air into the filter chamber to break up or disrupt the static filter pack during backwashing. The air introduction means may comprise an air supply conduit for supplying air to one or more outlets in the filter chamber. The one or more outlets may be disposed at, or proximal to the base of the filter chamber. The filter chamber may be at least substantially sealed and the air introduction means may be configured to draw air into the air supply conduit as water is drained from the filter chamber. The mechanical filter apparatus may comprise a valve for controlling fluid flow through the air supply conduit.

The flow rate per unit surface area of the static filter pack is expressed in units of $m^3/m^2/h$ (i.e. the volume of water $(m^3)$ for a surface area of the filter $(m^2)$ per hour (h)). At least in certain embodiments, the mechanical filter apparatus may be configured to provide a flow rate per unit surface area of the static filter pack in the range 20 $m^3/m^2/h$ to 60 $m^3/m^2/h$; or 25 $m^3/m^2/h$ to 55 $m^3/m^2/h$; or 30 $m^3/m^2/h$ to 50 $m^3/m^2/h$. The mechanical filter apparatus may be configured to provide a flow rate per unit surface area of the static filter pack of approximately 30 $m^3/m^2/h$ for a low flow rate, and approximately 50 $m^3/m^2/h$ for a high flow rate. By way of example, if the filter chamber is formed in a cylindrical (or spherical) vessel having a diameter of 0.6 m, the low flow rate may correspond to approximately 8400 cubic litres per hour ($l^3/h$); and the high flow rate may correspond to approximately 14000 cubic litres per hour ($l^3/h$).

At least in certain embodiments the mechanical filter elements described herein may provide effective filtration of a liquid when formed in a relatively shallow static filter pack. For example, the depth of the static filter pack may be in the range 10 cm to 50 cm; 10 cm to 40 cm; 15 cm to 40 cm; 15 cm to 30 cm; or 15 cm to 25 cm. In certain embodiments the static filter pack may have a depth of approximately 20 cm.

The mechanical filter apparatus may be configured periodically to clean the mechanical filter elements. The mechanical filter apparatus may comprise valve means for reversing the flow direction of the liquid through the filter chamber to perform a backwashing operation. Alternatively, or in addition, the mechanical filter apparatus may comprise means for modifying the flow rate of the liquid through the filter chamber to clean the mechanical filter elements. For example, the mechanical filter apparatus may comprise a variable speed pump and a controller. The controller may be configured to control the variable speed pump periodically to increase the flow rate of the liquid through the filter chamber to clean the mechanical filter elements. It has been determined that periodically increasing the flow rate of the liquid through the filter chamber (relative to the flow rate during filtration), for example by at least 25%, 50%, 100%, is effective to dislodge the filtered material from the mechanical filter elements. With reference to the flow rates provided above for a filter chamber having a diameter of 0.6 m by way of example, the filtration may be performed at a low flow rate, for example approximately 8400 cubic litres per hour ($l^3/h$); and the cleaning operation may be performed by switching to a high flow rate, for example approximately 14000 cubic litres per hour ($l^3/h$). The water in the filter chamber may be purged to waste during the cleaning operation. The controller may be configured to control valve means, for example a solenoid valve, to connect an outlet from the filter chamber to waste. The valve means may comprise a Y-piece operable selectively to connect the filter chamber either to a return line (for supplying the filtered water) or to a waste conduit (for purging the filter chamber).

The controller may be configured to perform the cleaning operation according to a predetermined time schedule, for example when the mechanical filter apparatus has been operating for a predetermined period of time. Alternatively, the controller may be configured to perform the cleaning operation when a predetermined volume of liquid has been filtered.

According to a further aspect of the present invention there is provided a swimming pool filtration system comprising a mechanical filter apparatus as described herein.

According to a further aspect of the present invention there is provided a method of mechanically filtering a liquid, the method comprising:
 disposing a plurality of mechanical filter elements in a filter chamber, the mechanical filter elements each comprising one or more filter cell; and
 during filtration, passing the liquid through the filter chamber to establish a static filter pack of said mechanical filter elements to mechanically filter the liquid.

The mechanical filter elements can be of the type described herein. The mechanical filter elements can comprise mechanical filter elements having one or more filter cell. The one or more filter cell can have at least a first cell opening.

The mechanical filter elements can have substantially neutral buoyancy, or positive buoyancy. The method can comprise generating an up-flow of the liquid through the static filter pack during filtration.

The mechanical filter elements can have substantially neutral buoyancy, or negative buoyancy. The method can comprise generating a down-flow of the liquid through the static filter pack during filtration.

The method may comprise periodically cleaning the mechanical filter elements in the filter chamber. The cleaning process may be performed according to a predetermined time schedule, for example after filtration has been performed for a predetermined period of time. Alternatively, the cleaning process may be performed when a predetermined volume of liquid has been filtered.

The method can comprise periodically breaking up the static filter pack by agitating the mechanical filter elements to dislodge filtered particulates from said filter cells. The method of breaking up the static filter pack can comprise reversing the flow direction of the liquid in the filter chamber to agitate the mechanical filter elements. Alternatively, or in addition, the method can comprise introducing a gas, such as air, into the filter chamber to agitate the mechanical filter elements. The air may be drawn into the filter chamber through an air supply conduit. The filter chamber may be at least substantially sealed and the air may be drawn into the air supply conduit as water drains from the filter chamber. The method may comprise opening a valve for controlling fluid flow through the air supply conduit. Alternatively, or in addition, the method can comprise operating a mechanical agitator to agitate the mechanical filter elements. Alternatively, or in addition, the filter chamber can be agitated, for example by rotating or vibrating a filter housing.

The method can comprise periodically increasing the flow rate of liquid through the filter pack to clean the static filter pack. At least in certain embodiments, the filter pack can be cleaned without reversing the flow direction and/or changing the flow path of the liquid through the filter chamber. Rather, the flow rate of the liquid may be increased to purge filtered particulates from the static filter pack. The method may comprise increasing the flow rate of the liquid through the filter chamber (relative to the flow rate during filtration) by at least 25%, 50%, 75% or 100%. During a cleaning operation, the method can comprise diverting the liquid from the filter chamber to waste. Alternatively, the method can comprise opening a separate filter chamber outlet during the cleaning operation.

According to a still further aspect of the present invention there is provided a method of using an open cell filter element to perform mechanical filtration of a liquid, the method comprising:
 forming a filter pack comprising a plurality of said open cell filter elements and passing the liquid to be filtered through the filter pack to perform mechanical filtration.

According to a further aspect of the present invention there is provided a mechanical filter element for mechanically filtering particulates from a liquid, the mechanical filter element comprising:
 one or more first filter cell having a length greater than or equal to 5 mm and a first cross-sectional area; and
 one or more second filter cell having a length greater than or equal to 5 mm and a second cross-sectional area;
 said first and second cross-sectional areas being less than or equal to 10 $mm^2$;
 wherein the one or more first filter cell is configured to mechanically filter particulates having a smaller size than the particulates mechanically filtered by said one or more second filter cell.

The first and second filter cells can be sized to entrap particulates as small as 1 micron to 10 microns. The second filter cells can be larger than the first filter cells. The second filter cells can be configured to target larger particulates, for example in the range of 4 microns and above; and the first filter cell can be configured to target smaller particulates, for example in the range 1-4 microns.

According to a further aspect of the present invention there is provided a mechanical filter element for mechanically filtering particulates from a liquid, the mechanical filter element comprising:
 one or more first filter cell having a first length; and
 one or more second filter cell having a second length;
 wherein the first length is greater than the second length.

The first and second lengths (measured along a longitudinal axis of the mechanical filter element) are different. This configuration may influence the flow within the first and second filter cells and affect their respective filtration properties. For example, the first filter cell, which is longer that the second filter cell, may prove more effective at filtering small particulates (for example in the range 1-4 microns) due to a reduced flow speed. The different lengths of the first and second filter cells may render the mechanical filter element more suitable for operating in filter apparatus having different through flow rates.

According to a still further aspect of the present invention there is provide a conversion kit for converting a swimming pool filter apparatus, the conversion kit comprising:

a plurality of mechanical filter elements for forming a static filter pack in a filter chamber to perform mechanical filtration, the mechanical filter elements each comprising one or more filter cell; and means for introducing air into the filter chamber to break up or disrupt the static filter pack during backwashing. The mechanical filter elements may be of the type described herein. The mechanical filter elements may each comprise one or more filter cell. The one or more filter cell may have an open cell structure.

The air introduction means may be configured to draw air into the air supply conduit as water is drained from the filter chamber. The air introduction means may comprise an air supply conduit and a valve for controlling flow through the air supply conduit. The conversion kit may comprise a drainage valve for controlling drainage from the filter chamber.

According to a still further aspect of the present invention there is provided a method of converting a swimming pool filter apparatus, the swimming pool filter apparatus comprising a control valve, a filter chamber, a drainage port, a first conduit for introducing water from the swimming pool to the filter chamber, and a second conduit for returning water to the swimming pool, the method comprising:

introducing a plurality of mechanical filter elements into the filter chamber to form a static filter pack to perform mechanical filtration, the mechanical filter elements each comprising one or more filter cell; and connecting means for introducing air into the filter chamber to break up or disrupt the static filter pack during backwashing.

The method may comprise connecting the air introduction means to the second conduit such that, in use, air is introduced into the filter chamber through said second conduit to agitate the mechanical filter elements. The method may comprise modifying or replacing the control valve to enable the second conduit selectively to be connected to the air introduction means.

The method may comprise connecting a drainage valve to the drainage port of the swimming pool filter apparatus.

The term up-flow is used herein to describe a flow which is predominantly in an upwards direction. Conversely, the term down-flow is used to describe a flow which is predominantly in a downwards direction.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIGS. 26A-Q are cross-sectional views of mechanical filter elements in accordance with further embodiments of the present invention; and FIGS. 27A-F are cross-sectional views of mechanical filter elements in accordance with further embodiments of the present invention.

DETAILED DESCRIPTION

A mechanical filter apparatus 1 and mechanical filter elements 2 in accordance with aspects of the present invention will now be described with reference to FIGS. 3 to 11. The mechanical filter apparatus 1 is operable in a filtration mode and a backwash mode. When the mechanical filter apparatus 1 is operating in said filtration mode, the mechanical filter elements 2 mechanically filter the liquid by trapping particulates suspended therein. The trapped particulates can subsequently be dislodged to clean the mechanical filter elements 2 when the mechanical filter apparatus 1 operates in said backwash mode. The filtered particulates can be flushed from the mechanical filter apparatus 1 during the backwash mode or during a separate waste (purge) cycle.

Figure 3:
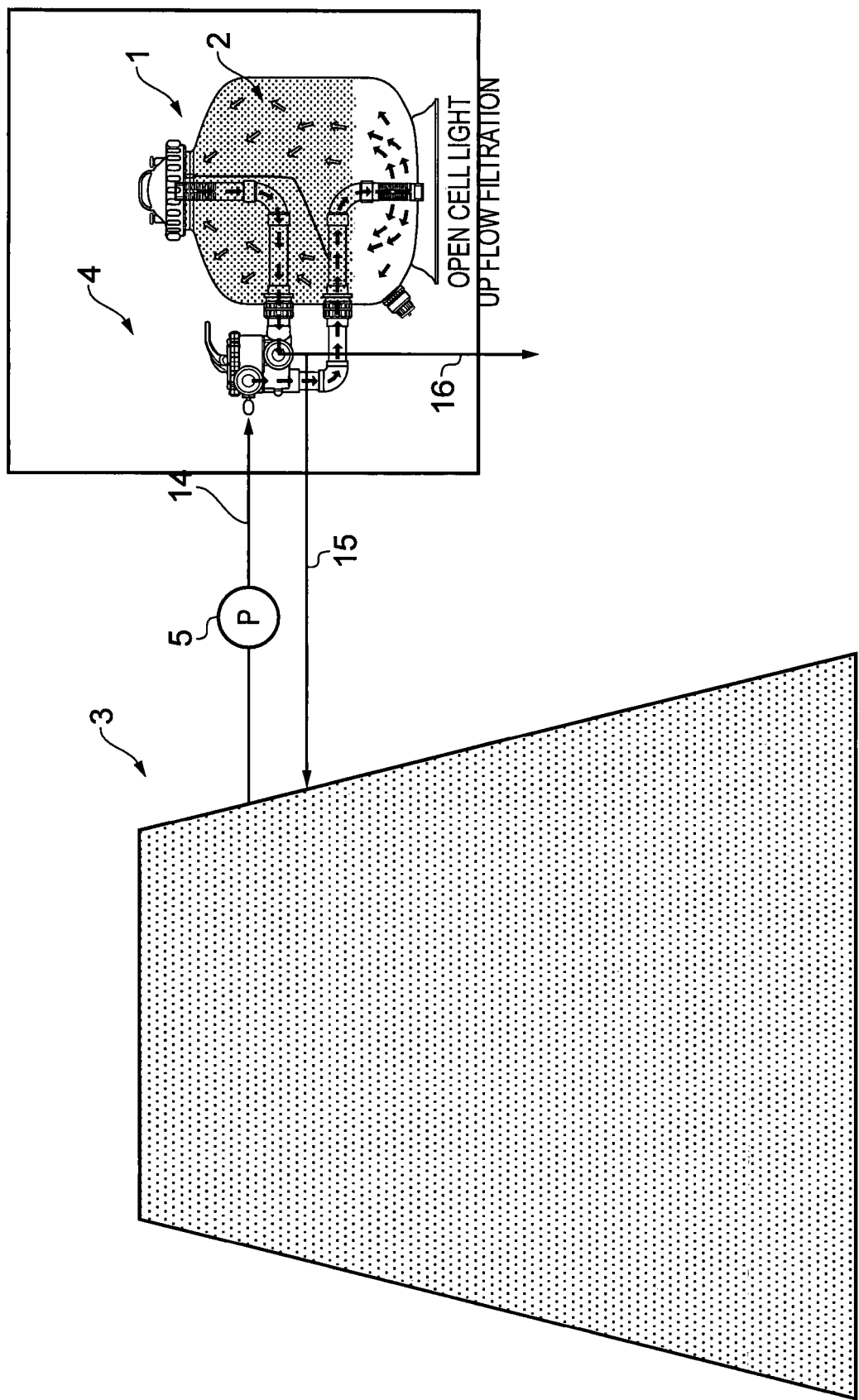
FIG. 3 shows a schematic representation of a swimming pool filter system incorporating a swimming pool filter apparatus in accordance with an embodiment of the present invention.

As shown in FIG. 3, the mechanical filter apparatus 1 in the present embodiment is configured to mechanically filter the water in a swimming pool 3. The water in the swimming pool 3 is treated to suppress biological activity, for example by adding salt, chlorine or ozone gas, and the mechanical filter apparatus 1 and the mechanical filter elements 2 are configured exclusively to perform mechanical filtration. Thus, the mechanical filter apparatus 1 and the mechanical filter elements 2 do not perform biological filtration. The mechanical filter apparatus 1 is incorporated into a swimming pool filtration system 4 incorporating a pump 5. As described herein, the mechanical filter elements 2 have an open cell configuration for mechanically filtering the water to remove particulates. At least in certain embodiments, the mechanical filter elements 2 can filter particulates as small as 1 to 4 microns.

Figure 4:
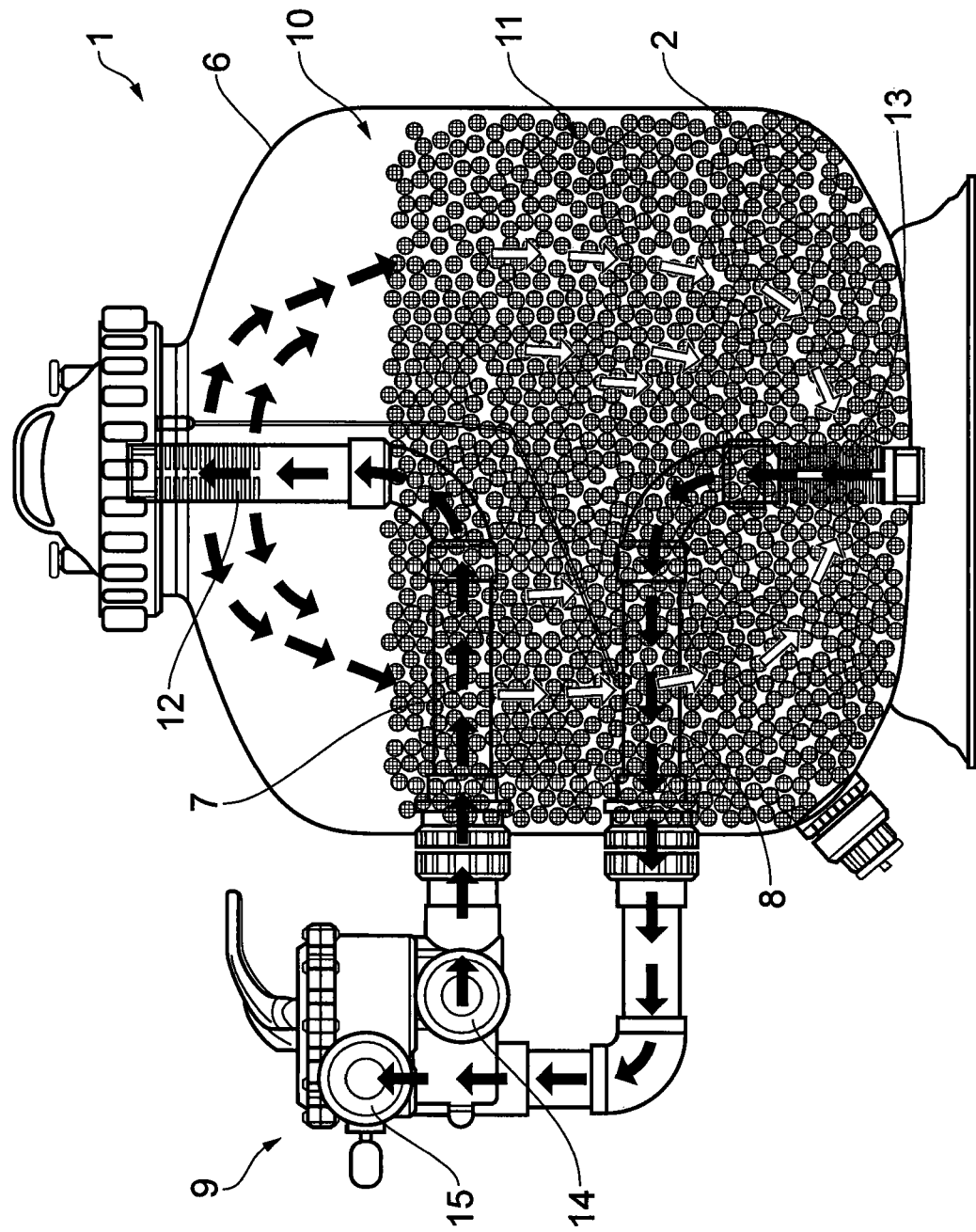
FIG. 4 shows a schematic representation of the swimming pool filter apparatus in accordance with an embodiment of the present invention.

With reference to FIG. 4, the mechanical filter apparatus 1 comprises a filter housing 6, a first conduit 7, a second conduit 8 and a control valve 9. The control valve 9 may, for example, comprise a multi-port valve operable to open and close the first conduit 7 and/or the second conduit 8. The filter housing 6 defines a filter chamber 10 containing a plurality of said mechanical filter elements 2 which form a static filter pack (denoted generally by the reference numeral 11). During filtration, the mechanical filter elements 2 in the static filter pack 11 remain at least substantially static to enable the water to be mechanically filtered. The mechanical filter elements 2 in the present embodiment have a specific gravity which is approximately one (equivalent to a density of approximately 1 g/cm$^3$). Thus, the mechanical filter elements 2 have substantially neutral buoyancy in water. The location of the static filter pack 11 within the filter chamber 10 is determined by the direction of flow through the filter chamber 10. The first conduit 7 comprises a first aperture 12 disposed in an upper portion of the filter chamber 10; and the second conduit 8 comprises a second aperture 13 disposed in a lower portion of the filter chamber 10. A mesh or grill is provided at the first and second apertures 12, 13 to prevent the mechanical filter elements 2 entering the first and second conduits 7, 8 respectively. The pump 5 pumps water from the swimming pool 3 to the mechanical filter apparatus 1. In the present embodiment, the filter housing 6 is a pressure vessel and the filter chamber 10 is sealed. The filter chamber 10 has a transverse cross-section which is circular. In the present embodiment the filter chamber 10 has a diameter of approximately 0.6 m (having a maximum cross-sectional area of approximately 0.28 m$^2$). It will be understood that the mechanical filter elements 2 described herein can be used in a range of filter apparatus and are not limited to a particular size of filter chamber 10. The filter chamber 10 is sealed to enable filtration to be performed at pressures greater than atmospheric pressure. The mechanical filter apparatus 1 can operate irrespective of the height of the filter chamber 10 to the water in the swimming pool 3.

The mechanical filter apparatus 1 is connected to the swimming pool 3 by a supply conduit 14 and a return conduit 15. The supply conduit 14 is configured to supply unfiltered water from the swimming pool 3; and the return conduit 15 is configured to return filtered water to the swimming pool 3. The pump 5 is disposed in the supply conduit 14 to pump water from the swimming pool 3 to the filter chamber 10. In alternate arrangements, the pump 5 could be located in the return conduit 15. The water contains particulates which are held in suspension. The mechanical filter elements 2 described herein are configured to mechanically filter particulates, for example 1-10 micron particulates. The supply conduit 14 and the return conduit 15 are connected to the control valve 9. A waste drain conduit 16 is also connected to the control valve 9 to enable the filter chamber 10 to be purged during backwashing. The control valve 9 is operable to change the connections between the first conduit 7, the second conduit 8, the supply conduit 14, the return conduit 15 and the waste drain conduit 16. The control valve 9 can thereby control the operating mode of the mechanical filter apparatus 1.

Figure 5:
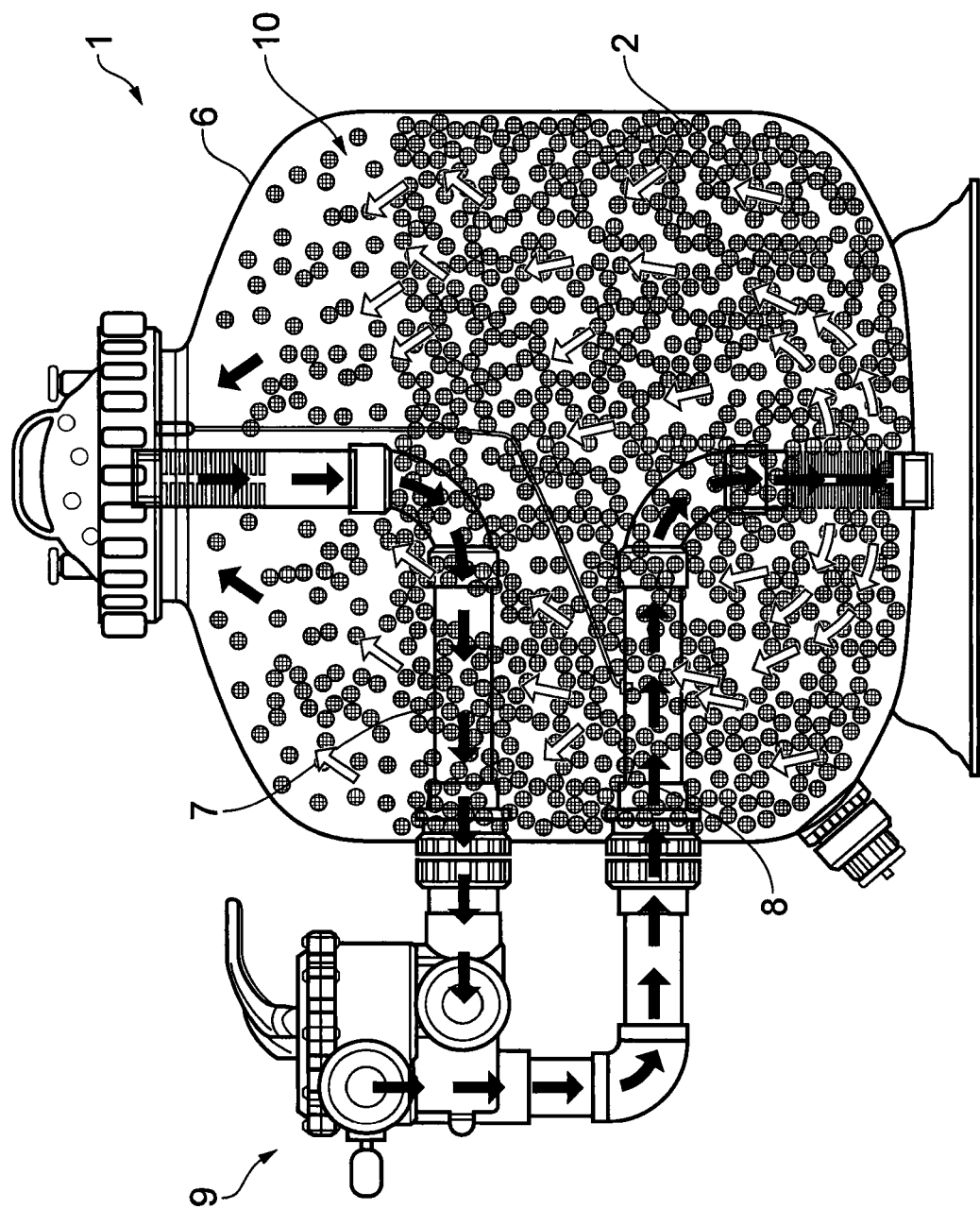
FIG. 5 shows a schematic representation of the swimming pool filter shown in FIG. 7 during a backwashing operation.

The flow direction through the first and second conduits 7, 8 (and therefore through the filter chamber 10) is reversible depending on the operating mode of the mechanical filter apparatus 1. The mechanical filter apparatus 1 is configured such that, when operating in said filtration mode, the control valve 9 connects the supply conduit 14 to the first conduit 7; and the return conduit 15 to the second conduit 8. As illustrated in FIG. 4, a down-flow of water is established through the filter chamber 10 during filtration. The down-flow displaces the mechanical filter elements 2 downwardly such that the static filter pack 11 is formed at the bottom of the filter chamber 10. The mechanical filter apparatus 1 is configured such that, when operating in said backwash mode, the control valve 9 connects the supply conduit 14 to the second conduit 8; and connects the first conduit 7 to the waste drain conduit 16. As illustrated in FIG. 5, an up-flow of water is established through the filter chamber 10 during backwashing. The up-flow disrupts the static filter pack 11 and dislodges trapped particulates from the mechanical filter elements 2. In order to allow adequate movement of the mechanical filter elements 2, the filter chamber 10 is typically 50-70%, or 30-60% filled by volume with said mechanical filter elements 2. However, the filter chamber 10 can comprise a higher or lower percentage by volume of the mechanical filter elements 2.

Figure 6:
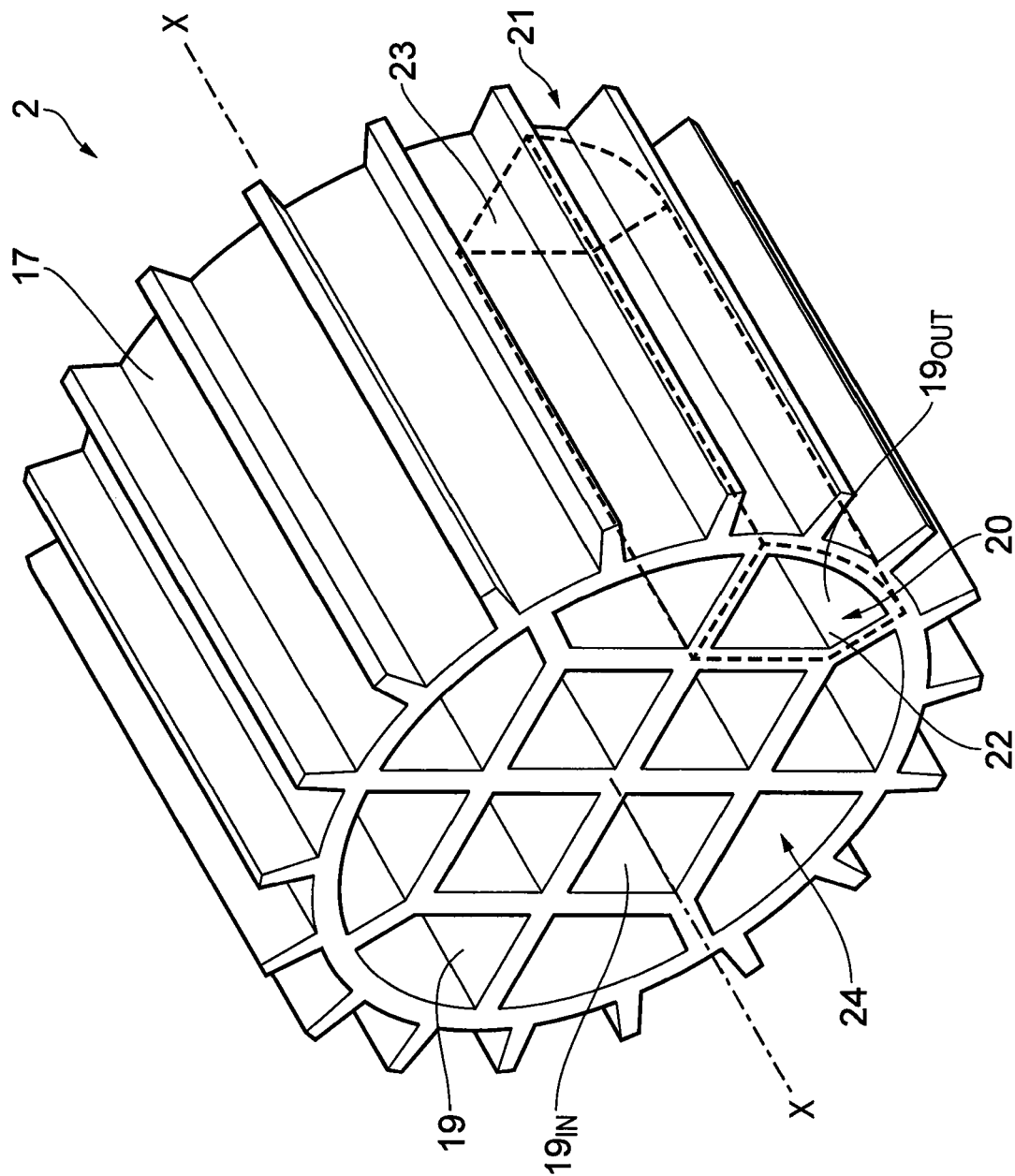
FIG. 6 shows a perspective view of a mechanical filter element in accordance with an embodiment of the present invention.

The mechanical filter elements 2 will now be described with reference to FIGS. 6, 7 and 8. The mechanical filter elements 2 in the present embodiment are extrusion moulded from a polymer. It will be understood that the mechanical filter elements 2 can be fabricated using other techniques, such as injection moulding or press-forming. As shown in FIG. 6, the mechanical filter elements 2 have a substantially constant cross-section along their length. In the present embodiment, the mechanical filter elements 2 have a density of approximately 1 g/cm$^3$ and are substantially neutrally buoyant in water. In alternate arrangements, the mechanical filter elements 2 can have positive buoyancy in water (i.e. a density <1 g/cm$^3$) or negative buoyancy in water (i.e. a density >1 g/cm$^3$). The polymer used to form the mechanical filter elements 2 can be selected depending on the required buoyancy level. For example, high density polyethylene can be used to form positively buoyant mechanical filter elements 2; and acrylonitrile-butadiene-styrene (ABS) can be used to form negatively buoyant mechanical filter elements 2. It will be appreciated that fillers and other materials can be added to the polymer to alter the density of the mechanical filter elements 2. For example, a filler comprising talc may be added to high density polyethylene to form a mechanical filter element 2 having negative buoyancy. The mechanical filter elements 2 in the mechanical filter apparatus 1 have substantially the same configuration in the present embodiment. The composition of one of said mechanical filter elements 2 will now be described by way of example.

Figure 7:
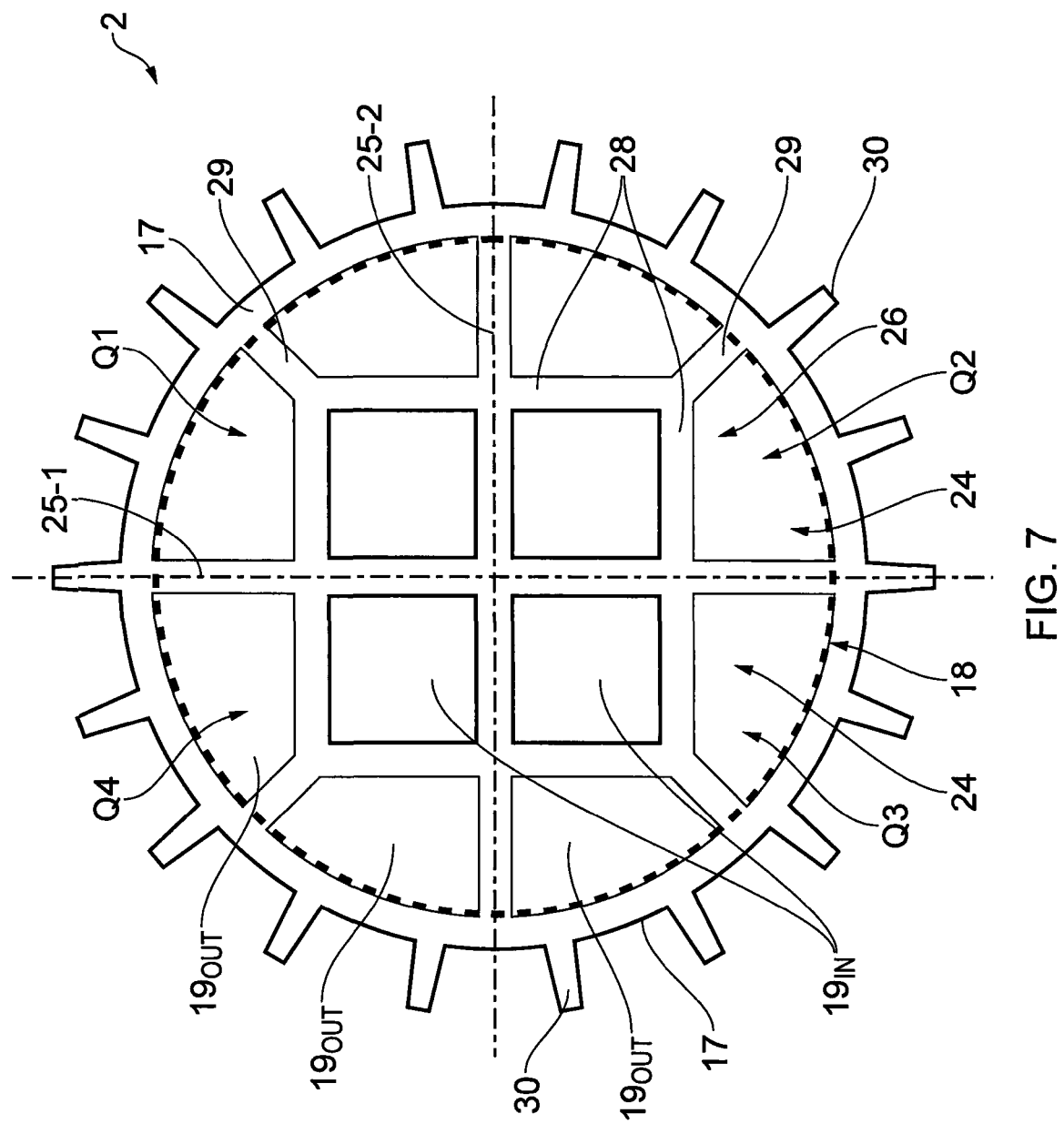
FIG. 7 shows an end elevation of the mechanical filter element shown in FIG. 6.

With reference to FIGS. 6 and 7, the mechanical filter element 2 comprises a cylindrical wall 17 which is open at each end. The cylindrical wall 17 has a central longitudinal axis X and a substantially circular profile. The cylindrical wall 17 defines a filter area 18 (represented by a dashed circular line in FIG. 6) comprising a plurality of filter cells 19. The filter cells 19 are open cells for trapping particulates to perform filtration. The filter cells 19 are elongated and in the present embodiment form conduits extending along the length of the mechanical filter element 2. As shown in FIG. 6, the filter cells 19 each have a first end 20 and a second end 21. A first filter cell opening 22 is formed at said first end 20 and a second filter cell opening 23 is formed at said second end 21. Thus, the first and second ends of the filter cell 19 are both open. In a variant, the filter cells 19 could be open at the first end 20 and closed at the second end 21. In a further variant, the first and second ends 20, 21 of the conduit could both be open, but an intermediate closure wall could be disposed between the first and second ends 20, 21 to form two separate filter cells. The term "open cell filter element" is used herein to define the mechanical filter element 2. In the present embodiment, the filter area 18 comprises inner filter cells 19IN and outer filter cells 19OUT. The outer filter cells 19OUT are disposed radially outside the inner filter cells 19IN.

An internal frame 24 is formed inside said cylindrical wall 17 to sub-divide the filter area 18 to form said filter cells 19. The internal frame 24 is formed integrally with the cylindrical wall 17 during moulding of the mechanical filter element 2. The internal frame 24 forms a separation wall between the filter cells 19. The cylindrical wall 17 and the internal frame 24 are nonporous. It will be appreciated therefore that the sides of the filter cells 19 are impermeable, thereby inhibiting fluid flow between adjacent filter cells 19. The internal frame is configured to increase the rigidity of the mechanical filter element 2 to reduce deformation under load.

In the present embodiment, the internal frame 24 comprises first and second diametrical walls 25-1, 25-2; a rectangular frame 26; and a plurality of radial members 27. The first and second diametrical walls 25-1, 25-2 are arranged perpendicular to each other and divide the filter area 18 into four (4) quadrants Q1-4. The rectangular frame 26 comprises four side walls 28 disposed perpendicular to each other and having equal length so as to form a square. The rectangular frame 26 is centred on said central longitudinal axis X such that the first and second diametrical walls 25-1, 25-2 bisect the side walls 28. The first and second diametrical walls 25-1, 25-2 and the rectangular frame 26 form said inner filter cells 19IN. In the present embodiment, there are four (4) of said inner filter cells 19IN each having a substantially square cross-sectional profile. The internal frame 24 comprises four radial walls 29 which extend radially outwardly from the corners of the rectangular frame 26 to the cylindrical wall 17. The outer filter cells 19OUT are formed by the cylindrical wall 17, the radial walls 29 and the side walls 28. In the present embodiment, there are eight (8) outer filter cells 19OUT each having substantially the same cross-sectional profile. As shown in FIG. 7, the side walls 28 and the radial walls 29 split each quadrant Q1-4 into three filter cells 19. Thus, the mechanical filter element 2 in the present embodiment consists of twelve (12) filter cells 19. The mechanical filter element 2 also comprises a plurality of fins 30 projecting radially outwardly from an outer surface of the cylindrical wall 17. In the present embodiment, the mechanical filter element 2 comprises eighteen of said fins 30 evenly distributed around the circumference of the mechanical filter element 2. The spacing between the fins 30 is larger than the width of each fin 30 to reduce the likelihood of the mechanical filter elements 2 interlocking with each other.

Figure 8B:
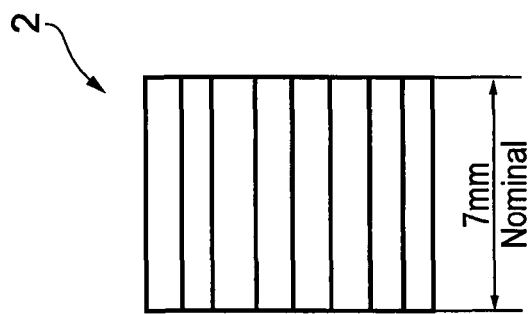
FIG. 8B is a side elevation of the mechanical filter element including dimensions.
Figure 8A:
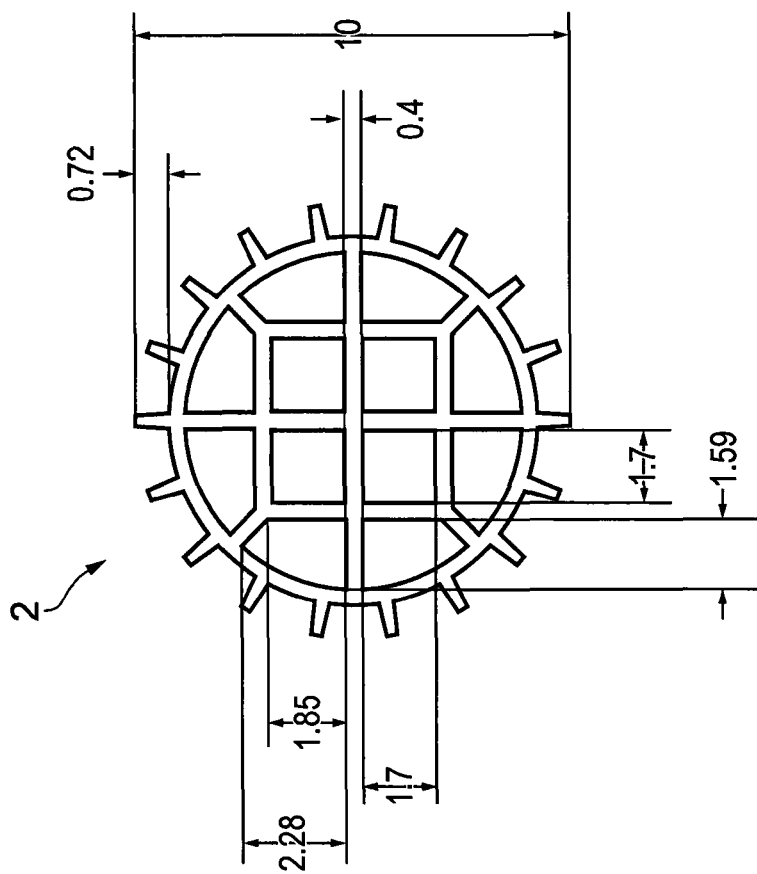
FIG. 8A is an end elevation of the mechanical filter element including dimensions.

The dimensions (quoted in millimetres) of the mechanical filter element 2 in accordance with the present embodiment are shown in FIGS. 8A and 8B. The cross-sectional areas of the filter cells 19 are defined in a reference plane disposed perpendicular to the longitudinal axis X of the mechanical filter element 2. The mechanical filter element 2 has a length of approximately 7 mm along the longitudinal axis X. The cylindrical wall 17 has an internal diameter of approximately 7.88 mm. Accordingly, the filter area 18 is approximately 47.54 mm$^2$. The walls making up the internal frame 24 each have a thickness of 0.4 mm. The inner filter cells 19IN have internal dimensions of 1.7 mm×1.7 mm. A cross-sectional area of each inner filter cell 19IN is approximately 2.89 mm$^2$ and the internal volume is approximately 20.23 mm3. The outer filter cells 19OUT have internal dimensions of 2.28 mm×1.59 mm. A cross-sectional area of each outer filter cells 19OUT is approximately 2.85 mm$^2$ and the internal volume is approximately 19.95 mm3. The fins 30 have a radial length of approximately 0.72 mm and a thickness of 0.3 mm in the present embodiment. The fins 30 extend along the length of the mechanical filter element 2. The diameter of the mechanical filter element 2 measured from the tips of diametrically opposed fins 30 is 10 mm. The mechanical filter elements 2 have a mass-to-volume ratio in the range 150 to 200 kg/m3 in the present embodiment. The configuration of the mechanical filter elements 2 is such that they constitute approximately 15% of the static filter pack 11 by volume and the remaining approximately 85% is water.

Figure 9:
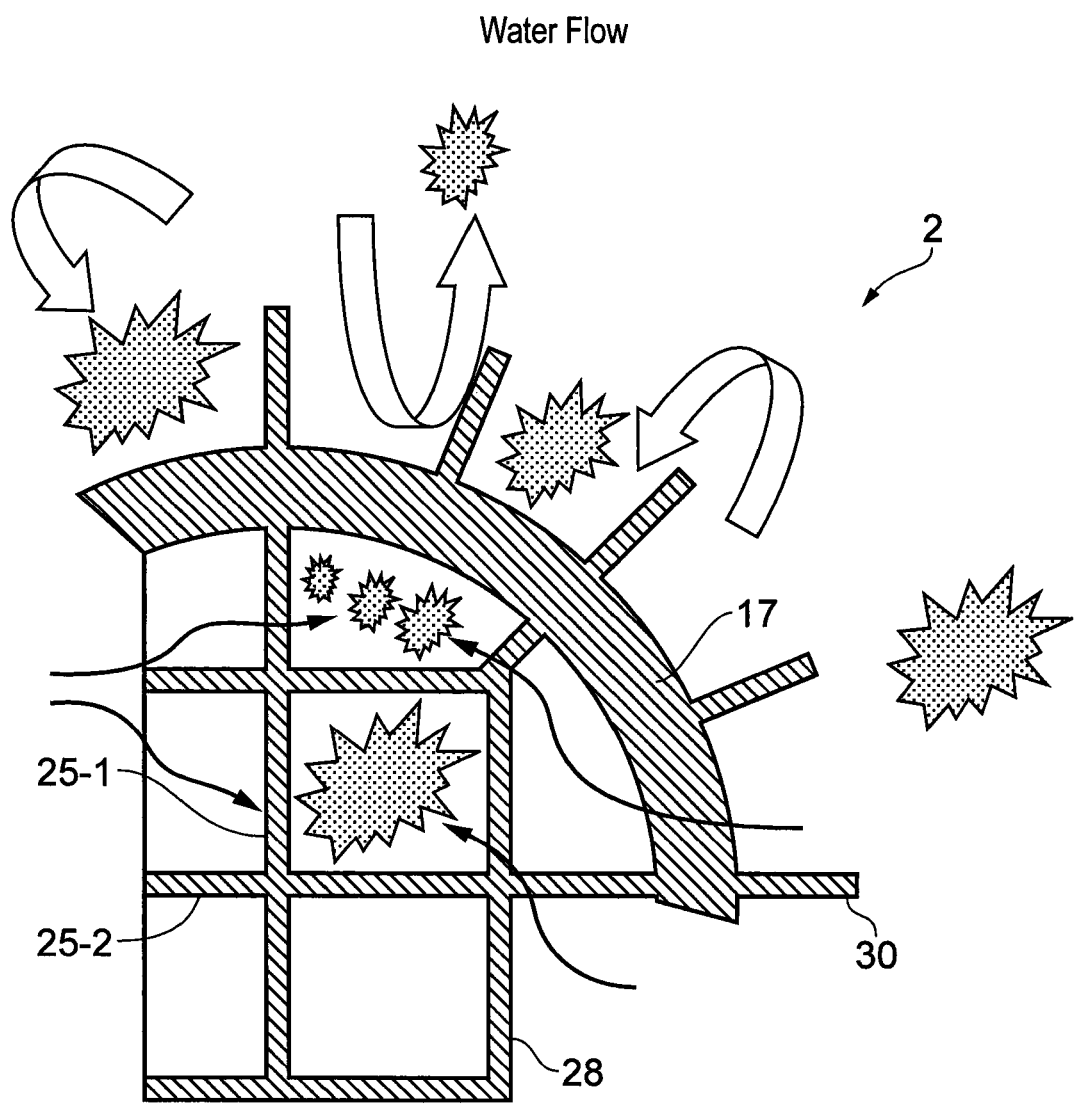
FIG. 9 illustrates the mechanism by which the mechanical filter element shown in FIG. 6 mechanically filters particulates from water.

The operation of the mechanical filter apparatus 1 according to the present embodiment will now be described with reference to FIGS. 4 and 5. The mechanical filter elements 2 are adapted to perform mechanical filtration to remove particulates from water supplied from the swimming pool 3. The mechanical filter elements 2 are disposed in the filter chamber 10 and collectively form the static filter pack 11. When the mechanical filter apparatus 1 is operating in said filtration mode, the control valve 9 is configured to connect the supply conduit 14 to the first conduit 7; and to connect the second conduit 8 to the return conduit 15. The water is introduced into the filter chamber 10 through the first aperture 12 disposed at the top of the filter chamber 10 and to exit through the second aperture 13 disposed at the bottom of the filter chamber 10. The vertical offset between the first and second apertures 12, 13 establishes a down-flow of water through the filter chamber 10, as illustrated by the arrows in FIG. 4. As the mechanical filter elements 2 have neutral buoyancy, they are transported by the down-flow towards the bottom of the filter chamber 10 where the static filter pack 11 forms. The mechanical filter elements 2 are substantially stationary within the static filter pack 11 during filtration due to the continued flow of water through the filter chamber 10. Once formed, the static filter pack 11 is operative to mechanically filter the water by trapping particulates. Specifically, the water flows between the mechanical filter elements 2 in the static filter pack 11 and flows into the filter cells 19 through the first and second filter cell openings 22, 23. The energy of the particulates suspended in the water is dissipated as they travel through the static filter pack 11, for example as they come into contact with the mechanical filter elements 2 and the fins 30. The water within the filter cells 19 tends to have a lower velocity than the flow paths between the mechanical filter elements 2, which may further reduce the energy available to suspend particulates in the water. Indeed, the water may be stagnant within at least some of the filter cells 19. The particulates coagulate (flocculation) and are drawn (or pushed) into the voids formed in the filter cells 19. The mechanism whereby the particulates are trapped in the filter cells 19 is illustrated in FIG. 9. The configuration of the mechanical filter elements 2, including the relationship between the cross-sectional area and the length of the filter cells 19, creates a still-water zone resistant to flow through the body of the static filter pack 11 to prevent loss of the retained particulate material. The particulates are mechanically trapped by the mechanical filter elements 2 making up the static filter pack 11. The water is thereby mechanically filtered by the mechanical filter elements 2 in the static filter pack 11 and the filtered water is returned to the swimming pool 3 via the second conduit 8 and the return conduit 15.

A "quiet" retaining zone is thereby formed in the filter cells 19 when the mechanical filter elements 2 are formed into said static filter pack 11. The particulates suspended in the liquid may settle in the filter cells 19 and/or on an exterior of the mechanical filter elements 2. During filtration, there is insufficient flow through the filter cells 19 to disturb the entrapped particulate matter. A variety of factors influence the fluid dynamics within the filter cells 19, for example one or more of the following: surface area of the filter cells 19, cross-sectional shape of the filter cells 19, and length of the filter cells 19. By modifying one or more of these factors, the mechanical filter elements 2 can be configured to filter particulates having different sizes.

Figure 10:
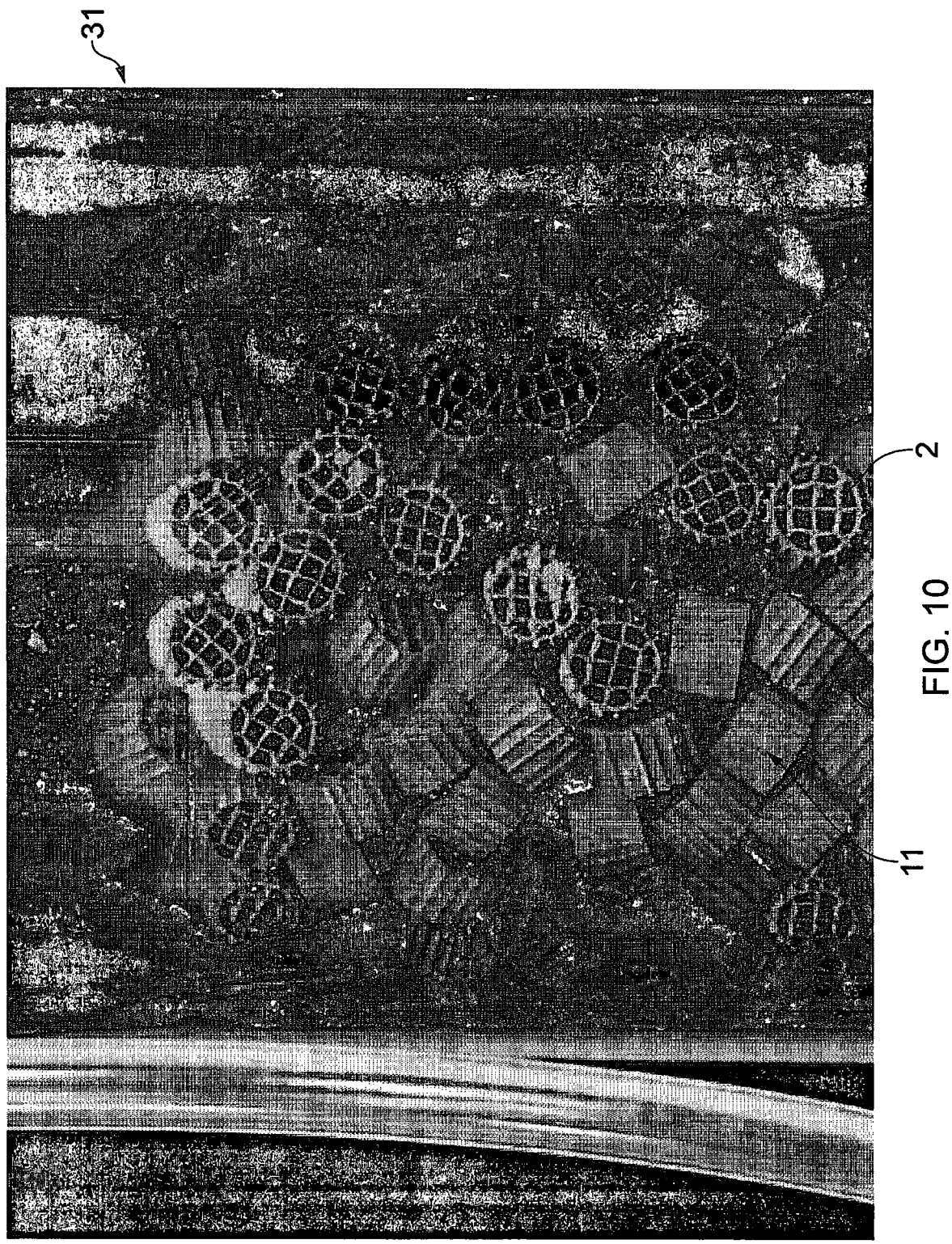
FIGS. 10 and 11 are images showing the settlement of particulates on the mechanical filter elements and within the filter cells.
Figure 11:
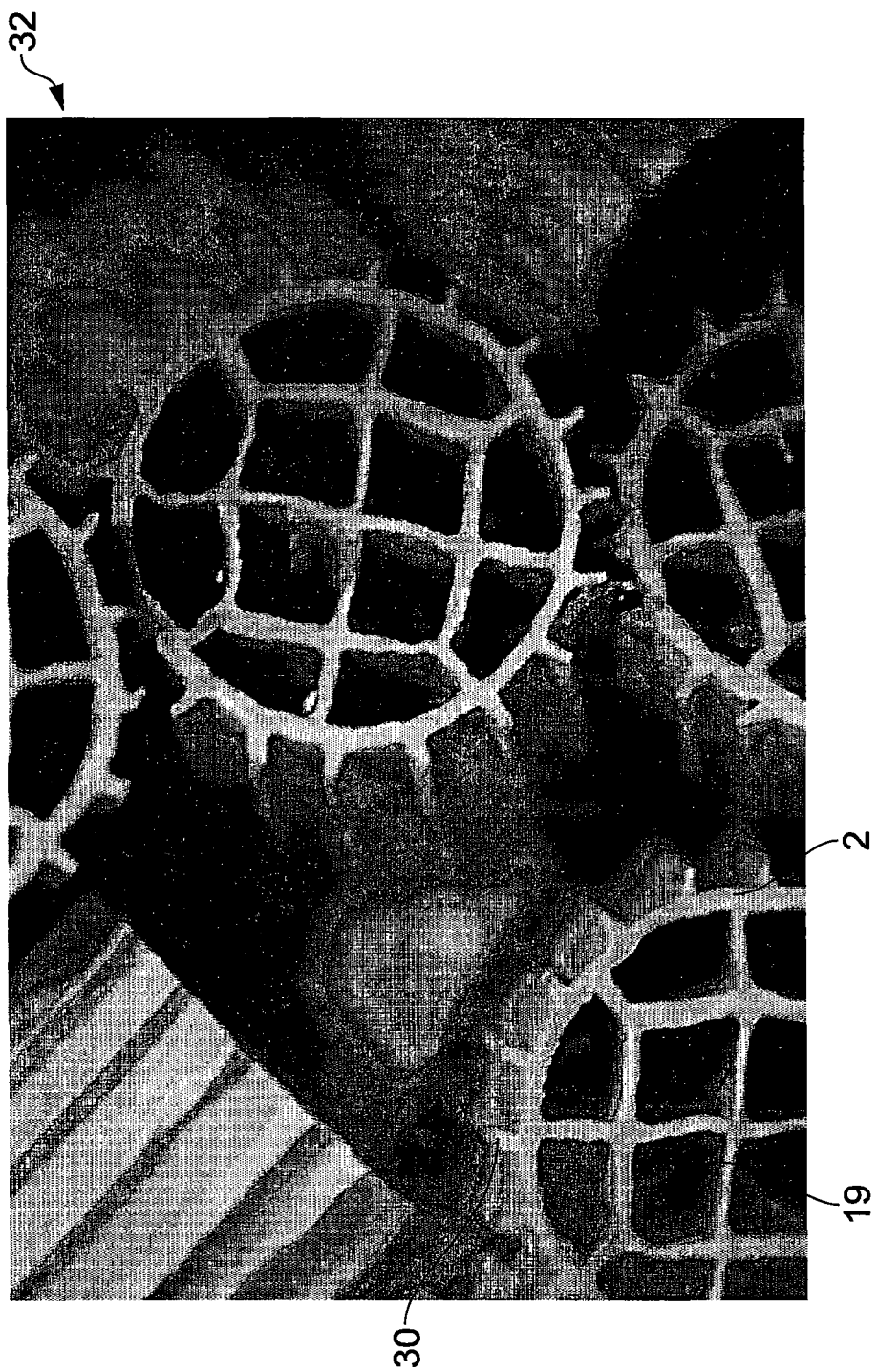

FIGS. 10 and 11 are first and second images 31, 32 showing the settlement of particulate material in the static filter pack 11. The first and second images 31, 32 are photographs taken in a test apparatus comprising a transparent housing. The first and second images 31, 32 are taken during the early stages of a retention capacity test for the static filter pack 11. As shown in FIG. 10, the particulate material is deposited on an exterior surface of the mechanical filter elements 2 between the fins 30; and also within the filter cells 19. An enlarged view of the mechanical filter elements 2 is shown in FIG. 11.

Figure 12:
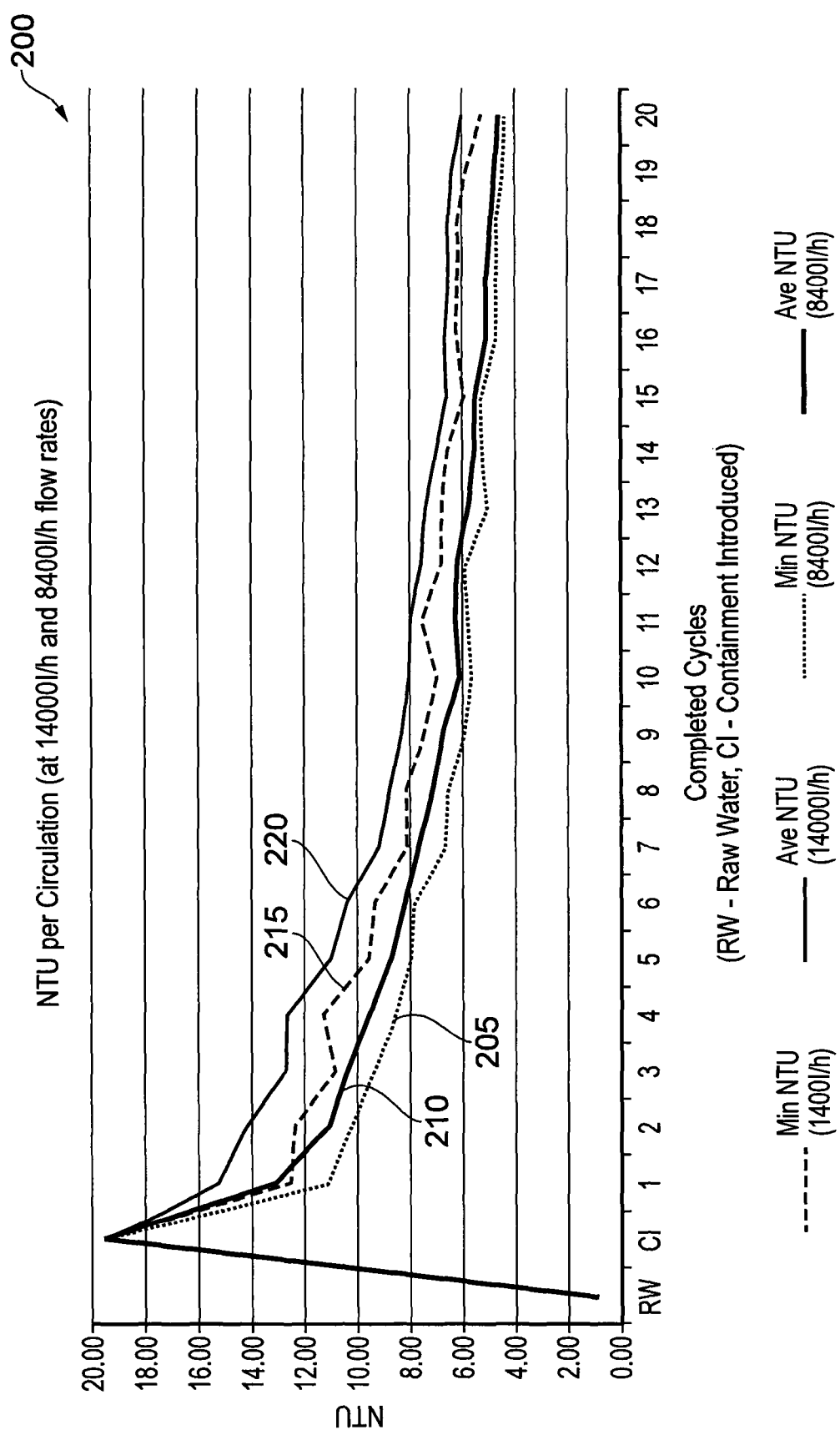
FIG. 12 is a first graph representing the Nephelometric Turbidity Units (NTU) of a water sample filtered using the swimming pool filter apparatus in accordance with an embodiment of the present invention.

The performance of the mechanical filter apparatus 1 to mechanically filter particulates from a sample of water will now be described with reference to FIGS. 12 and 13. A first graph 200 is shown in FIG. 12 representing the measured Nephelometric Turbidity Units (NTU) following introduction of a contaminant into a water sample for a series of filtration and cleaning operations. The test was performed for a first flow rate of 8400 cubic litres per hour ($l^3$/h) (providing a flow rate per unit surface area of the static filter pack of approximately 30 $m^3/m^2$/h); and a second flow rate of 14000 cubic litres per hour ($l^3$/h) (providing a flow rate per unit surface area of the static filter pack for the static filter pack 11 of approximately 50 $m^3/m^2$/h). A first plot 205 shows a minimum NTU measurement at the first flow rate; and a second plot 210 shows an average NTU measurement at the first flow rate. A third plot 215 shows a minimum NTU measurement at the second flow rate; and a fourth plot 220 shows an average NTU measurement at the second flow rate.

Figure 13:
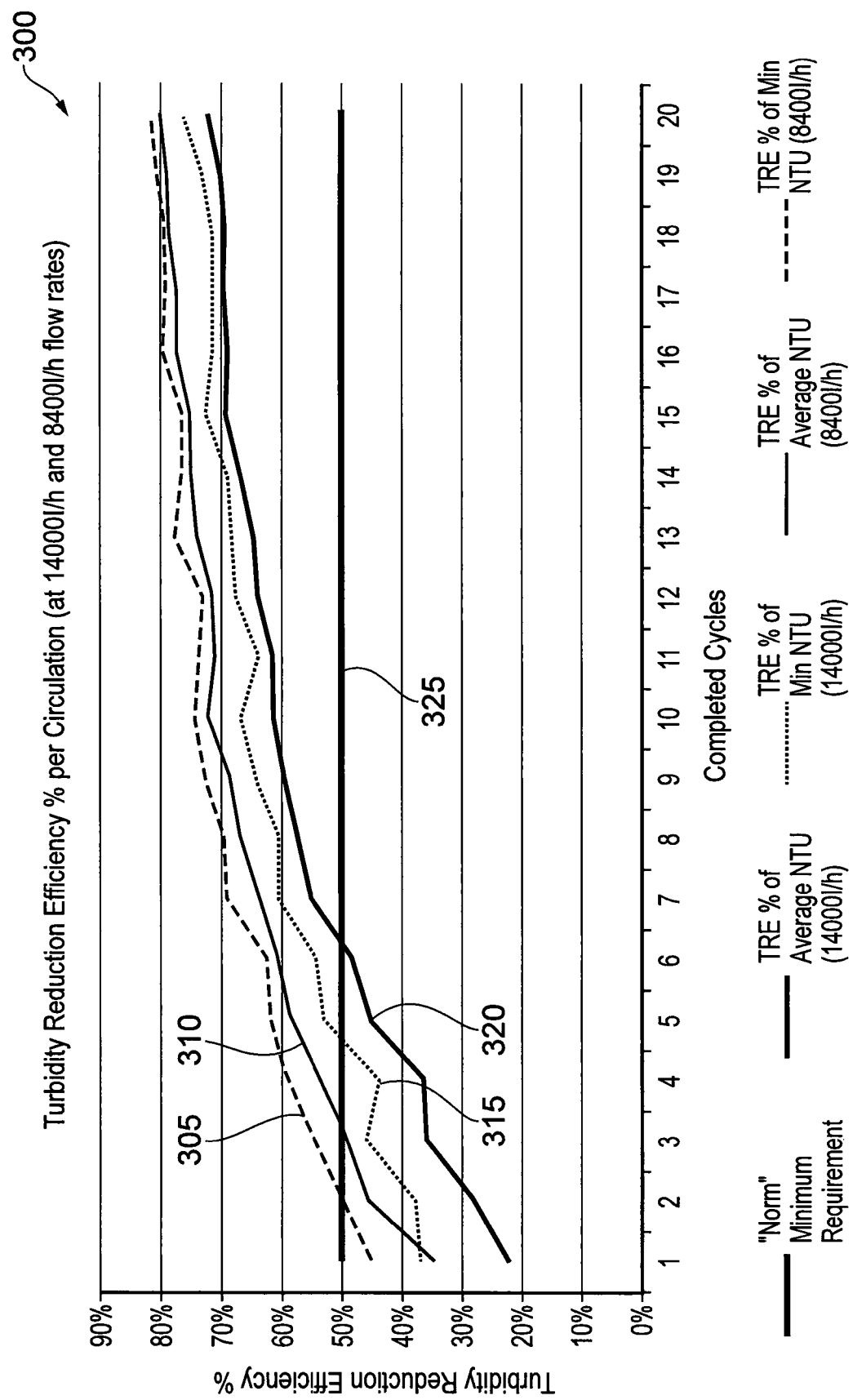
FIG. 13 is a second graph representing the turbidity reduction efficiency of a water sample filtered using the swimming pool filter apparatus in accordance with an embodiment of the present invention.

A second graph 300 is shown in FIG. 13 representing the turbidity reduction efficiency (TRU) (%) following introduction of a contaminant into a water sample for a series of filtration and cleaning operations. The test was performed for a first flow rate of 8400 cubic litres per hour ($l^3$/h) (providing a flow rate per unit surface area of the static filter pack for the static filter pack 11 of approximately 30 $m^3/m^2$/h); and a second flow rate of 14000 cubic litres per hour ($l^3$/h) (providing a flow rate per unit surface area of the static filter pack for the static filter pack 11 of approximately 50 $m^3/m^2$/h). A first plot 305 shows a minimum TRU at the first flow rate; and a second plot 310 shows an average TRU at the first flow rate. A third plot 315 shows a minimum TRU at the second flow rate; and a fourth plot 320 shows an average TRU measurement at the second flow rate. A minimum TRU requirement of 50% is represented by a fifth plot 325 in FIG. 13.

Figure 14:
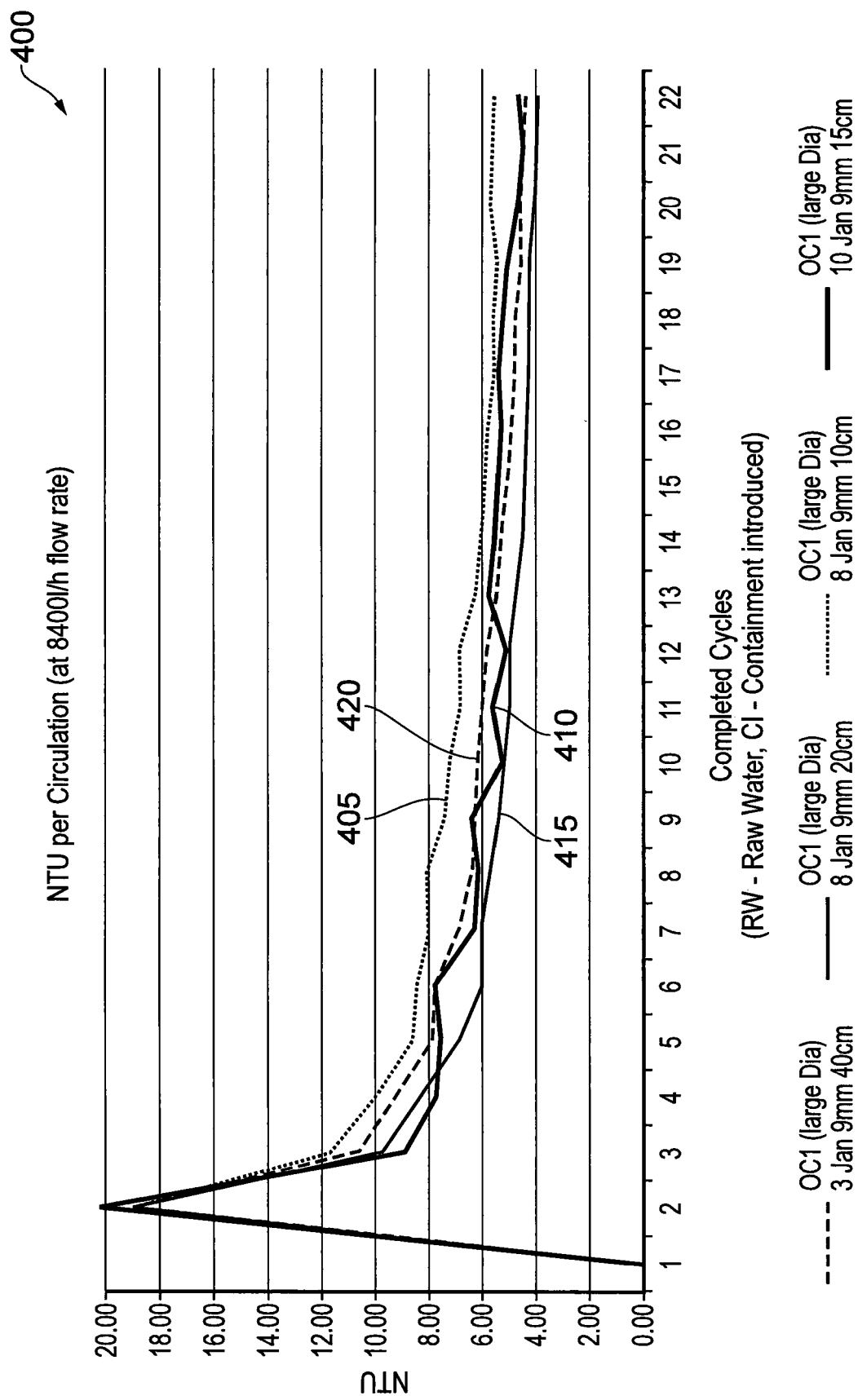
FIG. 14 is a third graph representing the Nephelometric Turbidity Units (NTU) of a water sample filtered through different depths of static filter packs formed from mechanical filter elements in accordance with an embodiment of the present invention.
Figure 15:
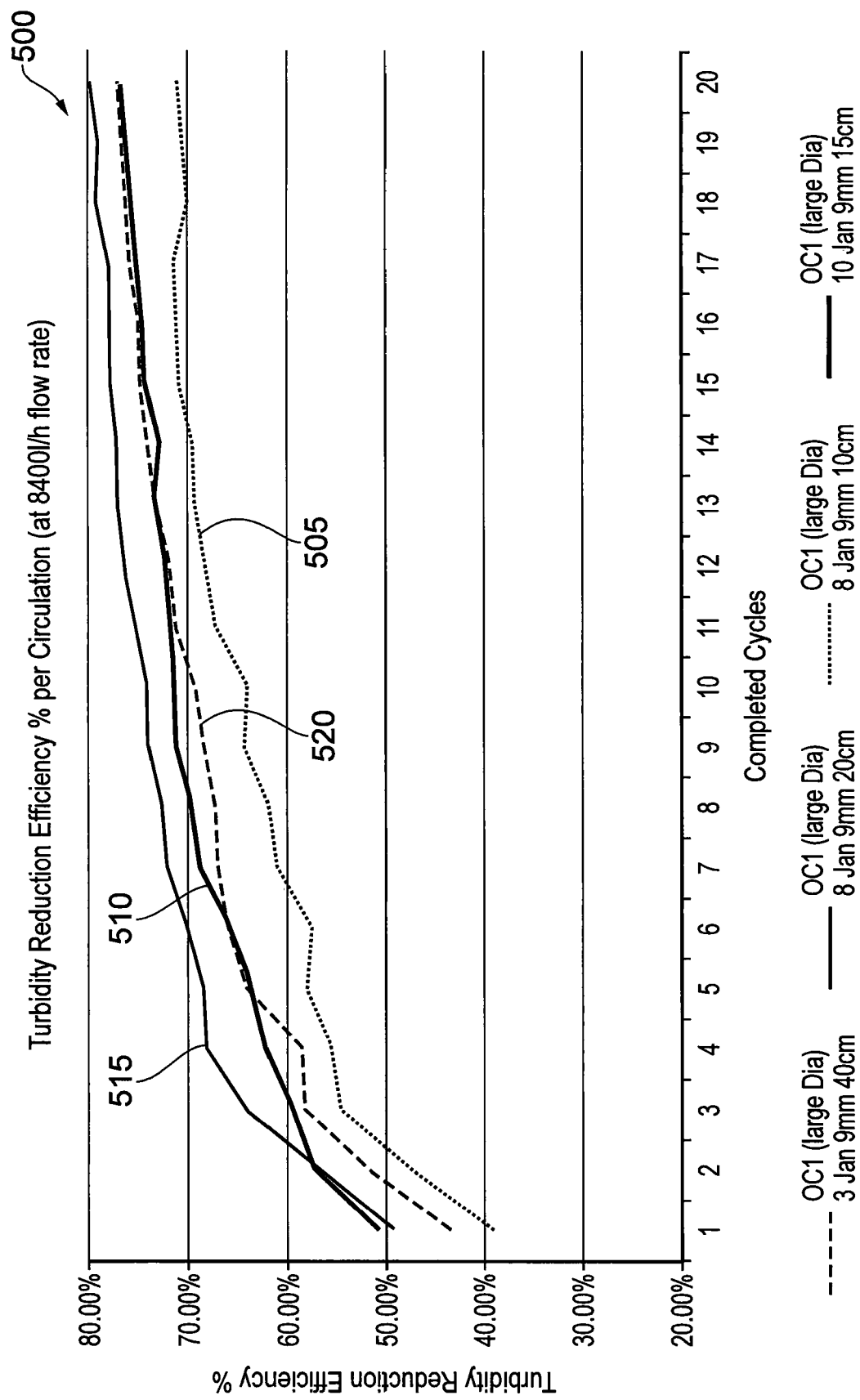
FIG. 15 is a fourth graph representing the turbidity reduction efficiency of a water sample filtered through different depths of static filter packs formed from mechanical filter elements in accordance with an embodiment of the present invention.

It is believed that the depth of the static filter pack 11 (referred to herein as the pack depth) may affect operation of the mechanical filter apparatus 1. It will be understood that the term "depth" in this context refers to the dimension of the static filter pack 11 in the direction of liquid flow through the static filter pack 11. A third graph 400 is shown in FIG. 14 representing the measured Nephelometric Turbidity Units (NTU) for different pack depths. The test was performed for a flow rate of 8400 cubic litres per hour ($l^3$/h) (providing a flow rate per unit surface area of the static filter pack for the static filter pack 11 of approximately 30 $m^3/m^2$/h). A first plot 405 shows the NTU measurement for a pack depth of 100 mm; a second plot 410 shows an NTU measurement for a pack depth of 150 mm; a third plot 415 shows an NTU measurement for a pack depth of 200 mm; and a fourth plot 420 shows an NTU measurement for a pack depth of 400 mm. A fourth graph 500 is shown in FIG. 15 representing the turbidity reduction efficiency (TRU) (%) following introduction of a contaminant into a water sample for a series of filtration and cleaning operations. The test was performed for a flow rate of 8400 cubic litres per hour ($l^3$/h) (providing a flow rate per unit surface area of the static filter pack for the static filter pack 11 of approximately 30 $m^3/m^2$/h). A first plot 505 shows a TRU for a pack depth of 100 mm; a second plot 510 shows a TRU for a pack depth of 150 mm; a third plot 515 shows a TRU for a pack depth of 200 mm; and a fourth plot 520 shows a TRU for a pack depth of 400 mm.

Figure 16:
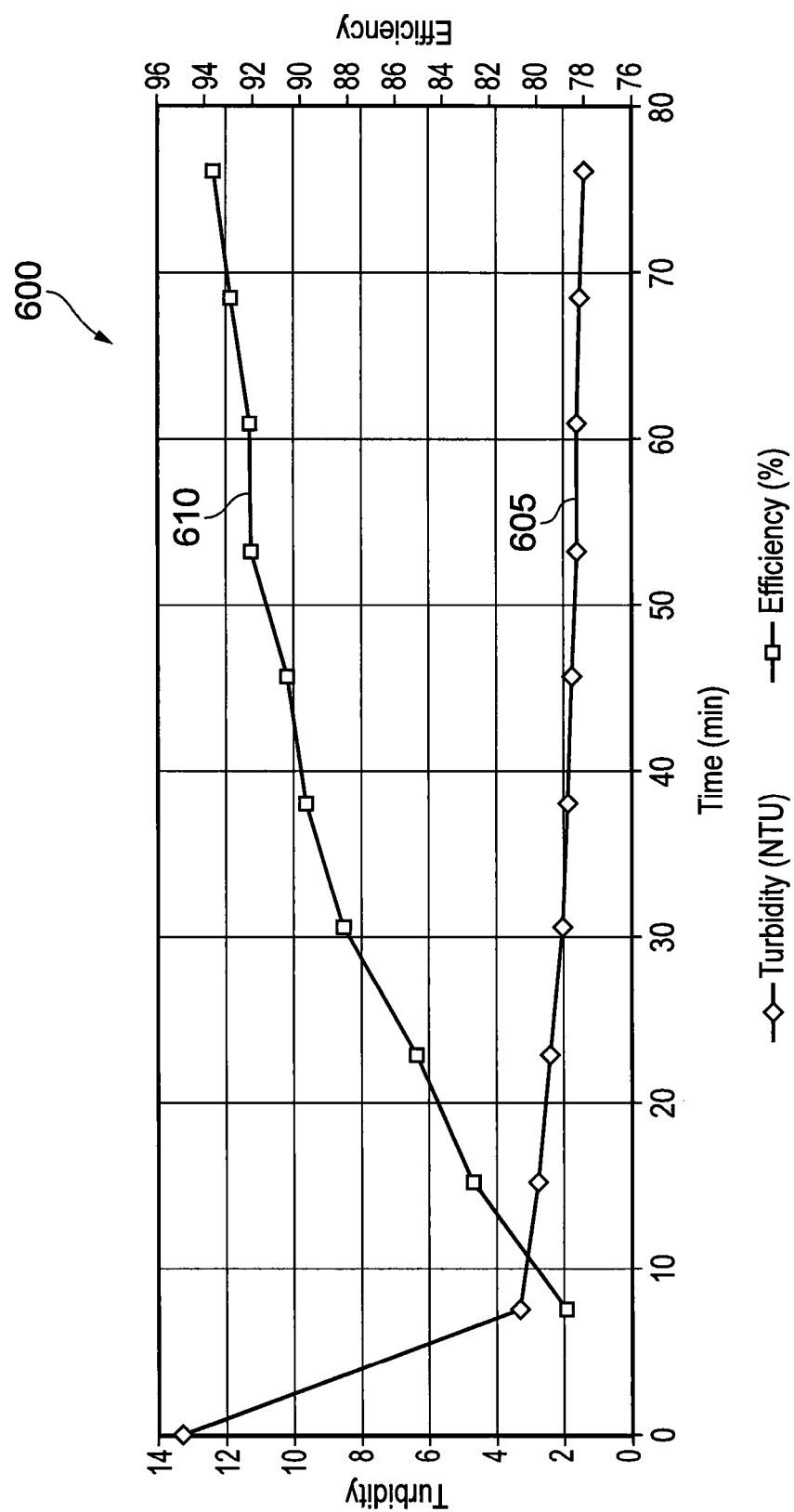
FIG. 16 is a fifth graph showing the measured turbidity and the calculated turbidity reduction efficiency during a test procedure for the mechanical filter apparatus in accordance with an embodiment of the present invention.

FIG. 16 is a fifth graph 600 showing the measured turbidity (NTU) and efficiency (%) during a test filtration for the mechanical filter apparatus 1 in accordance with an embodiment of the present invention. The test comprises passing a test liquid through the static filter pack 11 twenty (20) times and measuring the turbidity of the test liquid at the end of every second cycle. During the test, the flow rate of the test liquid through the mechanical filter apparatus 1 remained substantially constant at approximately 6 litres per minute. The reduction in turbidity was then calculated based on the measured turbidity. A first plot 605 shows the turbidity during the test; and a second plot 610 shows the calculated efficiency.

Figure 17:
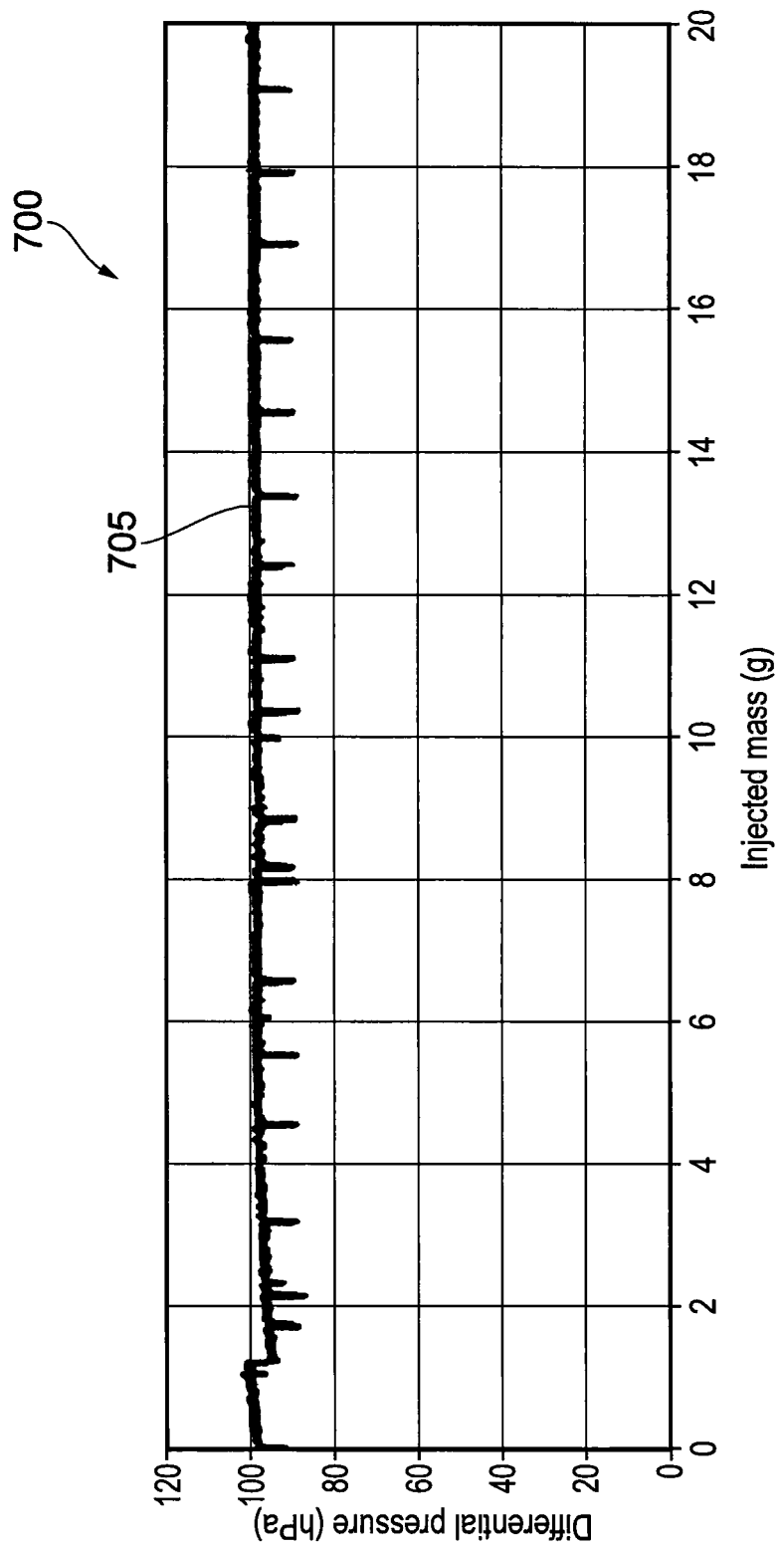
FIG. 17 is a sixth graph showing the measured differential pressure during a test procedure for the mechanical filter apparatus in accordance with an embodiment of the present invention.

FIG. 17 is a sixth graph 700 showing the pressure differential (nPa) during a retention capacity test for the mechanical filter apparatus 1 in accordance with an embodiment of the present invention. The test involved introducing test debris into a test liquid at the beginning of each cycle. The repeated introduction of test debris into the test liquid was expected to cause the differential pressure to rise as the static filter pack 11 is blocked. However, as shown by a first plot 705, during this test the differential pressure remained substantially unchanged as test debris was introduced into the test liquid. It is believed that substantially unchanged differential pressure is a result of the retention capacity of the mechanical filter elements 2 not being reached during the test.

Figure 18:
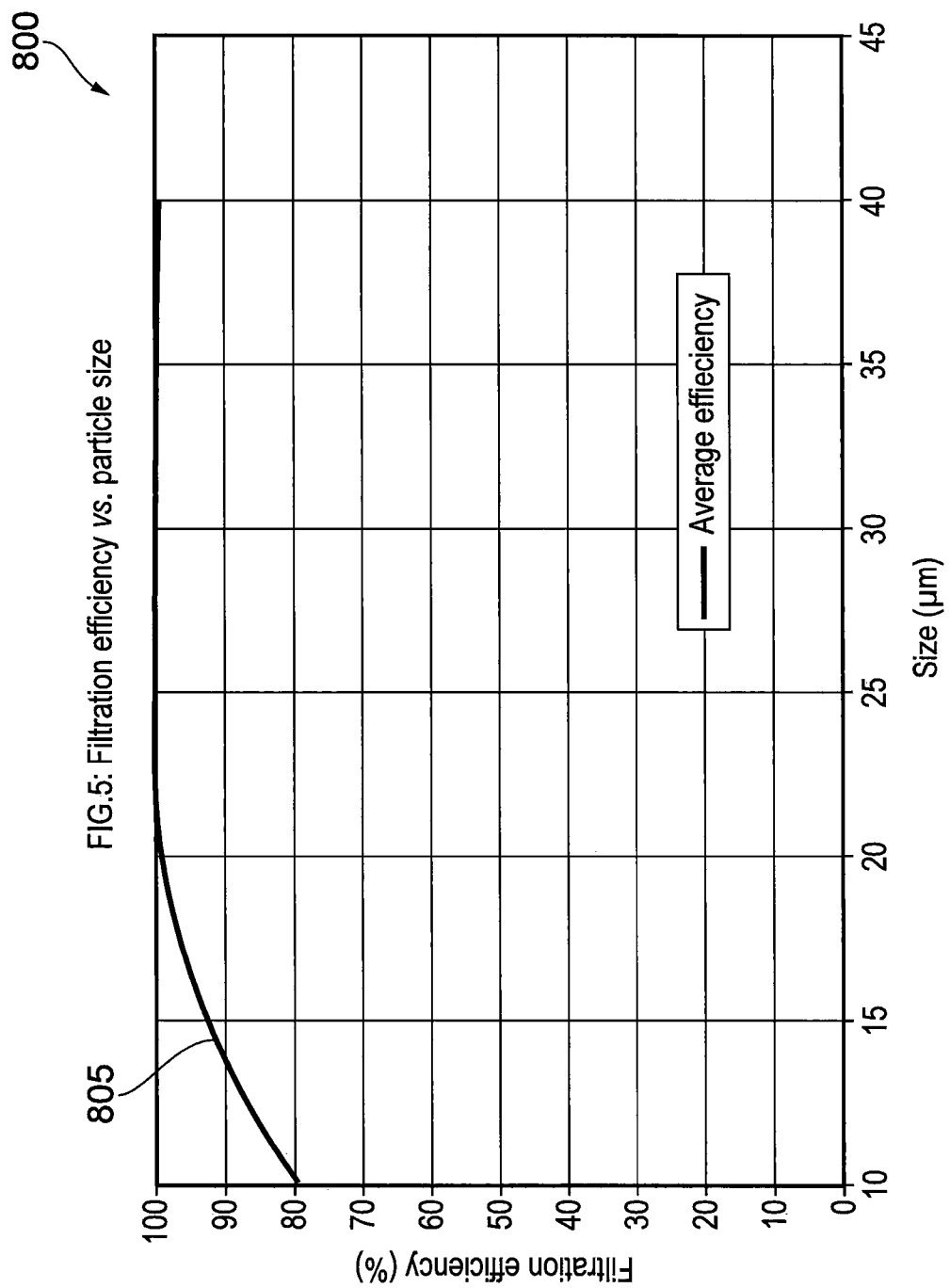
FIG. 18 is a seventh graph showing the particle size filtration efficiency for the mechanical filter apparatus in accordance with an embodiment of the present invention.

FIG. 18 is a seventh graph 800 showing the particle size filtration efficiency during a retention efficiency and capacity test for a mechanical filter apparatus 1 in accordance with an embodiment of the present invention. During the test, a contaminant was introduced constantly to a test liquid. A first graph 805 represents the average filtration efficiency of the mechanical filter apparatus 1 for removing particles of a given size (μm).

Figure 1:
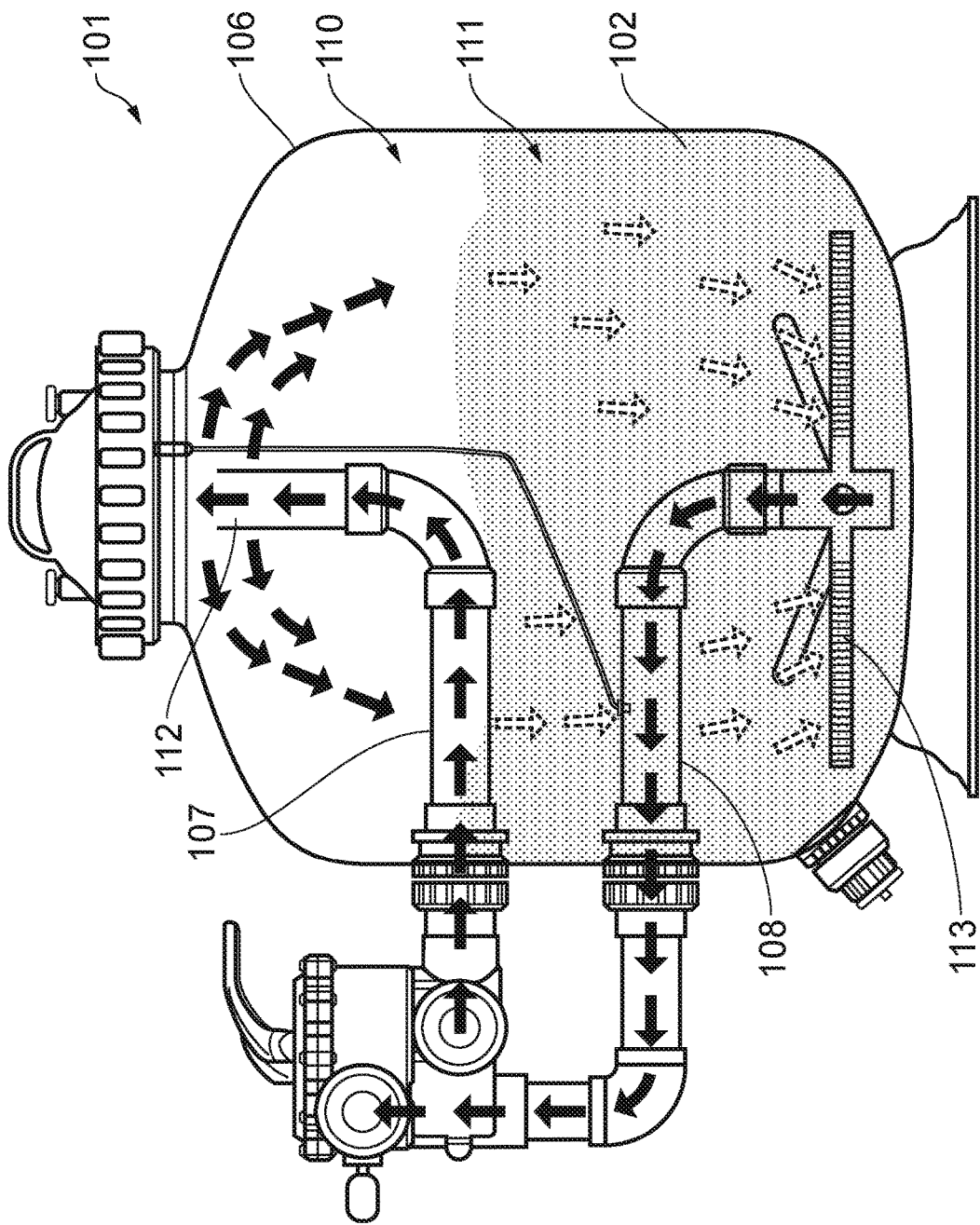
FIG. 1 shows a schematic representation of a known swimming pool filter apparatus comprising a sand filter.
Figure 2:
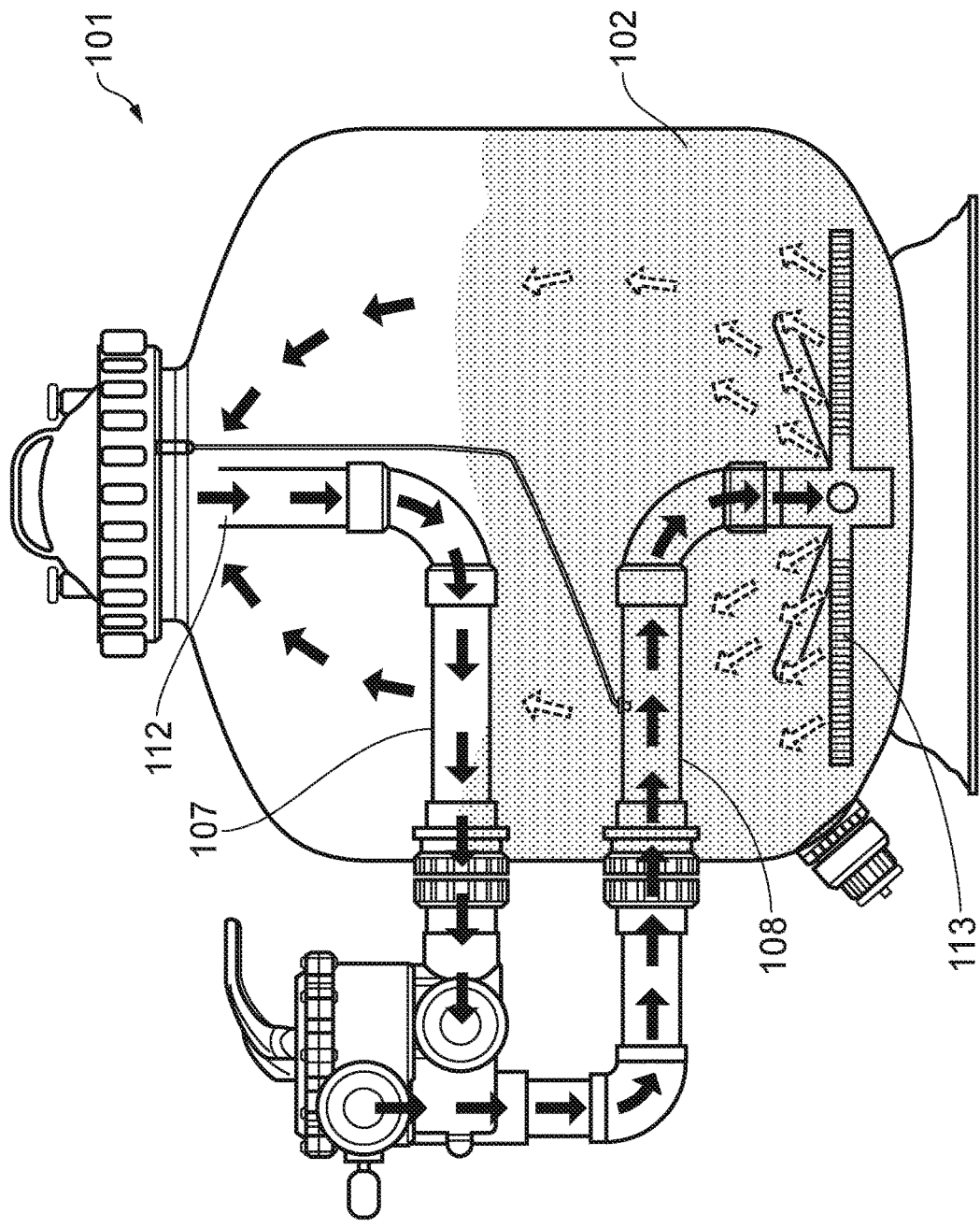
FIG. 2 shows a schematic representation of the swimming pool filter shown in FIG. 1 during a backwashing operation.

Further testing was conducted to provide a direct comparison of the effectiveness and efficiency of the mechanical filter apparatus 1 incorporating a static filter pack 11 consisting of a plurality of said mechanical filter elements 2 in accordance with an embodiment of the present invention; and an equivalent known mechanical filter apparatus 101 incorporating a static filter bed 111 consisting of sand as the filter media 102 of the type illustrated in FIGS. 1 and 2. For the purposes of these tests variable speed pumps 5 were used to pump water through the respective mechanical filter apparatus 1, 101.

Figure 19:
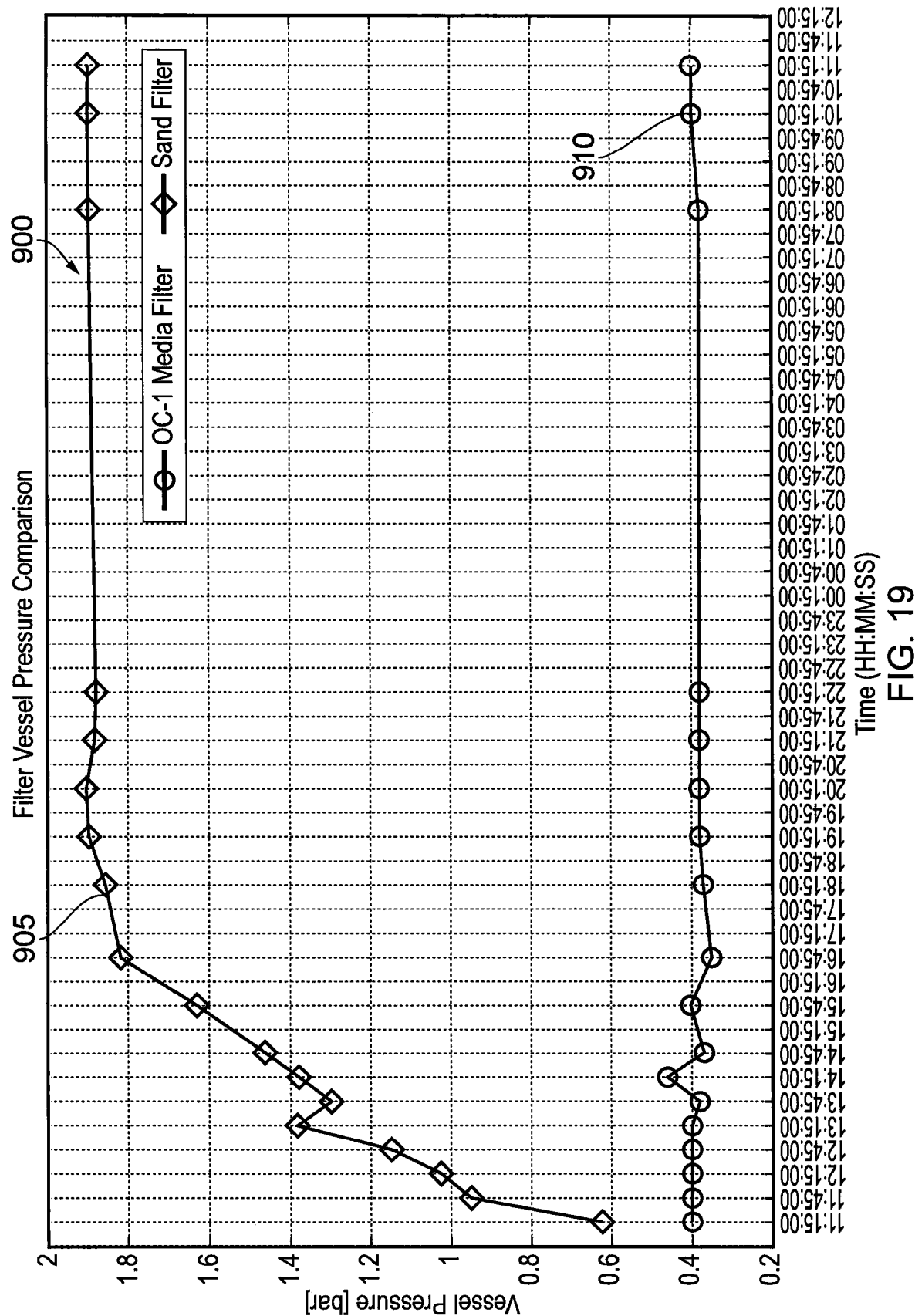
FIG. 19 is an eighth graph showing a comparison of the pressure in the filter chamber of the mechanical filter apparatus in accordance with an embodiment of the present invention compared to a known mechanical filter apparatus.

FIG. 19 is an eighth graph 900 showing measured pressure (bar) in the filter chambers 10, 110 of the known mechanical filter apparatus 101 and the mechanical filter apparatus 1 in accordance with an embodiment of the present invention. A first plot 905 shows the pressure in the filter chamber 110 of the known mechanical filter apparatus 101; and a second plot 910 shows the pressure in the filter chamber 10 of the mechanical filter apparatus 1 in accordance with an embodiment of the present invention. The increase in pressure in the filter chamber 110 of the known mechanical filter apparatus 101 is representative of a heavy debris load which causes the sand forming the static filter bed 111 to block.

Figure 20:
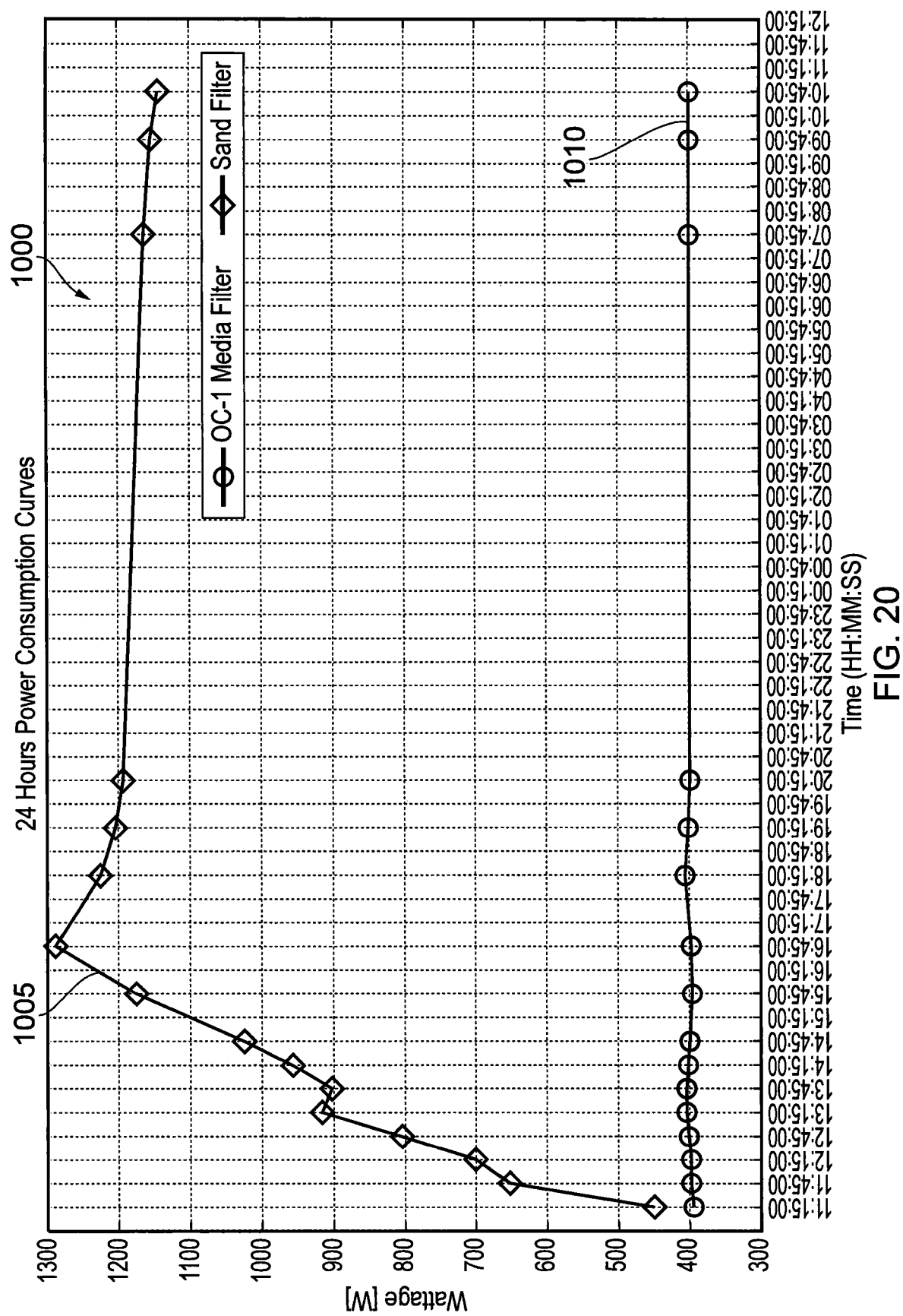
FIG. 20 is a ninth graph showing a comparison of the power consumption of a pump for the mechanical filter apparatus in accordance with an embodiment of the present invention compared to a known mechanical filter apparatus.

FIG. 20 is a ninth graph 1000 showing measured power consumption (Watts) of a pump 5 operating to pump water respectively through the known mechanical filter apparatus 101 and the mechanical filter apparatus 1 in accordance with an embodiment of the present invention. A first plot 1005 shows the power consumption of the known mechanical filter apparatus 101; and a second plot 1010 shows the power consumption of the mechanical filter apparatus 1 in accordance with an embodiment of the present invention. The increase in power consumption by the known filter apparatus 101 can be attributed to the gradual increase in the operating speed of the pump required to maintain a constant flow-rate through the static filter bed 111 as debris is trapped within the sand.

At least certain embodiments of the mechanical filter elements 2 described herein have a higher retention capacity than known filter media, such as sand. This higher retention capacity allows the mechanical filter apparatus 1 to continue to perform filtration for a longer period of time before cleaning is required, for example by performing backwashing. As shown in FIG. 19, the mechanical filter elements 2 continue to filter with a smaller change in the operating pressure in the filter chamber 10. Similarly, the flow-rate through the filter chamber 10 is less subject to change as debris is filtered. At least in certain embodiments, the mechanical filter apparatus 1 incorporating the mechanical filter elements 2 may use less power than the known mechanical filter apparatus 101 using sand to form the static filter bed 111.

The mechanical filter apparatus 1 in the present embodiment is periodically operated in a backwash mode to clean the static filter pack 11. When the mechanical filter apparatus 1 is operating in said backwash mode, the control valve 9 connects the supply conduit 14 to the second conduit 8, and connects the first conduit 7 to the waste drain conduit 16. In this configuration, water is supplied from the swimming pool 3 to the second conduit 8 and an up-flow of liquid is generated through the filter chamber 10. As shown in FIG. 5, the up-flow displaces the mechanical filter elements 2 and breaks up the static filter pack 11. As the mechanical filter elements 2 have substantially neutral buoyancy, they can be displaced upwardly within the filter chamber 10 to disrupt and break up the static filter pack 11. The continued movement of the mechanical filter elements 2 within the filter chamber 10 can help to dislodge particulates trapped in the filter cells 19 during filtration. The particulates are expelled from the filter chamber 10 by purging the water through the waste drain conduit 16. The mechanical filter apparatus 1 can thereby be cleaned. It will be appreciated that the backwash mode can be implemented periodically to clean the mechanical filter elements 2.

The mechanical filter elements 2 are used to form a static filter pack 11 (also referred to as a static filter bed) within the swimming pool filtration system 4. In use, the static filter pack 11 removes particulate solids by retention inside the filter cells 19. The static filter pack 11 is not a biological filter media and is not utilising bio film technology. Rather, the mechanical filter elements 2 are a direct replacement for any static bed filter medium (such as sand, glass balls or silica glass). The configuration of the mechanical filter elements 2 is such that the static filter pack 11 is capable of removing and retaining solid particulate having sizes as small as 1 micron.

Figure 21:
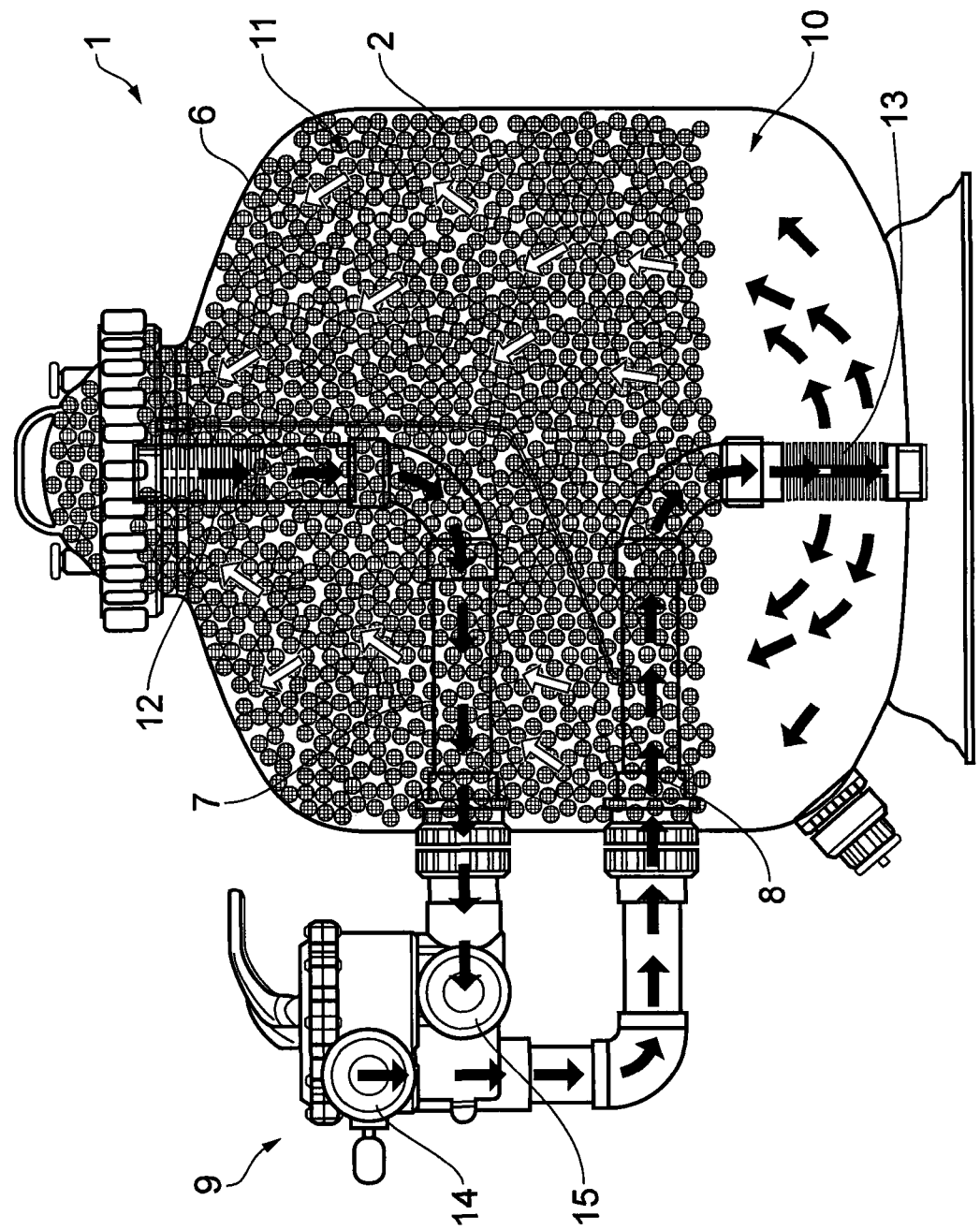
FIG. 21 shows a schematic representation of a swimming pool filter apparatus in accordance with a further embodiment of the present invention.
Figure 22:
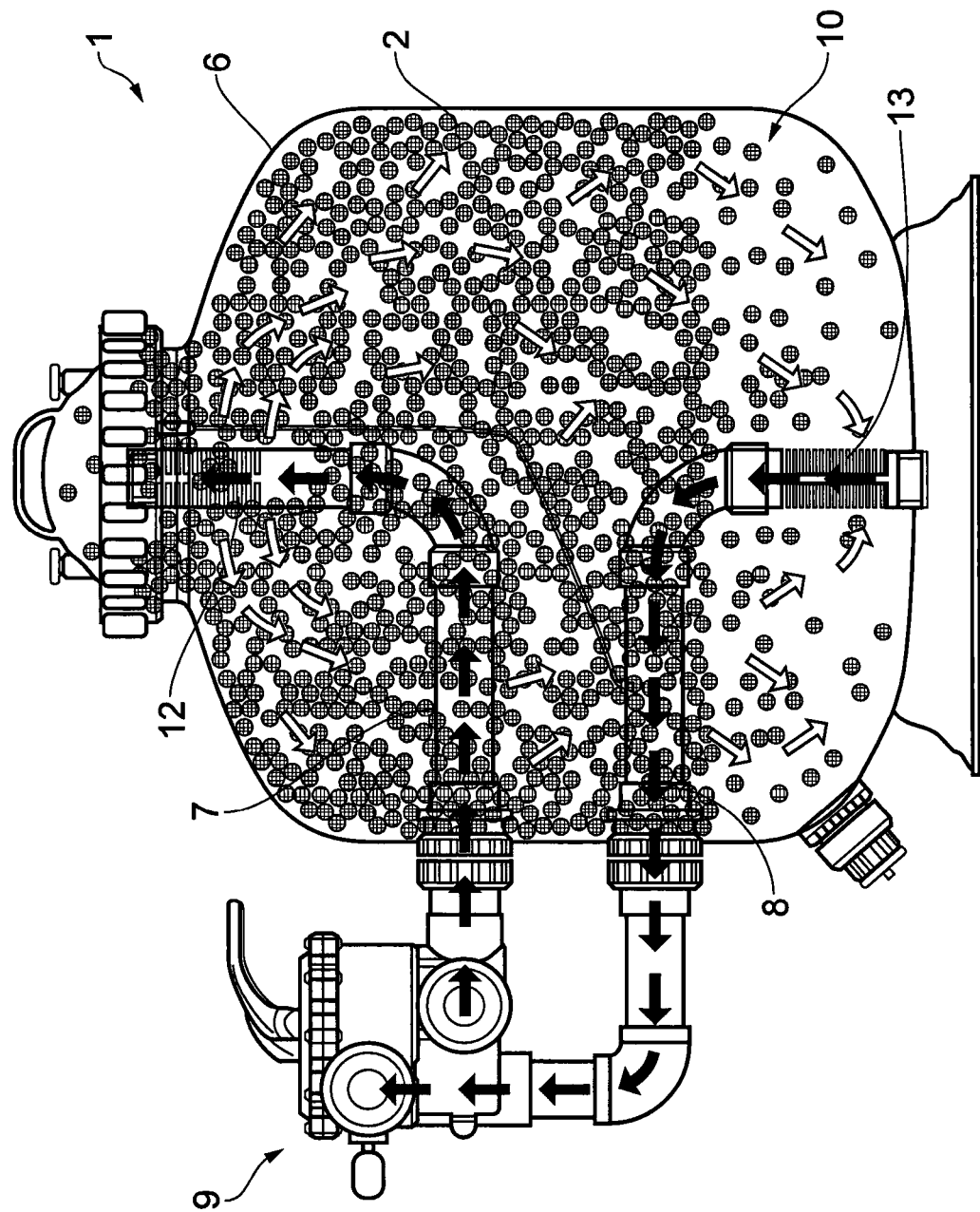
FIG. 22 shows a schematic representation of the swimming pool filter shown in FIG. 21 during a backwashing operation.

A variant of the mechanical filter apparatus 1 will now be described with reference to FIGS. 21 and 22. Like reference numerals are used for like components in the description of this arrangement. The mechanical filter apparatus 1 comprises a filter housing 6, a first conduit 7, a second conduit 8 and a control valve 9. The first conduit 7 and the second conduit 8 are arranged such that the first aperture 12 is disposed in an upper portion of the filter chamber 10 and the second aperture 13 is disposed in a lower portion of the filter chamber 10. However, the control valve 9 is modified such that during filtration the first conduit 7 is connected to the return conduit 15; and the second conduit 8 is connected to the supply conduit 14. Thus, the flow direction through the filter chamber 10 when operating in the filtration mode is reversed compared to the embodiment described above. When the mechanical filter apparatus 1 is operating in a filtration mode, the water from the swimming pool 3 is introduced into the filter chamber 10 through the second aperture 13 and exits through the first aperture 12. An up-flow of water is thereby established through the filter chamber 10 during filtration, as illustrated by the arrows in FIG. 21. The up-flow displaces the mechanical filter element 2 upwardly such that the static filter pack 11 is formed at the top of the filter chamber 10. When the mechanical filter apparatus 1 is operating in said backwash mode, the water from the swimming pool 3 is introduced through the first aperture 12 and exits through the second aperture 13. A down-flow of water is thereby established through the filter chamber 10, as illustrated by the arrows in FIG. 22. The down-flow disrupts the static filter pack 11 and dislodges particulates trapped during filtration. The water in the filter chamber 10 is expelled through the waste drain conduit 16 to backwash the mechanical filter apparatus 1. It will be appreciated, therefore, that the operation of this variant of the mechanical filter apparatus 1 corresponds closely to the embodiment described above. However, in this variant, the static filter pack 11 is established at the top of the filter chamber 10 during filtration rather than at the bottom of the filter chamber 10.

The mechanical filter apparatus 1 has been described herein with reference to mechanical filter elements 2 having substantially neutral buoyancy in water. In an alternative implementation, the mechanical filter elements 2 have a specific gravity which is less than one (equivalent to a density which is less than 1 $g/cm^3$) and are positively buoyant. In this implementation, the positive buoyancy of the mechanical filter elements 2 biases them towards the surface of the water in the filter chamber 10. The static filter pack 11 is thereby formed at the top of the filter chamber 10. The positively buoyant mechanical filter elements 2 have particular application in filter apparatus in which an up-flow of water is generated through the filter chamber 10 during filtration. For example, the positively buoyant mechanical filter elements 2 can be incorporated into the mechanical filter apparatus 1 shown in FIGS. 10 and 11. The up-flow helps to form the static filter pack 11 within the filter chamber 10 for filtration. Conversely, during the backwash mode, the positive buoyancy of the mechanical filter elements 2 can promote movement of the mechanical filter elements 2 within the filter chamber 10. The mechanical filter elements 2 tend to float and the down-flow of water during the backwash mode can help to establish or promote circulation of the mechanical filter elements 2 within the filter chamber 10, rather than causing them to collect around the second aperture 13. The continued movement of the mechanical filter elements 2 may help to dislodge the trapped particulates, thereby promoting backwashing.

In a further alternative, the mechanical filter elements 2 have a specific gravity which is greater than one (equivalent to a density which is greater than 1 $g/cm^3$) and are negatively buoyant. In this implementation, the static filter pack 11 forms at the bottom of the filter chamber 10. The negatively buoyant mechanical filter elements 2 have particular application in filter apparatus in which a down-flow of water is generated through the filter chamber 10 during filtration. For example, the negatively buoyant mechanical filter elements 2 can be incorporated into the mechanical filter apparatus 1 shown in FIGS. 4 and 5. The down-flow helps to form the static filter pack 11 within the filter chamber 10 for filtration. Conversely, during the backwash mode, the negative buoyancy of the mechanical filter elements 2 can promote movement of the mechanical filter elements 2 within the filter chamber 10. The mechanical filter elements 2 will tend to sink to the bottom of the liquid in the filter chamber 10. The up-flow of water during the backwash mode may help to establish or promote circulation of the mechanical filter elements 2 within the filter chamber 10, rather than causing them to collect around the second aperture 13. The continued movement of the mechanical filter elements 2 may help to dislodge the trapped particulates, thereby promoting backwashing.

Figure 23:
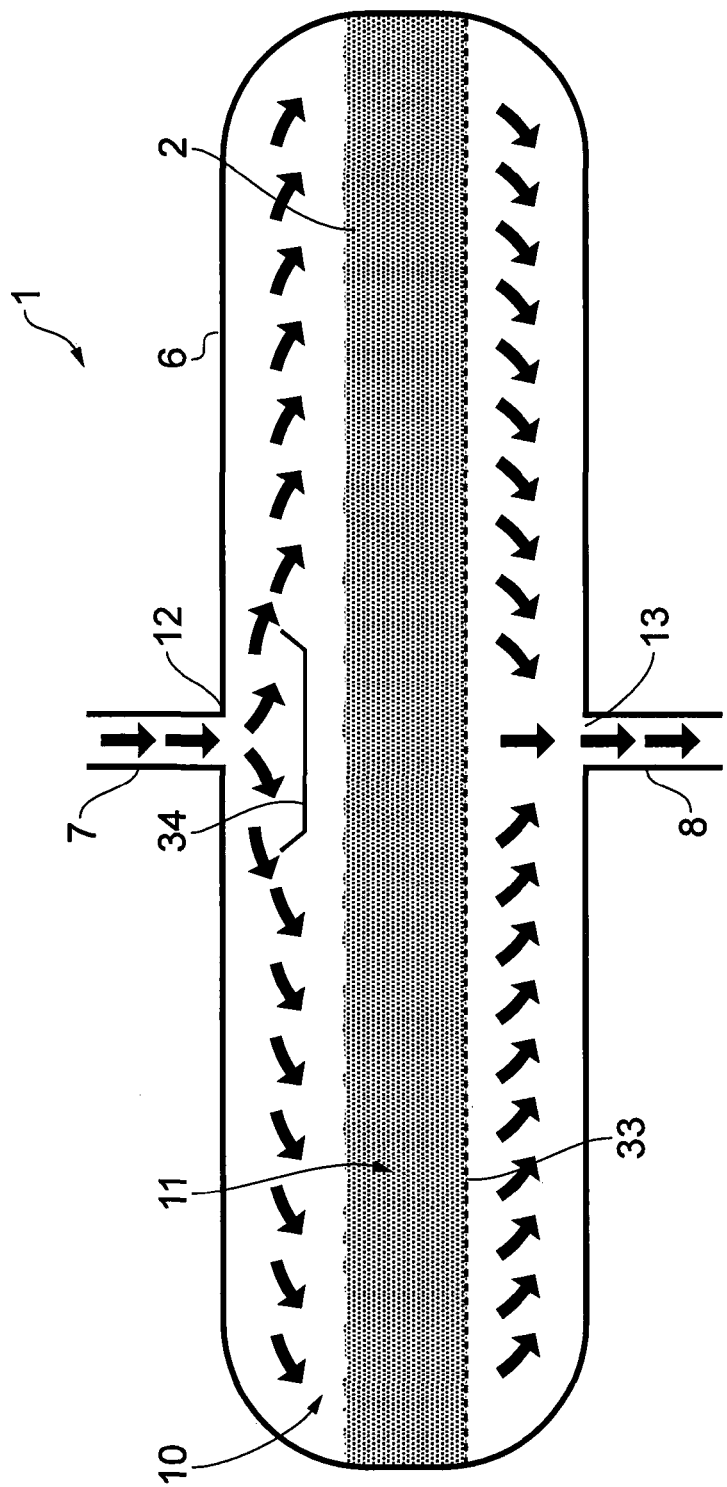
FIG. 23 shows a schematic representation of a swimming pool filter apparatus in accordance with a further embodiment of the present invention.

A further embodiment of the mechanical filter apparatus 1 will now be described with reference to FIG. 23. Like reference numerals are used for like components in the description of this arrangement. The mechanical filter apparatus 1 comprises a filter housing 6, a first conduit 7 and a second conduit 8. The filter housing 6 forms a filter chamber 10. A plurality of mechanical filter elements 2 are provided in the filter chamber 10 to form a static filter pack 11. The mechanical filter elements 2 are of the type described herein in accordance with other aspects of the present invention. It has been determined that the mechanical filter elements 2 are effective even for a static filter pack 11 having a relatively shallow depth. For example, the depth of the static filter pack 11 may be in the range 10 cm to 40 cm; 15 cm to 40 cm; 15 cm to 30 cm; or 15 cm to 25 cm. In the present embodiment the static filter pack 11 has a depth of approximately 20 cm. It will be understood that different depths of the static filter pack 11 may be appropriate for different applications, for example to filter particulates of different sizes.

The depth of the filter housing 6 is reduced compared to the other embodiments described herein, thereby reducing the volume of the filter chamber 10. The filter housing 6 in the present embodiment is a cylinder having a circular transverse cross-section. In the present embodiment, the filter housing 6 has a diameter of approximately 0.6 m. The transverse cross-section extends perpendicular to a longitudinal axis of the filter housing 6 (the longitudinal axis extending vertically in the plane of the sheet of FIG. 23). Although the mechanical filter apparatus 1 may operate at pressures greater than atmospheric pressure, the operating pressures are lower than prior art filters. Thus, the filter housing 6 may have other non-circular transverse cross-sections. For example, the filter housing 6 may have a polygonal cross-section.

In the present embodiment a support platform 33 is disposed in the filter housing 6 to support the mechanical filter elements 2 above a base of the filter chamber 10. The support platform 33 can be in the form of a mesh or grill which supports the mechanical filter elements 2 without restricting the flow of liquid through the filter chamber 10. The support platform 33 is positioned such that the static filter pack 11 is formed coincident with the region of the filter chamber 10 having the largest cross-sectional area. The support platform 33 may reduce the flow rate per unit surface area of the static filter pack on the static filter pack 11. It will be appreciated that a support platform 33 may be installed in the filter housing 6 according to the other embodiments of the present invention.

The first conduit 7 and the second conduit 8 are arranged such that the first aperture 12 is disposed in an upper portion of the filter chamber 10 and the second aperture 13 is disposed in a lower portion of the filter chamber 10. The first conduit 7 is connected to a supply conduit (not shown); and the second conduit 8 is connected to a return conduit (not shown). A flow guide member 34 is disposed in an upper portion of the filter chamber 10 aligned with a first aperture 12. The flow guide member 34 is operative to deflect the liquid entering the filter chamber 10 radially outwardly, thereby promoting more uniform liquid flow through the static filter pack 11. When the mechanical filter apparatus 1 is operating in a filtration mode, the water from the swimming pool 3 is introduced into the filter chamber 10 through the first aperture 12 and exits through a second aperture 13. A down-flow of water is thereby established through the filter chamber 10 during filtration, as illustrated by the arrows in FIG. 23. The down-flow displaces the mechanical filter elements 2 downwardly against the support platform 33. The filtration of the water by the mechanical filter elements 2 is unchanged from the mechanism described herein with respect to the earlier embodiments.

The cleaning of the mechanical filter elements 2 may be performed by reversing the flow direction within the filter chamber 10. As described herein, the water from the filter chamber 10 may be purged to a drain conduit (not shown).

The mechanical filter apparatus 1 and method described with reference to FIGS. 4 and 5; FIGS. 21 and 22; FIG. 23 reverse the flow direction through the filter chamber 10 to dislodge filtered material from the mechanical filter elements 2. However, it has been recognised that at least some of the filtered material may be purged from the filter chamber 10 without substantially changing the flow direction and/or flow path through the static filter pack 11. Rather, the flow rate of the liquid through the filter chamber 10 may be changed to alter the operating mode of the mechanical filter apparatus 1. In particular, a cleaning operation may be performed by increasing the flow rate of the liquid through the filter chamber 10. The flow rate of the liquid may, for example, be increased by at least 25%, 50%, 75% or 100% to perform cleaning. The increased flow rate may dislodge filtered material from the static filter pack 11. A variable rate pump may be connected to the mechanical filter apparatus 1 to adjust the flow rate of the liquid though the filter chamber 10. The filtered material may thereby be controllably expelled from the filter chamber 10 without performing backwashing. A controller, for example comprising one or more electronic processor, may be provided to control operation of the pump. A cleaning operation may be performed periodically, for example once every one (1), two (2), three (3) or four (4) weeks, as appropriate, to remove filtered particulates from the filter chamber 10. It will be appreciated that the liquid from the filter chamber 10 may be re-directed, for example to waste, during the cleaning operation. The mechanical filter apparatus 1 may comprise valve means, such as a three-way valve, for re-directing the flow of liquid. The valve means may be operated manually or automatically, for example by an electromechanical actuator. Alternatively, a separate outlet in the filter chamber 10 may be opened during the cleaning operation. A manual or automated valve may be provided to control opening and closing of the outlet. In this arrangement, the static filter pack 11 would remain substantially intact during the cleaning operation. The volume of the filter chamber 10 filled with mechanical filter elements 2 may optionally be increased in this arrangement. The filter chamber 10 may be greater than or equal to (≥) 70% filled by volume of said mechanical filter elements 2, for example in the range 70-90%.

A further embodiment of the mechanical filter apparatus 1 will now be described with reference to FIGS. 24 and 25. This embodiment of the mechanical filter apparatus 1 is a development of the embodiment described with reference to FIGS. 21 and 22. Like reference numerals are used for like components in the description of this arrangement.

Figure 24:
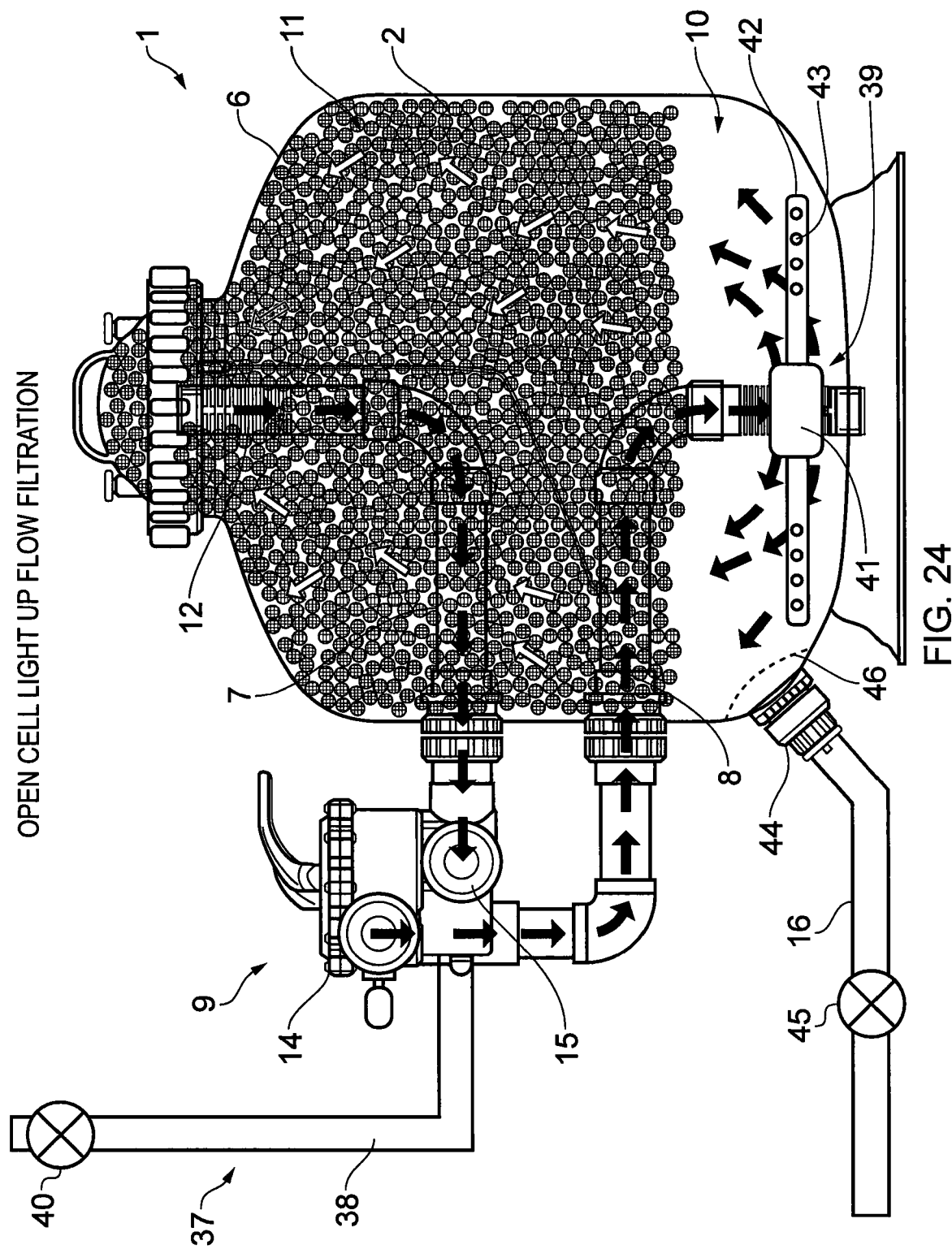
FIG. 24 shows a schematic representation of a swimming pool filter apparatus in accordance with a further embodiment of the present invention.

As shown in FIG. 24, the mechanical filter apparatus 1 comprises a filter housing 6, a first conduit 7, a second conduit 8 and a control valve 9. The filter housing 6 defines a filter chamber 10 containing a plurality of said mechanical filter elements 2 which form the static filter pack 11. In the present embodiment, the filter chamber 10 is at least substantially sealed. The mechanical filter apparatus 1 is configured such that unfiltered water from the swimming pool 3 is pumped into the filter chamber 10 through the second conduit 8 and exits through the first conduit 7. The general upwards flow of water through the filter chamber 10 is illustrated in FIG. 24 by a series of arrows. The mechanical filter elements 2 in the present embodiment have substantially neutral buoyancy or positive buoyancy in water.

As described herein, the mechanical filter apparatus 1 can comprise agitating means for agitating the mechanical filter elements 2. The mechanical filter apparatus 1 according to the present embodiment comprises means for introducing air into the filter chamber 10 to break up or disrupt the mechanical filter elements 2 forming the static filter pack 11. The air introduction means (denoted generally by the reference numeral 37) comprises an air supply conduit 38, a supply manifold 39 and a one-way valve 40. The air supply conduit 38 has an intake through which air can be drawn into the filter chamber 10. The one-way valve 40 is disposed in the air supply conduit 38 proximal to the inlet. The supply manifold 39 comprises a central chamber 41 and a plurality of distribution conduits 42. The central chamber 41 is in fluid communication with the air supply conduit 38 via the second conduit 8. The distribution conduits 42 extend radially outwardly from the central chamber 41 and are disposed at, or proximal to the base of the filter chamber 10. The distribution conduits 42 each have a plurality of air inlet apertures 43 for introducing air into the filter chamber 10. The air supply conduit 38 in the present embodiment is connected to the second conduit 8 via the control valve 9. The one-way valve 40 is configured to allow air to enter the air supply conduit 38 and to prevent water exiting through the air supply conduit 38. The one-way valve 40 may, for example, comprise a spring-biased closure member. In an alternative embodiment, the one-way valve 40 may be replaced with a two-way valve which may be selectively opened and closed.

The control valve 9 is configured such that, during filtration, the first conduit 7 is connected to a return conduit 15; and the second conduit 8 is connected to a supply conduit 14. The second conduit 8 is operative to supply unfiltered water from the swimming pool; and the first conduit 7 returns filtered water to the swimming pool. Furthermore, the control valve 9 is configured such that, during backwashing, the first conduit 7 is closed; and the second conduit 8 is connected to the air supply conduit 38. The housing 6 comprises a drainage port 44 disposed at the base of the filter chamber 10. In the present embodiment, the drainage port 44 is connected to the waste drain conduit 16 and is opened during backwashing. The control valve 9 may be configured to control the opening and closing of the drainage port 44. However, in the present embodiment, a separate drainage valve 45 is provided for opening and closing the drainage port 44. The drainage valve 45 is operated manually in the present embodiment. In alternate embodiments, the drainage valve 45 could comprise an actuator, such as a solenoid, to provide automated or partially-automated backwashing. A mesh 46 is provided over the drainage port 44 to prevent the mechanical filter elements 2 entering the waste drain conduit 16 when the drainage valve 45 is open. The mesh 46 may be configured to control the flow of water from the filter chamber 10 during backwashing, for example in dependence on the size and/or number of holes in the mesh 46.

As shown in FIG. 24, when the mechanical filter apparatus 1 is performing filtration, the water is pumped from the swimming pool 3 by the pump 5 into the filter housing 6. The pumped water is introduced into the filter chamber 10 through the second conduit 8. The unfiltered water enters the filter housing 6 through the distribution conduits 42 of the supply manifold 39. The water flows upwardly through the filter chamber 10 and exits through the first conduit 7. It will be understood that an up-flow of water is established through the filter chamber 10 during filtration. The upwards movement of the water displaces the mechanical filter elements 2 upwardly such that the static filter pack 11 is formed at the top of the filter chamber 10.

Figure 25:
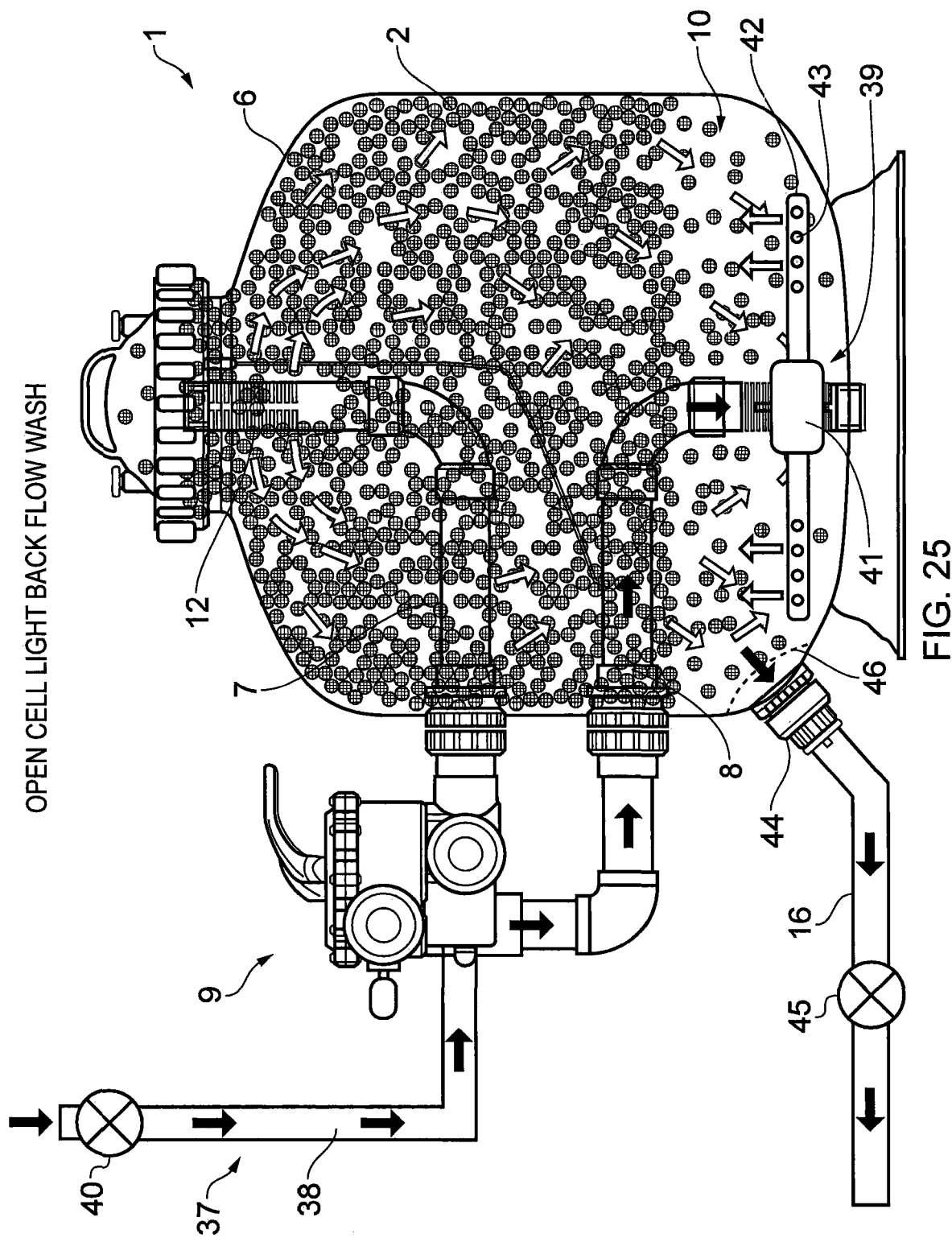
FIG. 25 shows a schematic representation of the swimming pool filter shown in FIG. 24 during a backwashing operation.

As shown in FIG. 25, when the mechanical filter apparatus 1 is performing backwashing, the pump 5 is stopped to inhibit the supply of water from the swimming pool 3 to the filter housing 6. The control valve 9 is operated to close the first conduit 7 and to connect the second conduit 8 to the air supply conduit 38. The drainage valve 45 is then opened to allow the water in the filter housing 6 to flow through the drainage port 44 into the waste drain conduit 16. Since the filter housing 6 is sealed, the flow of water out of the filter chamber 10 reduces the pressure within the filter housing 6 causing the one-way valve 40 to open allowing air to be drawn into the air supply conduit 38. By draining water from the sealed filter chamber 10, the operating pressure drops below atmospheric pressure, thereby drawing air into the filter chamber 10 through the air supply conduit 38. The air enters the central chamber 41 and is drawn through into the distribution conduits 42. The air is then introduced into the filter chamber 10 through the air inlet apertures 43 formed in the distribution conduits 42. The resulting air bubbles travel upwardly through the water in the filter chamber 10 and disrupt the suspended mechanical filter elements 2. The mechanical filter elements 2 are agitated by the air bubbles and the static filter pack 11 is broken up. It will be appreciated that the water in the filter chamber 10 continues to drain through the drainage port 44, such that the level of the water continues to drop causing further agitation of the mechanical filter elements 2 within the filter chamber 10. It will be understood that, by agitating the mechanical filter elements 2, material and debris filtered by the mechanical filter elements 2 is dislodged and returned to the water within the filter chamber 10. The agitation of the mechanical filter elements 2 continues until the water level in the filter chamber 10 drops below the position of the air inlet apertures 43 formed in the distribution conduit 16. The introduction of air into the filter chamber 10 continues concurrently with drainage of the water from the filter chamber 10. By draining the water through the waste drain conduit 16, the material and debris is expelled from the filter chamber 10. The mechanical filter elements 2 may thereby be cleaned ready to perform additional filtration. The pressure in the filter chamber 10 returns to atmospheric pressure and the one-way valve 40 closes.

When the filter chamber 10 is empty, the control valve 9 is operated to open the second conduit 8 and the pump 5 re-started. The control valve 9 can be operated to open the first conduit 7. The drainage valve 45 is operated to close the drainage port 44 partially or completely to re-fill the filter chamber 10 with water from the swimming pool 3. The drainage valve 45 may be closed after opening the second conduit 8 to perform additional washing of the mechanical filter elements 2 and optionally to flush the second conduit 8. In alternative arrangements, the drainage valve 45 may be closed before or concurrent with opening of the second conduit 8. The backwashing may optionally be performed more than once. For example the filter chamber 10 may be partially or completely re-filled, the second conduit 8 closed and the drainage valve 45 re-opened. It will be understood that the drainage valve 45 may be incorporated into the control valve 9.

When backwashing is complete, the control valve 9 is operated to open the first and second conduits 7, 8. The pump 5 is re-started to pump water from the swimming pool 3 to the filter housing 6. The drainage valve 45 is operated to close the drainage port 44 and the filter chamber 10 is refilled with water from the swimming pool 3. The mechanical filter elements 2 re-form the static filter pack 11 and are operative to perform mechanical filtration of the water.

The air introduction means 37 described with reference to the present embodiment is a passive system insofar as it relies on the water draining from the filter chamber 10 to draw air through the air supply conduit 38. Alternatively, or in addition, an air pump may be provided actively to pump air through the air supply conduit 38.

The mechanical filter apparatus 1 shown in FIG. 24 can be implemented by modifying a conventional swimming pool filter apparatus, such as a sand bed filter. According to further aspects of the present invention, there is provided a conversion kit for converting an existing swimming pool filter apparatus; and a method of converting an existing swimming pool filter apparatus.

The conversion of the known filter apparatus 101 shown in FIGS. 1 and 2 will now be described. The filter apparatus 101 is modified by replacing the static filter bed 111 with a plurality of the mechanical filter elements 2 described herein for forming a static filter pack 11. Air introduction means 37 comprising an air supply conduit 38 is provided for introducing air into the filter chamber 110. In particular, the air introduction means 37 is fluidly connected to the second apertures 113. Thus, the second apertures 113 may be reconfigured as air inlet apertures 43 for introducing air into the filter chamber 10. The control valve can be modified to enable the second conduit 108 selectively to be connected to the air supply conduit 38 for performing backwashing. The modification may, for example, be implemented using an existing port on the control valve. Alternatively, the control valve may be replaced to provide a connection to the air supply conduit 38. The modification also comprises providing a drainage valve 45 for controlling draining of the filter chamber 10 through a drain outlet. The drainage valve 45 may be manually operated or may comprise an electromechanical actuator for providing automated or semi-automated operation. As described herein, the known filter apparatus 101 comprises a mesh or grill provided over the outlet apertures 113 to prevent the filter media 102 escaping. The modification of the filter apparatus 101 may comprise replacing the existing mesh with a mesh 46 having larger apertures for providing increased flow to the waste drain conduit 16 whilst retaining the mechanical filter elements 2 in the filter chamber 10. The conversion kit may comprise air introduction means 37 of the type described herein in combination with a drainage valve 45 for controlling drainage of the filter chamber 10. The conversion kit may optionally also comprise a modified control valve 9. The control valve 9 may, for example, comprise a multi-port valve operable to open and close the first conduit 7 and/or the second conduit 8 and/or the drainage valve 45

The addition of air introduction means 37 has been described with reference to the mechanical filter apparatus 1 configured to establish an up-flow of water through the static filter pack 11 during filtration. It will be appreciated that the air introduction means 37 can also be implemented in mechanical filter apparatus 1 in which a down-flow of water is established through the static filter pack 11, for example as described herein with reference to FIGS. 4 and 5. The air supply conduit 38 is again connected to the second conduit 8 such that air is introduced at the bottom of the filter chamber 10. The control valve 9 may be modified to provide the required connections. The supply manifold 39 of the air introduction means 37 may be connected to the second conduit 8 to control the introduction of air into the filter chamber 10.

At least some of the air inlet apertures 43 may be sized to form bubbles of air which may enter the filter cells 19 formed within the mechanical filter elements 2 to dislodge trapped material. Some of the air inlet apertures 43 may be larger to form larger bubbles for agitating the mechanical filter elements 2, for example to break up the static filter pack 11. In certain embodiments, the air inletapertures 43 may be different sizes to promote formation of bubbles having different sizes.

It will be appreciated that various changes and modifications can be made to the apparatus described herein without departing from the scope of the present application. For example, the mechanical filter elements 2 could have antibacterial and/or anti-microbial properties to inhibit biological activity. For example, an antibacterial agent could be incorporated into the mechanical filter elements 2 or could be applied as a coating. Suitable antibacterial agents can for example include silver-ion; silver-ion with titanium oxide; silver-ion with zinc, sliver-ion with titanium (IV) oxide, or biocide. Brand names for antibacterial additives include Mircroban, Biomaster, Bactiglass.

The inner and outer filter cells 19IN, 19OUT have been described as having substantially the same cross-sectional areas. In a modified arrangement, the inner and outer filter cells 19IN, 19OUT can have different cross-sectional areas. The inner filter cells 19IN can have smaller cross-sectional areas that the outer filter cells 19OUT. Alternatively, the inner filter cells 19IN can have larger cross-sectional areas that the outer filter cells 19OUT. The smaller cross-sectional area may promote filtration of smaller particulates, for example due to a lower velocity of the water contained therein promoting settlement.

In alternative embodiments, different types of mechanical filter elements 2 could be provided in the filter chamber 10, for example to filter different sizes of particulates. For example, the filter chamber 10 could contain two or more types of mechanical filter elements 2 having different sizes of filter cells 19. By way of example, a first mechanical filter element 2 could comprise one or more filter cell 19 having a first cross-sectional area; and a second mechanical filter element 2 could comprise one or more filter cell 19 having a second cross-sectional area; wherein the cross-sectional areas of the first and second filter cells 19 are different. The proportions of the mechanical filter elements 2 could be varied to alter the filtration characteristics of the mechanical filter apparatus 1. For example, the proportion of the mechanical filter elements 2 having a smaller size of filter cells 19 could be increased to increase the filtration of small particulates.

The length of the filter cell 19 (measured along the longitudinal axis X) influences the flow therein which can affect filtration. For example, changing the effective length of the filter cell 19 can vary the size of the particulates trapped therein. The mechanical filter element 2 could be configured to have filter cells 19 having different lengths. For example, a first filter cell 19 can have a first length and a second filter cell 19 can have a second length, wherein the first length is greater than the second length. The mechanical filter element 2 could be injection moulded; or could be an extruded section which is cut at a different angle relative to the longitudinal axis X at each end. This configuration could operate over a broader range of flow rates through the filter chamber 10. Alternatively, or in addition, the filter chamber 10 could contain two or more types of mechanical filter elements 2 having different lengths of filter cells 19. By way of example, a first mechanical filter element 2 could comprise one or more filter cell 19 having a first length; and a second mechanical filter element 2 could comprise one or more filter cell 19 having a second length; wherein the lengths of the first and second filter cells 19 are different.

In certain embodiments, the mechanical filter elements 2 can each have a single filter cell 19. In this arrangement, the mechanical filter elements 2 can be tubular. The tubular mechanical filter elements 2 could be linear or curved along their length.

The methods/apparatus described herein may rely on the relative buoyancy of the mechanical filter elements 2 (in combination with the flow direction) to help form the static filter pack 11. For example, mechanical filter elements 2 for use in a mechanical filter apparatus 1 configured to establish a down-flow of liquid through the static filter pack 11 may have a negative buoyancy. Conversely, mechanical filter elements 2 for use in a mechanical filter apparatus 1 configured to establish an up-flow of liquid through the static filter pack 11 may have a positive buoyancy. It will be appreciated, however, that the flow of liquid through the filter chamber 10 may be sufficient to form the static filter pack 11 irrespective of the relative buoyancy of the mechanical filter elements and/or the flow direction. In alternate arrangements, the mechanical filter elements 2 can be physically restrained to form the static filter pack 11 during operation in a filter mode. The mechanical filter elements 2 could, for example, be constrained by displacing a constraining member in the filter chamber 10 during filtration. The mechanical filter elements 2 can be released during backwashing. By restraining the mechanical filter elements 2, the mechanical filter apparatus 1 could be configured such that the flow through the mechanical filter elements 2 is in a horizontal direction.

The mechanical filter apparatus 1 has been described as establishing an up-flow or a down-flow of water in the filter chamber 10 during filtration to form the static filter pack 11. However, this is not essential to the operation of the invention. A lateral flow of water could be used to establish the static filter pack 11. The lateral flow could be used to displace the mechanical filter elements 2 towards an outlet conduit during filtration so as to form the static filter pack 11. In this arrangement, the first and second apertures 12, 13 can be offset from each other in a horizontal direction. Of course, the first and second apertures 12, 13 can be offset from each other both horizontally and vertically.

In a further arrangement, the mechanical filter apparatus 1 could comprise a first vessel disposed within a second vessel. The first and second vessels could, for example, be arranged concentrically. The mechanical filter elements 2 could be disposed in said first vessel and a radially inwardly directed flow established through the first vessel during filtration. Alternatively, the mechanical filter elements 2 could be disposed in said second vessel and a radially outwardly directed flow established through the first vessel during filtration.

In order to promote agitation of the mechanical filter elements 2 during backwashing, the mechanical filter apparatus 1 can comprise agitating means. The agitating means can be configured to break up or disrupt the mechanical filter elements 2 forming the static filter pack 11. For example, a mechanical agitating member, such as a rotary or reciprocating arm, could be disposed in the filter chamber 10. The agitating means could be configured to agitate the filter elements by displacing the filter chamber 10, for example by rotating or vibrating the filter housing 6. Alternatively, a pressurised supply of fluid, either a liquid or a gas, can be introduced into the filter chamber 10 to agitate the mechanical filter elements 2. The mechanical filter apparatus 1 can, for example, comprise an air pump for introducing air into the filter chamber 10 to agitate the mechanical filter elements 2 during backwashing.

In a further arrangement, the filter chamber 10 can be tapered to promote formation of the static filter pack 11. The cross-sectional area of the filter chamber 10 can decrease towards an outlet when the mechanical filter apparatus 1 is operating in the filtration mode. The flow through the filter chamber 10 can promote formation of the static filter pack 11 during filtration whilst facilitating disruption of the static filter pack 11 during backwashing. The taper can, for example, extend over at least 30%, 50% or 70% of the length of the filter chamber 10.

The mechanical filter apparatus 1 has been described with particular reference to performing filtration of water from a swimming pool 3. However, the mechanical filter apparatus 1 could be used in other applications for performing mechanical filtration of water which has been treated to suppress biological activity, for example by adding salt, chlorine, ozone gas or other chemicals. The mechanical filter apparatus 1 could, for example, be used to perform mechanical filtration of swimming baths, leisure pools, hot tubs, spa pools and leisure parks.

Furthermore, it will be appreciated that the mechanical filter apparatus 1 may be used to perform mechanical filtration of liquids other than water. The density of the mechanical filter elements 2 may be modified to provide the required positive, negative or neutral buoyancy in these liquids. The specific gravities defined herein may be applied with reference to the density of the liquid to be filtered.

Further embodiments of the mechanical filter element 2 will now be described with reference to FIGS. 26A-Q. Like reference numerals are used for like components. The mechanical filter elements 2 are formed by extrusion moulding of a polymer which may optionally include a filler.

The main difference with the mechanical filter element 2 in each of these embodiments is that the filter cells 19 are omitted. Instead, each of the mechanical filter elements 2 comprises a plurality of said external fins 30 which form voids for promoting settlement of particulates on an exterior surface of the mechanical filter elements 2. The use of the further embodiments of the mechanical filter elements 2 to perform mechanical filtration of a liquid is substantially unchanged from the other embodiments described herein.

The mechanical filter element 2 illustrated in FIG. 26A comprises four (4) external fins 30. The external fins 30 extend radially outwardly from a longitudinal axis X of the mechanical filter element 2. The angular spacing is substantially the same between each of the external fins 30. In the present embodiment, the external fins 30 are arranged substantially perpendicular to each other.

The mechanical filter element 2 illustrated in FIG. 26B comprises eight (8) external fins 30. The external fins 30 extend radially outwardly from a longitudinal axis X of the mechanical filter element 2. The included angle is substantially the same between each of the external fins 30. In the present embodiment, there is an angular spacing of 45° between the external fins 30.

The mechanical filter element 2 illustrated in FIG. 26C comprises six (6) external fins 30. The external fins 30 extend radially outwardly from a longitudinal axis X of the mechanical filter element 2. The mechanical filter element 2 is configured such that first and second included angles are formed between the external fins 30. The first and second included angles are different to provide different fluid dynamics around the mechanical filter element 2 within a static filter pack 11. In the present embodiment, the first angular spacing is 36° and the second angular spacing is 72°. Other angular spacing between the external fins 30 may be useful.

The mechanical filter element 2 illustrated in FIG. 26D comprises ten (10) external fins 30. The external fins 30 extend radially outwardly from a longitudinal axis X of the mechanical filter element 2. The included angle is substantially the same between each of the external fins 30. In the present embodiment, there is an angular spacing of 36° between the external fins 30.

The mechanical filter element 2 illustrated in FIG. 26E comprises twenty (20) external fins 30. The external fins 30 extend radially outwardly from a longitudinal axis X of the mechanical filter element 2. The included angle is substantially the same between each of the external fins 30. In the present embodiment, there is an angular spacing of 18° between the external fins 30.

The mechanical filter element 2 illustrated in FIG. 26F comprises forty (40) external fins 30. The external fins 30 extend radially outwardly from a longitudinal axis X of the mechanical filter element 2. The included angle is substantially the same between each of the external fins 30. In the present embodiment, there is an angular spacing of 9° between the external fins 30.

The mechanical filter elements 2 illustrated in FIGS. 26G-L correspond to the mechanical filter elements 2 illustrated in FIGS. 26A-F respectively. However, in these arrangements, a support element 35 is formed in a centre section of the mechanical filter elements 2. The support element 35 extends along the longitudinal axis X and the external fins 30 extend radially outwardly. In use, the support element 35 defines an external surface onto which particulates may settle. The support element 35 in each of the arrangements illustrated in FIGS. 26G-L have a circular cross-section. It will be understood that the support element 35 may have different configurations. The support element 35 may have a polygonal cross-section, for example. Alternatively, or in addition, the support element 35 may define concave or convex surfaces between the external fins 30. The mechanical filter element 2 illustrated in FIG. 26M comprises a support element 35 having a hexagonal cross-section. The mechanical filter elements 2 illustrated in FIGS. 26N-Q each comprise a support element 35 having an octagonal cross-section. Furthermore, the mechanical filter elements 2 illustrated in FIGS. 26O-Q comprise one or more branching external fins 30.

The mechanical filter elements 2 illustrated in FIGS. 26A-Q comprise external fins 30 extending radially outwardly. However, other configurations of the external fins 30 are useful. For example, at least some of the external fins 30 may extend parallel to each other. By way of example, mechanical filter elements 2 according to further embodiment of the present invention are illustrated in FIGS. 26A-F. Like reference numerals are used for like components.

With reference to FIG. 27A, the mechanical filter element 2 comprises a support element 35 which is elongated along a transverse axis. The external fins 30 extend outwardly from the support element 35 and are arranged substantially parallel to each other. In this embodiment, the external fins 30 are arranged substantially perpendicular to the support element 35. A modified arrangement is illustrated in FIG. 27B in which the external fins 30 form an acute angle with the support element 35. In the arrangements illustrated in FIGS. 27A and 27B, the external fins 30 all have the same length. However, it is understood that the mechanical filter element 2 may comprise externals fins 30 having different lengths. By way of example, alternate arrangements of the mechanical filter element 2 are illustrated in FIGS. 27C and 27D having external fins 30 having different lengths.

The mechanical filter elements 2 illustrated in FIGS. 27A-D have a centre of mass which is substantially coincident with the longitudinal axis X. However, arrangements in which the centre of mass is offset from the longitudinal axis X of the mechanical filter elements 2 are believed also to be useful. By offsetting the centre of mass, the mechanical filter elements 2 may be pre-disposed to adopt a particular orientation in the liquid. By way of example, alternate arrangements of the mechanical filter element 2 are illustrated in FIGS. 27E and 27F comprising a body 36. Depending on the specific gravity of the material, the mechanical filter element 2 may be pre-disposed to adopt an orientation in which the external fins 30 are disposed either above or below the body 36. Other configurations of the mechanical filter elements 2 are also believed to be useful.

It will be appreciated that further changes and modifications may be made to the mechanical filter elements 2 without departing from the scope of the present application.

It will be understood that other types of filtration, such as biological filtration, may be performed in addition to mechanical filtration. It is envisaged that any such biological filtration would be performed as a separate filtration stage, for example in a separate biological filtration chamber. The mechanical filter apparatus 1 may be used in combination with an ultra violet (UV) filter to clarify the water.

The invention claimed is:

1. A mechanical filter element for forming a static filter pack to perform mechanical filtration of water in a swimming pool, the water in the swimming pool being treated to suppress biological activity, the mechanical filter element comprising one or more filter cells, each filter cell having a cross-sectional area less than or equal to 3 mm$^2$ and a length greater than or equal to 6 mm;
wherein the mechanical filter element comprises an antibacterial agent to inhibit biological activity.

2. The mechanical filter element as claimed in claim 1, wherein each filter cell has a length which is less than or equal to 10 mm.

3. The mechanical filter element as claimed in claim 1, wherein each filter cell has a cross-sectional area greater than or equal to 1 mm$^2$.

4. The mechanical filter element as claimed in claim 1, wherein each filter cell has at least substantially the same cross-sectional area, each filter cell having a cross-sectional area in the range of 2.8 mm$^2$ to 2.9 mm$^2$.

5. The mechanical filter element as claimed in claim 1, wherein each filter cell has an internal volume less than 30 mm$^3$.

6. The mechanical filter element as claimed in claim 1, further comprising at least one first filter cell and at least one second filter cell; wherein the at least one first filter cell is configured to mechanically filter particulates having a smaller size than the particulates mechanically filtered by said at least one second filter cell.

7. The mechanical filter element as claimed in claim 1, wherein the one or more filter cells comprises a plurality of filter cells.

8. The mechanical filter element as claimed in claim 1, wherein the mechanical filter element has an aspect ratio defined as a ratio of the length of the mechanical filter element to a transverse dimension of the mechanical filter element, the aspect ratio being one of the following inclusive ranges: 0.25 to 1.25; 0.4 to 1.1; and 0.6 to 1.

9. The mechanical filter element as claimed in claim 1, wherein the mechanical filter element comprises a plurality of the filter cells, the plurality of filter cells comprising inner filter cells and outer filter cells, the outer filter cells being disposed radially outside the inner filter cells.

10. The mechanical filter element as claimed in claim 9, wherein the mechanical filter element comprises an internal frame forming a separation wall between the filter cells, the internal frame comprising a rectangular frame and a plurality of radial members.

11. A mechanical filter apparatus comprising a plurality of the mechanical filter elements claimed in claim 1, the mechanical filter elements being disposed in a filter chamber containing the water to be filtered, the water in the filter chamber being treated to suppress biological activity.

12. A swimming pool filter apparatus for performing mechanical filtration to remove particulates from water in a swimming pool, the water in the swimming pool being treated to suppress biological activity, the swimming pool filter apparatus comprising:
a filter chamber containing a plurality of mechanical filter elements for forming a static filter pack to mechanically filter the water; and
each of the mechanical filter elements comprising one or more filter cells having a cross-sectional area less than or equal to 3 mm$^2$ and a length greater than or equal to 6 mm;
wherein the mechanical filter element comprises an antibacterial agent to inhibit biological activity.

13. The swimming pool filter apparatus as claimed in claim 12, wherein the swimming pool filter apparatus is operable to generate a flow of the water through the filter chamber to establish the static filter pack and to mechanically filter the water.

14. The swimming pool filter apparatus as claimed in claim 12, further comprising an air supply conduit for introducing air into the filter chamber to break up or disrupt the static filter pack during backwashing.

15. The swimming pool filter apparatus as claimed in claim 14, wherein the air supply conduit supplies air to one or more outlets disposed at the base of the filter chamber.

16. The swimming pool filter apparatus as claimed in claim 15, wherein the filter chamber is at least substantially sealed and the air supply conduit is configured to draw air into the air supply conduit as water is drained from the filter chamber.

17. The swimming pool filter apparatus as claimed in claim 12, further comprising a pump for pumping water from the swimming pool to the swimming pool filter apparatus, wherein the swimming pool filter apparatus is configured to provide a flow rate per unit surface area of the static filter pack in the range 20 m$^3$/m$^2$/h to 60 m$^3$/m$^2$/h.

18. A swimming pool filter apparatus as claimed in claim 12, wherein the filter chamber contains the water to be filtered, the water in the filter chamber being treated to suppress biological activity.

19. A method of mechanically filtering water in a swimming pool, the water in the swimming pool being treated to suppress biological activity, the method comprising:
- disposing a plurality of mechanical filter elements in a filter chamber, the mechanical filter elements each comprising one or more filter cells having a cross-sectional area less than or equal to 3 mm$^2$ and a length greater than or equal to 6 mm; and
- during filtration, passing the water through the filter chamber to establish a static filter pack of said mechanical filter elements to mechanically filter the water;
- wherein the mechanical filter element comprises an antibacterial agent to inhibit biological activity.

20. The method as claimed in claim 19, further comprising periodically breaking up the static filter pack by agitating the mechanical filter elements to dislodge filtered particulates from said one or more filter cells.

21. The method as claimed in claim 20, wherein breaking up the static filter pack comprises introducing air into the filter chamber thought an air supply conduit to agitate the mechanical filter elements.

22. The method as claimed in claim 19, wherein the flow rate per unit surface area of the static filter pack in the range 20 m$^3$/m$^2$/h to 60 m$^3$/m$^2$/h.

\* \* \* \* \*